(12) United States Patent
Kwon et al.

(10) Patent No.: US 9,392,340 B2
(45) Date of Patent: Jul. 12, 2016

(54) METHOD AND A CONTROL DEVICE FOR CONTROLLING AND OPERATING A MEDIA RENDERER AND A MEDIA SERVER AND FOR NOTIFYING THE MEDIA RENDERER WHEN THERE ARE TOO MANY RESOURCE BEING PREFETCHED, AND A METHOD OF OPERATING A MEDIA RENDERER DEVICE

(71) Applicant: LG Electronics Inc., Seoul (KR)

(72) Inventors: Younghwan Kwon, Seoul (KR); Janghun Bae, Seoul (KR); Hyeonjae Lee, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/401,338

(22) PCT Filed: May 14, 2013

(86) PCT No.: PCT/KR2013/004251
§ 371 (c)(1),
(2) Date: Nov. 14, 2014

(87) PCT Pub. No.: WO2013/172626
PCT Pub. Date: Nov. 21, 2013

(65) Prior Publication Data
US 2015/0143438 A1  May 21, 2015

Related U.S. Application Data

(60) Provisional application No. 61/721,511, filed on Nov. 2, 2012, provisional application No. 61/661,309, filed on Jun. 18, 2012, provisional application No. 61/646,376, filed on May 14, 2012.

(51) Int. Cl.
*H04N 7/18* (2006.01)
*H04N 21/647* (2011.01)
(Continued)

(52) U.S. Cl.
CPC ....... *H04N 21/64784* (2013.01); *H04N 21/231* (2013.01); *H04N 21/2665* (2013.01);
(Continued)

(58) Field of Classification Search
CPC .......... H04N 21/64784; H04N 21/231; H04N 21/2665; H04N 21/43615; H04N 21/44004; H04N 21/44016; H04N 21/4622; H04N 21/482
USPC .............. 725/94, 93, 78, 80, 82, 85; 709/223, 709/226, 229
See application file for complete search history.

(56) References Cited

U.S. PATENT DOCUMENTS 7,647,614 B2 * 1/2010 Krikorian .......... H04N 21/4398
725/110
8,375,140 B2 * 2/2013 Tippin ............. H04N 21/23424
386/343
(Continued)

FOREIGN PATENT DOCUMENTS

KR   10-2010-0012315 A   2/2010
KR   10-2010-0084937 A   7/2010
(Continued)

*Primary Examiner* — Hoang-Vu A Nguyen-Ba
(74) *Attorney, Agent, or Firm* — Dentons US LLP

(57) ABSTRACT

After the calling of the playback action of the first resource, the control device calls a multiple resource prefetch action including a plurality of prefetch resource identifiers for a plurality of prefetch resources. The media renderer prefetches the plurality of prefetch resources from the media server on the basis of the plurality of prefetch resource identifiers. The control device calls a playback action of a second resource corresponding to one of the plurality of prefetch resources. The media renderer provides seamless transition between the first resource and the second resource.

18 Claims, 37 Drawing Sheets

(51) Int. Cl.

| | | |
|---|---|---|
| *H04N 21/231* | (2011.01) | |
| *H04N 21/2665* | (2011.01) | |
| *H04N 21/44* | (2011.01) | |
| *H04N 21/462* | (2011.01) | |
| *H04N 21/436* | (2011.01) | |
| *H04N 21/482* | (2011.01) | |
| *H04N 7/173* | (2011.01) | |
| *G06F 15/173* | (2006.01) | |
| *G06F 15/16* | (2006.01) | |

(52) U.S. Cl.
CPC ... *H04N21/43615* (2013.01); *H04N 21/44004* (2013.01); *H04N 21/44016* (2013.01); *H04N 21/4622* (2013.01); *H04N 21/482* (2013.01)

(56) References Cited

U.S. PATENT DOCUMENTS

| | | | | |
|---|---|---|---|---|
| 8,392,952 B2* | 3/2013 | Carlucci | .............. | G06F 3/0482 375/240.12 |
| 8,526,484 B2* | 9/2013 | Sato | ................ | H04N 21/43615 360/60 |
| 2004/0107449 A1* | 6/2004 | Fukuda | .............. | H04N 5/44543 725/135 |
| 2007/0213046 A1 | 9/2007 | Li et al. | | |
| 2008/0250101 A1* | 10/2008 | Tanaka | ................. | G11B 27/005 709/203 |
| 2009/0288125 A1* | 11/2009 | Morioka | ............. | H04N 7/1675 725/110 |
| 2010/0223357 A1* | 9/2010 | Einarsson | ......... | H04L 29/06027 709/219 |
| 2012/0042347 A1* | 2/2012 | Yasuda | ............. | H04N 21/2387 725/89 |
| 2012/0232681 A1* | 9/2012 | Mundy | ............. | G06F 17/30053 700/94 |
| 2012/0240177 A1* | 9/2012 | Rose | .................... | H04N 21/252 725/116 |
| 2012/0272280 A1* | 10/2012 | Kazawa | ............. | H04N 21/4126 725/109 |
| 2012/0278449 A1* | 11/2012 | Wu | ................... | H04N 21/23424 709/219 |
| 2013/0024197 A1* | 1/2013 | Jang | ........................ | G10L 15/22 704/246 |
| 2013/0347044 A1* | 12/2013 | Lee | .................... | H04N 21/2387 725/88 |

FOREIGN PATENT DOCUMENTS

| | | |
|---|---|---|
| KR | 10-2010-0117396 A | 11/2010 |
| KR | 10-201100070612 A | 6/2011 |

* cited by examiner

METHOD AND A CONTROL DEVICE FOR CONTROLLING AND OPERATING A MEDIA RENDERER AND A MEDIA SERVER AND FOR NOTIFYING THE MEDIA RENDERER WHEN THERE ARE TOO MANY RESOURCE BEING PREFETCHED, AND A METHOD OF OPERATING A MEDIA RENDERER DEVICE

This application is a National Stage Application of International Patent Application No. PCT/KR2013/004251, filed May 14, 2013, 2013, and claims the benefit of U.S. Provisional Application Nos. 61/721,511, filed Nov. 2, 2012; 61/661,309, filed Jun. 18, 2012; and 61/646,376, file May 14, 2012, the disclosures of which are incorporated herein by reference.

TECHNICAL FIELD

The present disclosure relates to a media control device, a media renderer device, a media server device, and an operating method thereof, and more particularly, to a method of controlling AV content transmission between universal plug and play (UPnP) devices.

BACKGROUND ART

As a home network protocol, there are universal plug and play (UPnP) technology and digital living network alliance (DLNA) technology.

The universal plug and play (UPnP) technology and the digital living network alliance (DLNA) technology allow controls and services between home appliances of various manufacturers. Especially, the UPnP technology allows compatible AV service and control between audio-visual (AV) devices. As the compatible AV service, there are media streaming, uploading, and downloading.

DLNA, as a home network device, regulates a digital media server (DMS), a digital media player (DMP), a digital media renderer (DMR), a digital media controller (DMC), and a digital media printer (DMPr), and, as a mobile portable device, regulates a mobile digital media server (M-DMS), a mobile digital media player (M-DMP), a mobile digital media uploader (M-DMU), a mobile digital media downloader (M-DMD), and a mobile digital media controller (M-DMC).

Hereinafter, in terms of concept, the DMS covers the M-DMS, the DMP covers the M-DMP, and the DMC covers the M-DMC.

The UPnP classifies such devices into control points (CPs) and devices. The DMC and the DMP are classified into CPs, and the DMR, the DMS, and DMPr are classified into devices. Hereinafter, the mentioned control device or controller may indicate a CP of the UPnP. Hereinafter, the mentioned control target device may indicate a device of the UPnP.

Moreover, the DLNA defines a 2-box model and a 3-box model.

The 2-box model includes a DMP and a DMS. In the 2-box model, the DMP allows a user to find and play a browsed and distributed content by using the DMS.

The 3-box model includes a DMC, a DMS, and a DMR. In the 3-box model, the DMC allows a user to find a content of the DMS, which is to be played in the DMR.

Devices following the UPnP and the DLNA exchange commands through internet protocol (IP) networking. That is, one of AV devices connected to the same network provides AV service to the other devices and receives AV service from other devices, and also controls other devices and is controlled by other devices.

Especially, in the 3-box model, a media renderer receives media content from a media server according to a control of a controller and plays the received media content. However, when a media content to be played by a control of a controller is transited, since a media renderer receives media content from a media server according to a transit command, time delay at the transition occurs, so that seamless transition may not be provided.

This occurs when the media renderer is a device separated from a media server. Therefore, this is still an issue in the 2-box model.

When the media renderer is a device separated from a media server, methods of providing seamless transition between media content are suggested but these methods do not have flexibility that may be applicable to various situations.

DISCLOSURE OF THE INVENTION

Technical Problem

Embodiments provide a system, a device, and an operating method thereof to provide seamless transition between media content even when a media renderer is a device separated from a media server.

Embodiments also provide a system, a device, and an operating method thereof to provide flexibility that may be applicable to various situations and seamless transition between media content even when a media renderer is a device separated from a media server.

Technical Solution

In one embodiment, provided is an operating method of a control device controlling a media renderer and a media server. The method includes: calling, by the control device, a playback action of a first resource to allow the media renderer to play the first resource; calling, by the control device, a multiple resource prefetch action including a plurality of prefetch resource identifiers for a plurality of prefetch resources, after the calling of the playback action of the first resource, to allow the media renderer to prefetch the plurality of prefetch resources from the media server on the basis of the plurality of prefetch resource identifiers; and calling, by the control device, a playback action of a second resource corresponding to one of the plurality of prefetch resources, to allow the media renderer to provide seamless transition between the first resource and the second resource.

The method may further include, when the media renderer cannot prefetch all of the plurality of prefetch resources due to the multiple resource prefetch action including too many prefetch resource identifiers, receiving, by the control device, a return of an error code indicating that there are too many resources.

The multiple resource prefetch action may further include a plurality of metadata items for the plurality of prefetch resources.

An order of the plurality of metadata items may be identical to an order of the plurality of prefetch resource identifiers.

The multiple resource prefetch action may include a first argument including the plurality of prefetch resource identifiers and a second argument including the plurality of metadata items, wherein the first argument may include the plurality of prefetch resource identifiers in a comma separated value format; and the second argument may include the plurality of metadata items in a DIDL-Lite XML Fragment format defined in a content directory service template of a UPnP standard.

The method may further include receiving, by the control device, a user input on whether the multiple resource prefetch action supports metadata; and updating, by the control device, a setting variable storing whether the multiple resource prefetch action supports metadata on the basis of the user input, wherein when the setting variable indicates that the multiple resource prefetch action supports the metadata, the multiple resource prefetch action may include a plurality of metadata items for the plurality of prefetch resources; and when the setting variable indicates that the multiple resource prefetch action does not support the metadata, the multiple resource prefetch action may not include a plurality of metadata items for the plurality of prefetch resources.

The method may further include: receiving, by the control device, a user input on whether the multiple resource prefetch action is activated; and updating, by the control device, a setting variable on whether the multiple resource prefetch action is activated on the basis of the user input, wherein the calling of the multiple resource prefetch action may include: calling the multiple resource prefetch action when the setting variable indicates that the multiple resource prefetch action is activated; and not calling the multiple resource prefetch action when the setting variable indicates that the multiple resource prefetch action is deactivated.

The method may further include: receiving, by the control device, a user input on the number of the plurality of prefetch resources in the multiple resource prefetch action; and updating, by the control device, a setting variable storing the number of the plurality of prefetch resources in the multiple resource prefetch action on the basis of the user input, wherein the multiple resource prefetch action may include the plurality of prefetch resources whose number corresponds to the setting variable.

The method may further include displaying, by the control device, a prefetch state of the plurality of prefetch resources.

Some of the plurality of prefetch resource identifiers may be allowed to indicate previous resources of the first resource and some of the remaining may be allowed to indicate next resources of the first resource.

All of the plurality of prefetch resource identifiers may be allowed to indicate previous resources of the first resource.

All of the plurality of prefetch resource identifiers may be allowed to indicate next resources of the first resource.

The media renderer may be a device separated from the control device, and the media server may be a device separated from the control device.

The media renderer and the control device may form one device, and the media server may be a device separated from the control device.

The media renderer may be a device separated from the control device and the media server and the control device may form one device.

In another embodiment, a control device controlling a media renderer and a media server includes: a network interface; and a control unit, wherein the control unit calls a playback action of a first resource through the network interface to allow the media renderer to play the first resource; the control unit calls a multiple resource prefetch action including a plurality of prefetch resource identifiers for a plurality of prefetch resources after the playback action of the first resource to allow the media renderer to prefetch the plurality of prefetch resources from the media server on the basis of the plurality of prefetch resource identifiers; and the control unit calls a playback action of a second resource corresponding to one of the plurality of prefetch resources, through the network interface to allow the media renderer to provide seamless transition between the first resource and the second resource.

When the media renderer device cannot prefetch all of the plurality of prefetch resources due to the multiple resource prefetch action including too many prefetch resource identifiers, the control unit may receive a return of an error code indicating that there are too many resources through the network interface.

In further another embodiment, provided is an operating method of a media renderer device controlled by a control device controlling a media server. The method includes: receiving, by the media renderer device, a playback request of a first resource from the control device; receiving, by the media renderer device, a multiple resource prefetch action including a plurality of prefetch resource identifiers for a plurality of prefetch resources, after the playback request of the first resource; and prefetching, by the media renderer device, the plurality of prefetch resources from the media server on the basis of the plurality of prefetch resource identifiers; and receiving, by the media renderer device, a playback request of a second resource corresponding to one of the plurality of prefetch resources, from the control device to provide seamless transition between the first resource and the second resource.

The method may further include, when the media renderer device cannot prefetch all of the plurality of prefetch resources due to the multiple resource prefetch action including too many prefetch resource identifiers, returning, by the media renderer device, an error code indicating that there are too many resources, wherein the multiple resource prefetch action may further include a plurality of metadata items for the plurality of prefetch resources.

When the media renderer device already includes a plurality of prefetch resource identifiers and the multiple resource prefetch action includes a valid non-empty multiple resource identifier argument, the media renderer device may replace a value of a multiple resource identifier state variable storing a multiple resource identifier with a value of the valid non-empty multiple resource identifier argument; and when the media renderer device already includes a plurality of prefetch resource identifiers and the multiple resource prefetch action includes an empty multiple resource identifier argument, the media renderer device may clear a multiple resource identifier state variable storing a multiple resource identifier.

Advantageous Effects

According to an embodiment, even when a media renderer is a device separated from a media server, flexibility that may be applicable to various situation and seamless transition between media content may be provided.

MODE FOR CARRYING OUT THE INVENTION

Figure 1:
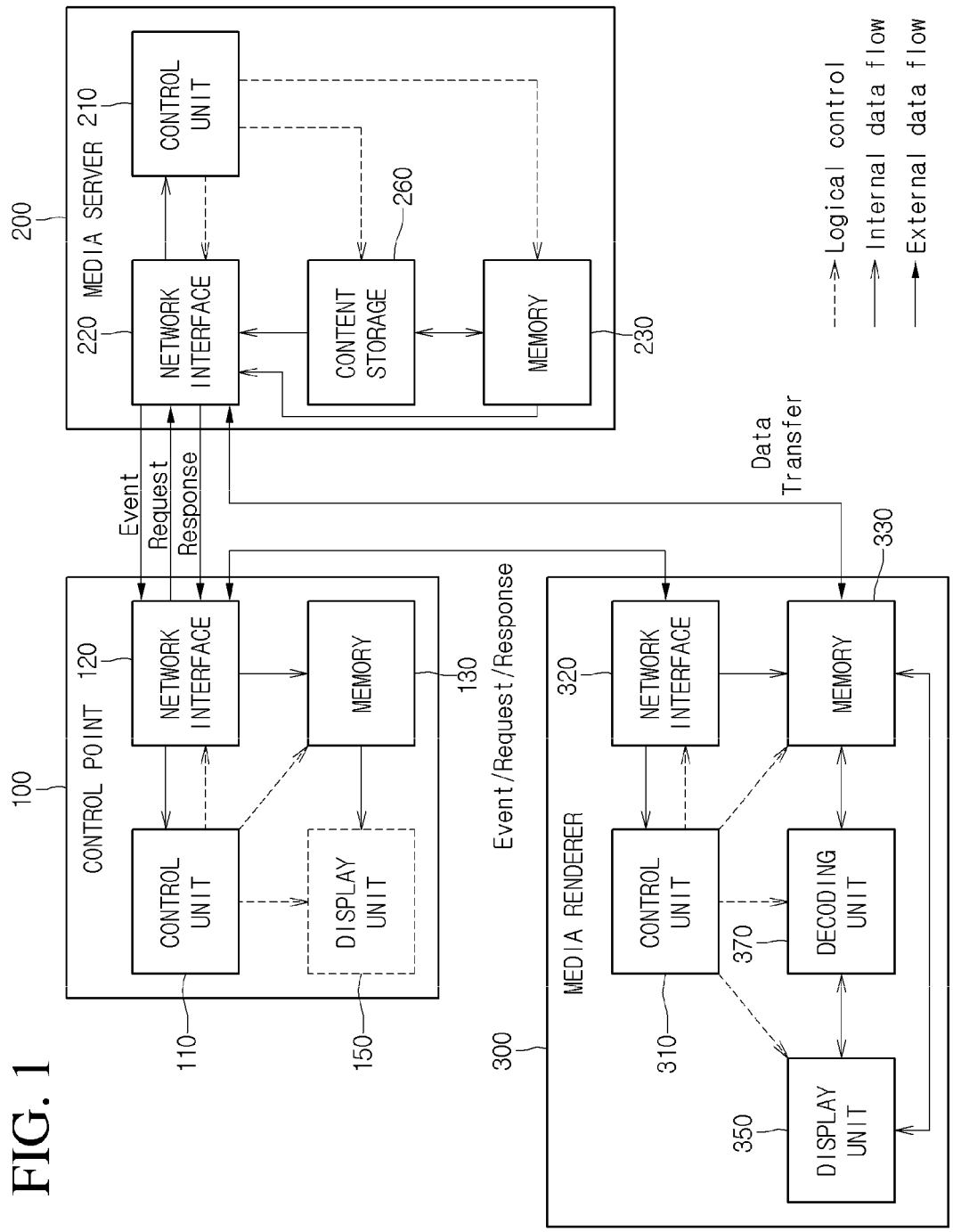
FIG. 1 is a block diagram of a 3-box model according to an embodiment of the present invention.

Desired embodiments of the present invention to specifically realize objects hereinafter are described with reference to the accompanying drawings. At this point, configurations and actions of the present invention shown in the drawings and described using the same are described as at least one embodiment. The technical ideas of the present invention and its core configuration and action are not limited thereto.

Terms used in this present invention select currently and extensively used general terms as far as possible in consideration of functions of the present invention, but differ according to the intents or customs of those skilled in the art or the advent of new technologies. Additionally, in certain cases, there are terms that are arbitrarily selected by the applicant, and in this case, their meaning will be listed in detail in the corresponding description part of the present invention. Accordingly, terms used in the present invention should be defined on the basis of the meanings that the terms have and the contents throughout the present invention.

FIG. 1 is a block diagram of a 3-box model according to an embodiment of the present invention.

As shown in FIG. 1, the 3-box mode includes a control point device 100, a media server device 200, and a media renderer device 300.

The control point device 100 includes a control unit 110, a network interface 120, a memory 130, and a display unit 150.

The control point device 100 transmits a message corresponding to a command, a request, or an action to the service device 200 and the media renderer device 300. The subject of determining whether to send such a message may be a user or the control point device 100 itself. The control point device 100 may support a user interface delivering a response to the transmitted message to a user. This user interface may an internal display unit 150 or a display unit of an additional device.

The control unit 110 is a subject performing all operations of the control point device 100 described in this specification. The control unit 110 generates a message corresponding to a command, a request, or an action, and transmits it to the media server device 200 and the media renderer device 300 via the network interface 120.

The network interface 120 supports IP based message transmission via an IP based network. Especially, the network interface 120 transmits a message or data, which are generated by the control unit 110.

The memory 130 stores various kinds of information and state variables described later. Especially, the memory 130 may be a physical device that temporarily stores such various data.

The display unit 150 displays processed information. For example, the display unit 150 may include at least one of a liquid crystal display (LCD), a thin film transistor-liquid crystal display, a TFT LCD, an organic light-emitting diode (OLED), a flexible display, and a 3D display.

The media server device 200 includes a control unit 210, a network interface 220, a memory 230, and a media content storage 260.

The media service device 200 receives from the control point device 100 a message corresponding to a command, a request, or an action to the service device 200 and processes it. In general, the media server device 200 may be a device storing media content, and also may provide various media services such as streaming, uploading, and downloading metadata and media data of media content with the media renderer device 300, the control point device 100, or another media server device.

The control unit 210 is a subject performing all operations of the IP based content server device 200 described in this specification.

The network interface 220 supports IP based message transmission via an IP based network. Especially, the network interface 220 receives a message corresponding to a command, a request, or an action and transmits/receives metadata and media data of media content.

The memory 230 stores metadata, content, various kinds of information described later, and state variables. Especially, the memory 230 may be a physical device that temporarily stores such various data.

The media content storage 260 stores media content such as images, audio, video, and audio-video (AV). Especially, the media content storage 260 may be a physical storage device such as a hard disk.

Especially, the media server device 200 may further include an encoding unit. The encoding unit of the media server device 200 may re-encode media content in a format proper to the media renderer device 300. The control unit 210 may provide re-encoded media content to the media renderer device 300 via the network interface 220.

The media renderer device 300 includes a control unit 310, a network interface 320, a memory 330, a display unit 350, and a decoding unit 370.

The media renderer device 300 receives a message corresponding to a command, a request, or an action from the control point device 100 and processes it. In general, the media renderer device 300 is a device playing media content, and also receives metadata and media data of media content from the media server device 200 and plays them.

The control unit 310 is a subject performing all operations of the media renderer device 300 described in this specification.

The network interface 320 supports IP based message transmission via an IP based network. Especially, the network interface 120 receives a message corresponding to a command, a request, or an action and transmits/receives metadata and media data of media content.

The memory 330 stores metadata, content, various kinds of information described later, and state variables. Especially, the memory 330 may be a physical device that temporarily stores such various data. Especially, the memory 330 of the media renderer device 300 may be detachable.

The display unit 350 displays processed information. For example, the display unit 350 may include at least one of a liquid crystal display (LCD), a thin film transistor-liquid crystal display, a TFT LCD, an organic light-emitting diode (OLED), a flexible display, and a 3D display.

The decoding unit 370 decodes the encoded media content.

The control unit 310 may display the decoded media content on the display unit 350.

Figure 2:
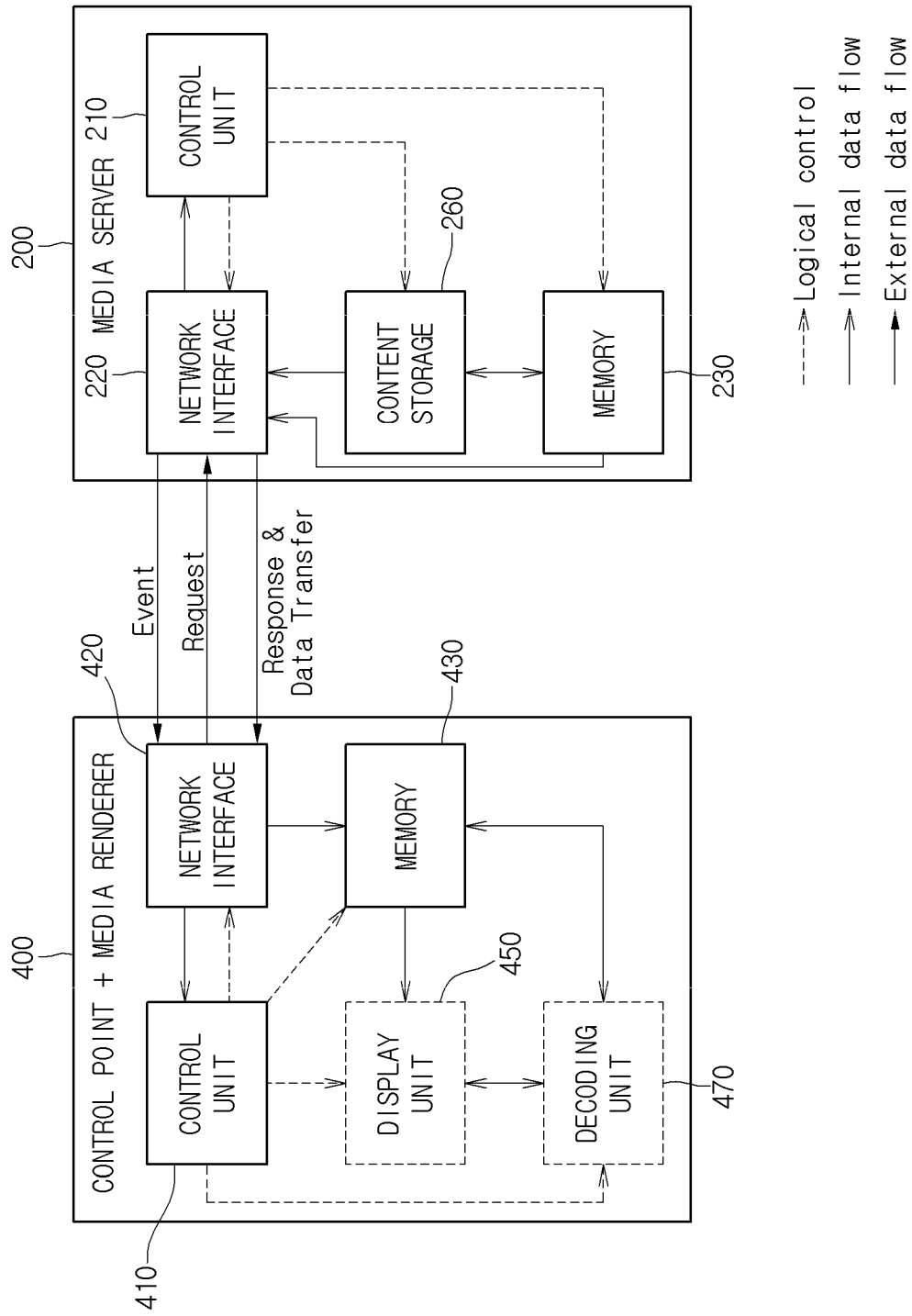
FIG. 2 is a block diagram of a 2-box model according to an embodiment of the present invention.

FIG. 2 is a block diagram of a 2-box model according to an embodiment of the present invention.

The 2-box model includes a control point combined media player device 400 and a media server device 200. Since the media server device 200 was described with reference to FIG. 1, its configuration is not described.

The control point combined media player device 400 includes all functions of the control point device 100 and the media renderer device 300 described with FIG. 1. In a UPNP protocol, the control point combined media player device 400 may be called a media player device.

The control point combined media player device 400 transmits a message corresponding to a command, a request, or an action to the media server device 200. The subject of determining whether to send such a message may be a user or the control point combined media player device 400 itself. The control point combined media player device 400 may support a user interface delivering a response to the transmitted message to a user. This user interface may an internal display unit 450 or a display unit of an additional device. The control point combined media player device 400 is a device playing media content, and also receives metadata and media data of media content from the media server device 200 and plays them.

The control point combined media player device 400 includes a control unit 410, a network interface 420, a memory 430, a display unit 450, and a decoding unit 470.

The control unit 410 is a subject performing all operations of the control point combined media player device 400 described in this specification. The control unit 410 generates a message corresponding to a command, a request, or an action, and transmits it to the media server device 200 via the network interface 420.

The network interface 420 supports IP based message transmission via an IP based network. Especially, the network interface 420 transmits a message or data, which are generated by the control unit 410, and transmit and receive metadata or media data of media content.

The memory 430 stores metadata, content, various kinds of information described later, and state variables. Especially, the memory 430 may be a physical device that temporarily stores such various data. Especially, the memory 430 may be detachable.

The display unit 450 displays processed information. For example, the display unit 450 may include at least one of a liquid crystal display (LCD), a thin film transistor-liquid crystal display, a TFT LCD, an organic light-emitting diode (OLED), a flexible display, and a 3D display.

The decoding unit 470 decodes the encoded media content.

The control unit 410 may display the decoded media content on the display unit 450.

Figure 3:
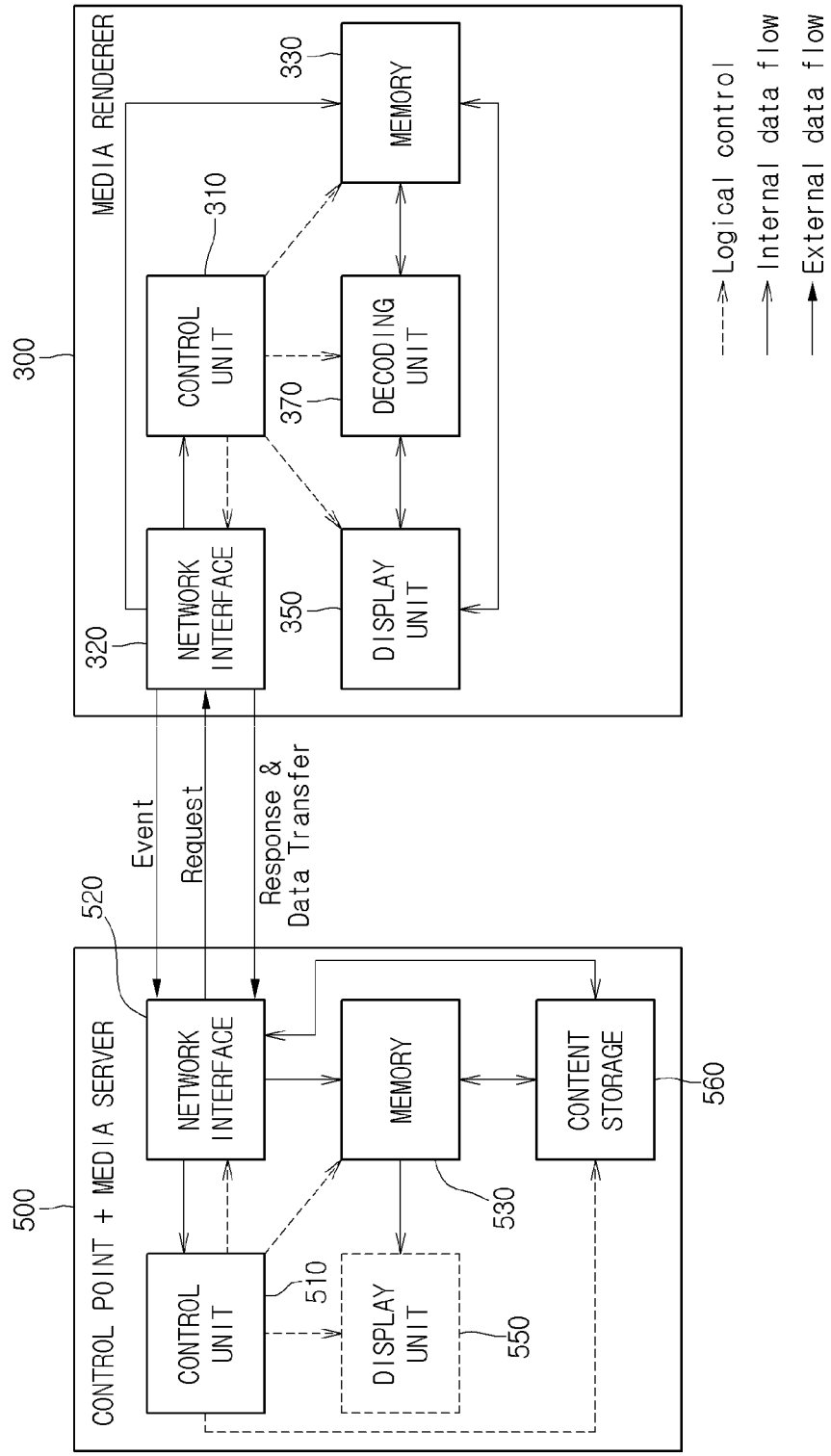
FIG. 3 is a block diagram of a 2-box model according to another embodiment of the present invention.

FIG. 3 is a block diagram of a 2-box model according to another embodiment of the present invention.

The 2-box model includes a control point combined media server device 500 and a media renderer device 300. Since the media renderer device 300 was described with reference to FIG. 1, its configuration is not described.

The control point combined media server device 500 includes all functions of the control point device 100 and the media server device 200 described with FIG. 1.

The control point combined media server device 500 transmits a message corresponding to a command, a request, or an action to the media renderer device 300. The subject of determining whether to send such a message may be a user or the control point combined media server device 500 itself. The control point combined media server device 500 may support a user interface delivering a response to the transmitted message to a user. This user interface may an internal display unit 550 or a display unit of an additional device. In general, the control point combined media server device 500 may be a device storing media content, and also may provide various media services such as streaming, uploading, and downloading metadata and media data of media content with the media renderer device 300, the control point device 100, or another media server device.

The control point combined media server device 500 includes a control unit 510, a network interface 520, a memory 530, a display unit 550, and a media content storage 560.

The control unit 510 is a subject performing all operations of the control point combined media server device 500 described in this specification. The control unit 510 generates a message corresponding to a command, a request, or an action, and transmits it to another media server device and the media renderer device 300 via the network interface 520.

The network interface 520 supports IP based message transmission via an IP based network. Especially, the network interface 520 transmits a message or data, which are generated by the control unit 510. Especially, the network interface 520 receives a message corresponding to a command, a request, or an action and transmits/receives metadata and media data of media content.

The memory 530 stores metadata, content, various kinds of information described later, and state variables. Especially, the memory 530 may be a physical device that temporarily stores such various data.

The display unit 550 displays processed information. For example, the display unit 150 may include at least one of a liquid crystal display (LCD), a thin film transistor-liquid crystal display, a TFT LCD, an organic light-emitting diode (OLED), a flexible display, and a 3D display.

The media content storage 560 stores media content such as images, audio, video, and audio-video (AV). Especially, the media content storage 560 may be a physical storage device such as a hard disk.

Especially, the control point combined media server device 500 may further include an encoding unit. The encoding unit of the control point combined media server device 500 may re-encode media content in a format proper to the media renderer device 300. The control unit 510 may provide re-encoded media content to the media renderer device 300 via the network interface 520.

Figure 4:
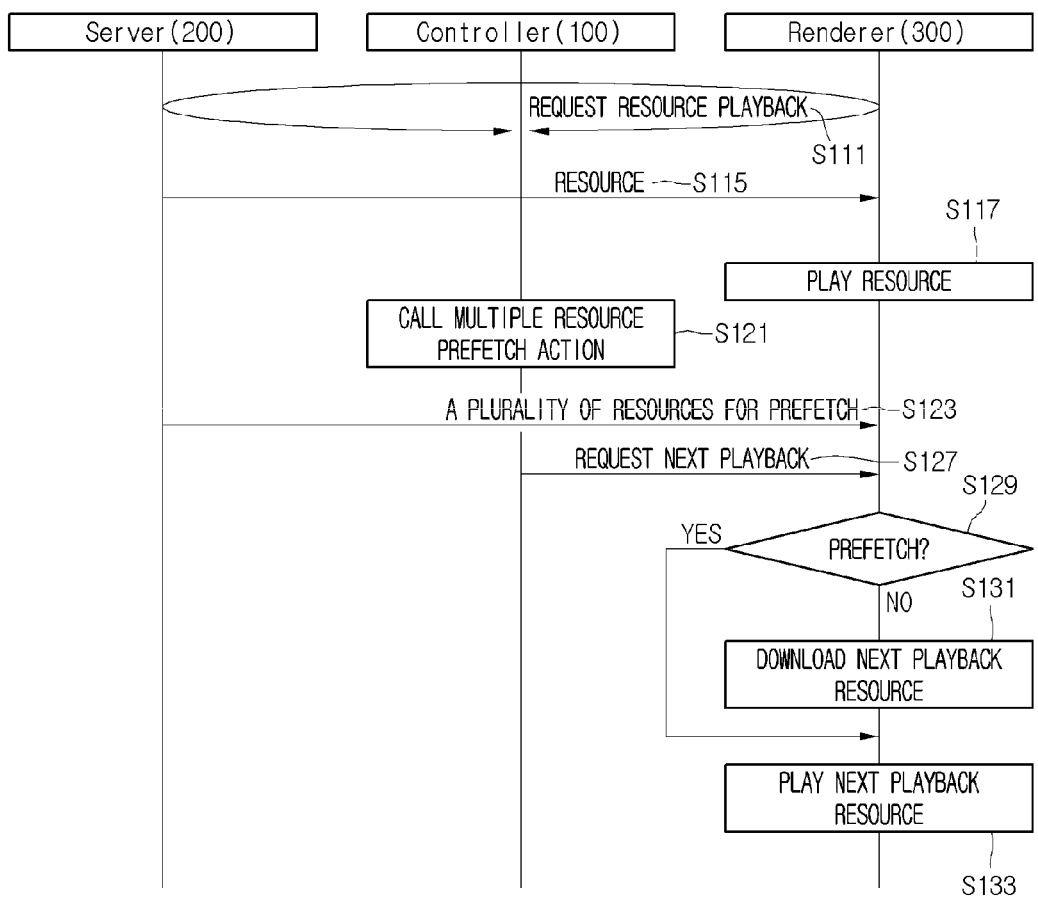
FIG. 4 is a ladder diagram illustrating an operating method of a 3-box model according to an embodiment of the present invention.

FIG. 4 is a ladder diagram illustrating an operating method of a 3-box model according to an embodiment of the present invention.

Once receiving a user input for designating a current playback resource, the control point device 100 requests the playback of the designated current playback resource to the media renderer device 300 and the media server device 200 in operation S111. At this point, the resource may correspond to media content such as images, audio, video, and audio-video (AV).

The request for the playback of the current playback resource may be performed through a resource transfer action call of the current playback resource and a playback action call of the current playback resource.

The resource transfer action may include an instance identifier, the resource identifier of the current playback resource, and metadata of the current playback resource.

The resource transfer action of the current playback resource may correspond to an AVT::SetAVTransportURI( ) action of a UPNP protocol. The AVT::SetAVTransportURI( ) action may include an instance identifier, the resource identifier of the current playback resource, and metadata of the current playback resource. Especially, the instance identifier may be set with 0.

The playback action of the current playback resource may correspond to an AVT::Play( ) action of a UPNP protocol. The AVT::Play( ) action may include an instance identifier. Especially, the instance identifier may be set with 0.

According to an embodiment, the control point device 100 may transmit a resource transfer action to the media server device 200.

According to another embodiment, the control point device 100 may transmit a resource transfer action to the media renderer device 300.

The control point device 100 may transmit the playback action of the current playback resource to the media renderer device 300.

In response to the request the playback of the designated current playback resource, the media renderer device 300 receives the designated current playback resource from the media server device 200 in operation S115.

The media renderer device 300 may receive the designated current playback resource from the media server device 200 through a control protocol for delivering actions regulated in this specification, especially, an out-of-band transfer protocol other than the UPNP protocol.

The control point device 100 transmits a resource transfer action to the media server device 200, the media renderer device 300 may receive a current playback resource pushed by the media server device 200, without requesting the current playback resource to the media server device 200. The media server device 200 may push the current playback resource corresponding to the resource identifier of the current playback resource of the resource transfer action to the media renderer device 300.

When the control point device 100 transmits the resource transfer action to the media renderer device 300, the media renderer device 300 requests the current playback resource to the media server device 200 and then receives the current playback resource from the media server device 200. The media renderer device 300 may request the current playback resource to the media server device 200 through the resource identifier of the resource transfer action. The media renderer device 300 may transmit a Hypertext Transfer Protocol get request (HTTP GET request) including the resource identifier of the current playback resource to the media server device 200 to request the current playback resource. This HTTP GET request is a request message used to request transmission of a resource corresponding to the resource identifier included.

In response to the request of the playback of the current playback resource or the reception of the current playback resource, the media renderer device 300 plays the received resource in operation S117.

After the control point device 100 requests the playback of a designated current playback resource, the control point device 100 calls a multiple resource prefetch action to allow the media renderer device 300 to prefetch a plurality of prefetch resources in a background during an idle time in operation S121.

In an embodiment, the call of a single multiple resource prefetch action may cause a prefetch of a plurality of prefetch resources. In this case, the single multiple resource prefetch action may include a plurality of prefetch resource identifiers respectively corresponding to a plurality of prefetch resources and a plurality of metadata items respectively corresponding to a plurality of prefetch resources, as arguments.

In another embodiment, a multiple resource prefetch action may include a plurality of single resource prefetch actions. The call of a plurality of single resource prefetch actions may cause the prefetch of a plurality of prefetch resources. In this case, each of the plurality of single resource prefetch actions may include the resource identifier of a single resource and a metadata item of a single resource, as arguments. Accordingly, a multiple resource prefetch action including a plurality of single resource prefetch actions may include a plurality of prefetch resource identifiers respectively corresponding to a plurality of prefetch resources and a plurality of metadata items respectively corresponding to a plurality of prefetch resources.

In this case, the multiple resource prefetch action may include a multiple prefetch resource identifier argument including a plurality of prefetch resource identifiers respectively corresponding to a plurality of prefetch resources and a multiple resource metadata argument including a plurality of metadata items respectively corresponding to a plurality of prefetch resources. A resource identifier may be a uniform resource identifier (URI). The multiple prefetch resource identifier argument may include version information, information on the number of a plurality of prefetch resource identifiers, order information on each prefetch resource identifier, information on whether to support metadata of each prefetch resource identifier, and a plurality of prefetch resource identifiers. When a device, which received a multiple resource prefetch action before, receives a multiple resource prefetch action including a multiple prefetch resource identifier argument again, the device may compare the version information of the previously received multiple prefetch resource identifier argument with the version information of the currently received multiple prefetch resource identifier argument. When the version information of the currently received multiple prefetch resource identifier argument is greater than the version information of the previously received multiple prefetch resource identifier argument on the basis of a comparison result, the device receives and processes the currently received multiple prefetch resource identifier argument. Moreover, when the version information of the currently received multiple prefetch resource identifier argument is equal to or less than the version information of the previously received multiple prefetch resource identifier argument, the device does not receive and discards the currently received multiple prefetch resource identifier argument.

The control point device 100 wants to provide metadata of a plurality of prefetch resources, a metadata argument may convey an identifier attribute of all resources to align an order of metadata according to an order of a plurality of prefetch resources. When the control point device 100 does not want to provide metadata of a plurality of prefetch resources, a metadata argument may provide empty string. When a multiple prefetch resource identifier argument includes too many prefetch resource identifiers so that all prefetch resources cannot be prefetched, the media server device 200 and/or the media renderer device 300 may return an error code (for example, 7XX) indicating that there are too many resources.

In an embodiment, one of the plurality of prefetch resources corresponds to a previous resource of the current playback resource as an arrangement order, and another corresponds to the next resource of the current playback resource as an arrangement order. For this, one of the plurality of prefetch resource identifiers indicates a previous resource of the current playback resource as an arrangement order, and another indicates the next resource of the current playback resource as an arrangement order. Especially, one of the plurality of prefetch resources corresponds to an immediately previous resource of the current playback resource as an arrangement order, and another corresponds to the immediately next resource of the current playback resource as an arrangement order. For this, one of the plurality of prefetch resource identifiers indicates an immediately previous resource of the current playback resource as an arrangement order, and another indicates the immediately next resource of the current playback resource as an arrangement order.

In another embodiment, all of a plurality of prefetch resources may be allowed to be previous resources, or all of a plurality of prefetch resources may be allowed to be next resources. Or, some of a plurality of prefetch resources may be allowed to be previous resources and some remaining may be allowed to be next resources. For this, all of a plurality of prefetch resource identifiers may be allowed to indicate previous resources, or all of a plurality of prefetch resource identifiers may be allowed to indicate next resources. Or, some of a plurality of prefetch resource identifiers may be allowed to indicate previous resources and some remaining may be allowed to indicate next resources. Especially, all of a plurality of prefetch resources may be allowed to be immediately previous resources, or all of a plurality of prefetch resources may be allowed to be immediately next resources. Or, some of a plurality of prefetch resources may be allowed to be immediately previous resources and some remaining may be allowed to be immediately next resources. For this, all of a plurality of prefetch resource identifiers may be allowed to indicate immediately previous resources, or all of a plurality of prefetch resource identifiers may be allowed to indicate immediately next resources. Or, some of a plurality of prefetch resource identifiers may be allowed to indicate immediately previous resources and some remaining may be allowed to indicate immediately next resources.

An arrangement order of a plurality of resources may include at least one of a resource title order, a resource file name order, a resource creation date order, a resource modification date order, a resource size order, a resource playback time order, a resource author order, and a resource type order. When a plurality of resources are obtained from a search result, an arrangement order of a plurality of resources may follow a search result order.

When a resource type is an image, an arrangement order of a plurality of images may correspond to a file name order of a plurality of images, but is not limited thereto.

When a resource type is audio, an arrangement order of a plurality of audios may correspond to a track order of a plurality of audios, but is not limited thereto.

When a resource type is video, an arrangement order of a plurality of videos may correspond to a track order of a plurality of videos, but is not limited thereto.

When a multiple resource prefetch action includes N prefetch resource identifiers, it may include N prefetch resource identifiers indicating the next N resources of a current playback resource.

When a multiple resource prefetch action includes N prefetch resource identifiers, it may include N prefetch resource identifiers indicating the previous N resources of a current playback resource.

When a multiple resource prefetch action includes N prefetch resource identifiers, it may include N/2 prefetch resource identifiers indicating the previous N/2 resources of a current playback resource and N/2 prefetch resource identifiers indicating the next N/2 resources of a current playback resource. In one embodiment, when N is an odd number, a multiple resource prefetch action may include an N/2 rounding off integer number of prefetch resource identifiers indicating an N/2 rounding off integer number of previous resources, and an N/2 rounding down integer number of prefetch resource identifiers indicating an N/2 rounding down integer number of next resources. In another embodiment, when N is an odd number, a multiple resource prefetch action may include an N/2 rounding down integer number of prefetch resource identifiers indicating an N/2 rounding down integer number of previous resources, and an N/2 rounding off integer number of prefetch resource identifiers indicating an N/2 rounding off integer number of next resources.

When a multiple resource prefetch action includes N prefetch resource identifiers, it may include a prefetch resource identifier indicating N resources that the control point device 100 recommends. The control point device 100 may recommend N resources on the basis of resource usage frequency and resource usage timing. For example, the control point device 100 may recommend N frequently used resources on the basis of resource usage frequency. Additionally, the control point device 100 may recommend N recently used resources on the basis of resource usage timing.

The control point device 100 may determine the number of a plurality of prefetch resource identifiers in a multiple resource prefetch action on the basis of a user input to set the number N of a plurality of prefetch resource identifiers in a multiple resource prefetch action.

The control point device 100 may determine the N prefetch resource identifiers in a multiple resource prefetch action on the basis of which N prefetch resource identifiers are included in a multiple resource prefetch action.

In an embodiment for 3-box Push, the control point device 100 may transmit a multiple resource prefetch action to the media server device 200.

In an embodiment for 3-box Pull, the control point device 100 may transmit a multiple resource prefetch action to the media renderer device 300.

Then, a multiple resource prefetch configuration according to an embodiment of the present invention will be described with reference to FIGS. 5 to 6.

Figure 5:
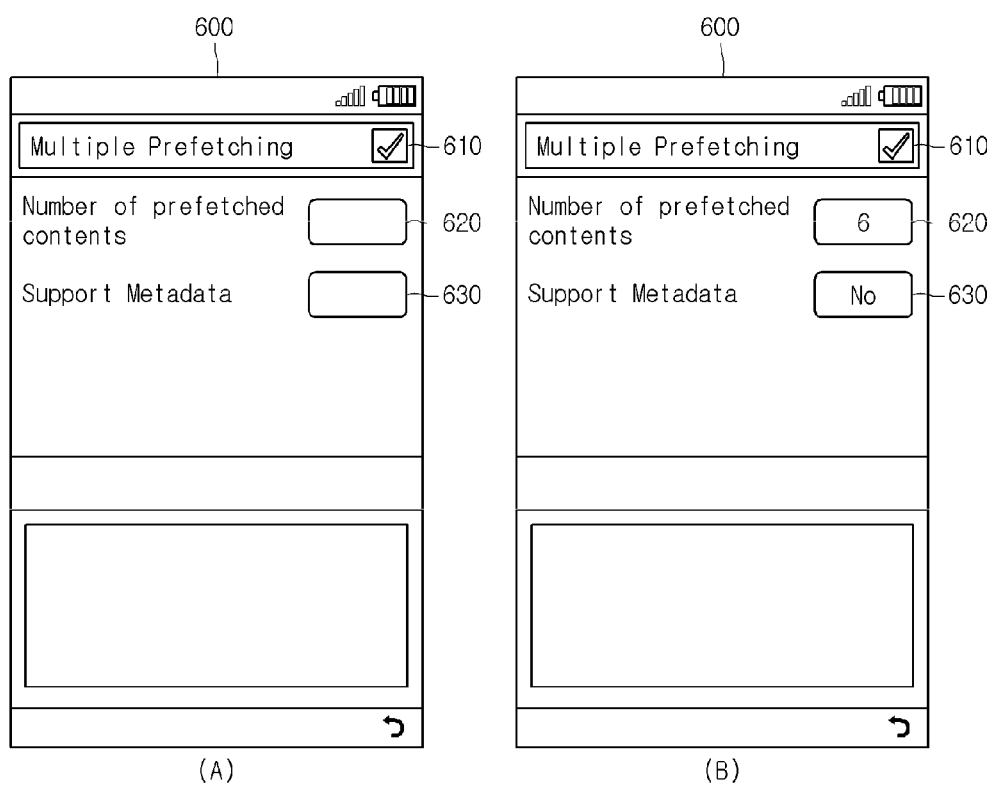
FIGS. 5 and 6 are views illustrating a user interface screen for a multiple resource prefetch configuration according to an embodiment of the present invention.
Figure 6:
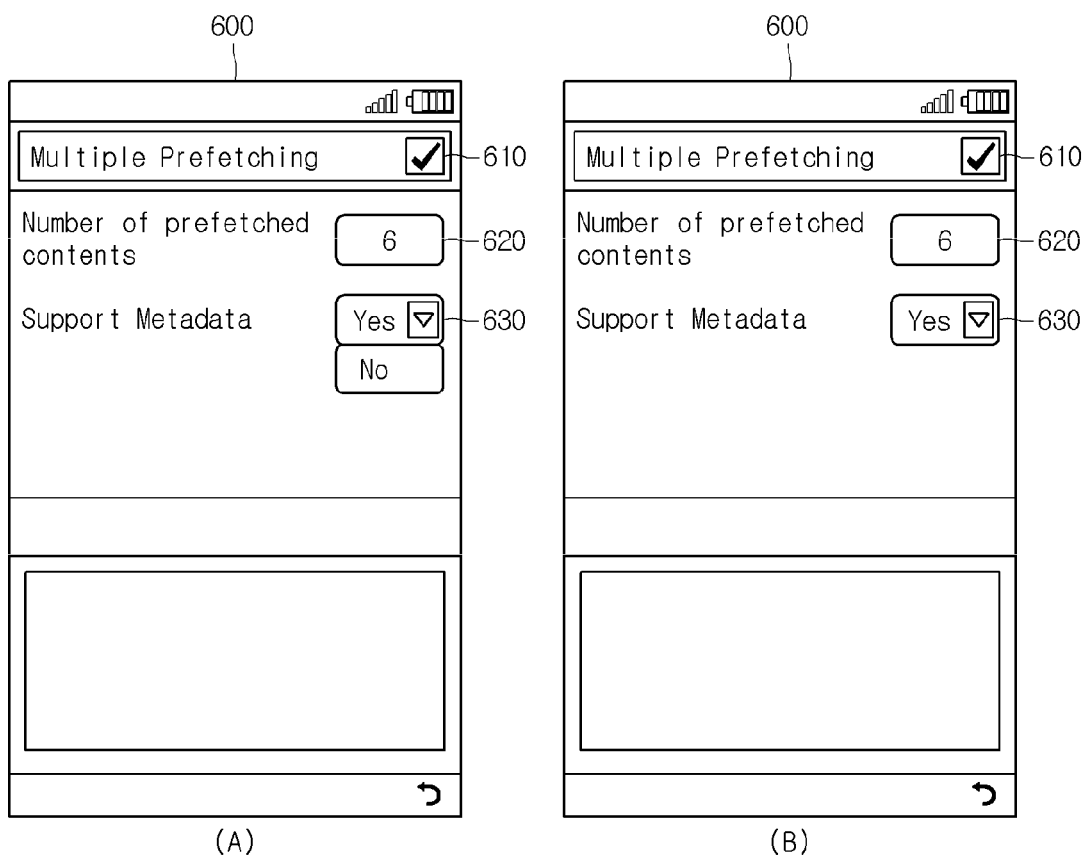

FIGS. 5 and 6 are views illustrating an user interface screen for a multiple resource prefetch configuration according to an embodiment of the present invention.

Especially, FIG. 5 is a view illustrating a user interface screen for a multiple resource prefetch configuration when multiple resource prefetch is deactivated. FIG. 6 is a view illustrating a user interface screen for a multiple resource prefetch configuration when multiple resource prefetch is activated.

As shown in FIG. 5(A), FIG. 5(B), FIG. 6(A), and FIG. 6(B), the control point device 100 may a user interface screen 600 for a multiple resource prefetch configuration on a display unit 150.

The user interface screen 600 for a multiple resource prefetch configuration includes a check box user interface element 610 supporting a configuration on whether to activate multiple resource prefetch, a text box user interface element 620 supporting a configuration on the number of multiple prefetch resources of a multiple resource prefetch action, and a combo box user interface element 630 supporting a configuration on whether a multiple resource prefetch action supports metadata. The form of each user interface is not necessarily limited to a check box form, a text box form, and a combo box form.

As shown in FIG. 5(A), when multiple resource prefetch is deactivated through the user interface element 610, the user interface element 620 and the user interface element 630 are also deactivated. Also, a previous configuration value of the user interface element 620 and a previous configuration value of the user interface element 630 may not be displayed.

As shown in FIG. 5(B), when multiple resource prefetch is deactivated through the user interface element 610, the user interface element 620 and the user interface element 630 are also deactivated. Also, a previous configuration value of the user interface element 620 and a previous configuration value of the user interface element 630 may be dimmed.

As shown in FIG. 6(A) and FIG. 6(B), when multiple resource prefetch is activated through the user interface element 610, the user interface element 620 and the user interface element 630 are also activated. Also, the number of multiple prefetch resources of a multiple resource prefetch action may be set through the user interface element 620, and a determination is made on whether a multiple resource prefetch action supports metadata through the user interface element 630.

When multiple resource prefetch is designated to be activated through the user interface 610, the control point device 100 requests the playback of a designated current playback resource, and then calls a multiple resource prefetch action in a background for an idle time. At this point, the number of prefetch resources in the multiple resource prefetch action may be identical to a value set through the user interface element 620. Additionally, when a value set through the user interface element 630 corresponds to supporting metadata, the multiple resource prefetch action may include metadata of a plurality of prefetch resources. Additionally, when a value set through the user interface element 630 corresponds to un-supporting metadata, the multiple resource prefetch action may not include metadata of a plurality of prefetch resources.

On the contrary, when multiple resource prefetch is designated to be deactivated through the user interface 610, the control point device 100 requests the playback of a designated current playback resource, and then does not call a multiple resource prefetch action in a background for an idle time.

Again, FIG. 4 will be described.

In response to the multiple resource prefetch action, the media renderer device 300 prefetches a plurality of prefetch resources from the media server device 200 in operation S123, so that it provides seamless transition without additional transfer on a plurality of prefetch resources.

In an embodiment for 3-box Push, the media renderer device 300 may prefetch a plurality of prefetch resources that the media server device 200 pushes without requesting a plurality of prefetch resources to the media server device 200. The media server device 200 may push a plurality of prefetch resources corresponding to a plurality of prefetch resource identifiers of a multiple resource prefetch action to the media renderer device 300.

In an embodiment for 3-box Pull, the media renderer device 300 may request a plurality of prefetch resources to the media server device 200, and then prefetches a plurality of prefetch resources from the media server device 200. The media renderer device 300 may request a plurality of prefetch resources to be prefetched to the media server device 200 through a plurality of prefetch resource identifiers of a multiple resource prefetch action. The media renderer device 300 may transmit an HTTP GET request including a plurality of prefetch resource identifiers of a multiple resource prefetch action to the media server device 200 to request a plurality of prefetch resources to the media server device 200.

Then, referring to FIG. 7, a multiple resource prefetch state display will be described according to an embodiment of the present invention.

Figure 7:
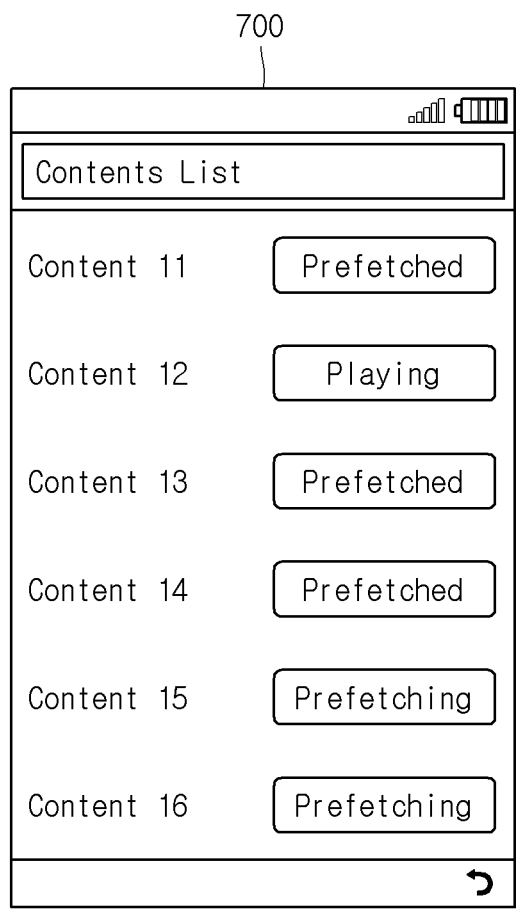
FIG. 7 is a view of a user interface screen displaying a multiple resource prefetch state according to an embodiment of the present invention.

FIG. 7 is a view of a user interface screen displaying a multiple resource prefetch state according to an embodiment of the present invention.

After the control point device 100 calls a multiple resource prefetch action, it may display a user interface screen 700 displaying a multiple resource prefetch state as shown in FIG. 7.

A user interface screen may include a name of a plurality of prefetch resources and a state of a plurality of prefetch resources. The state of a plurality of prefetch resources may be displayed with one of prefetched or prefetching.

Especially, a user interface screen may display a state of a plurality of resources including a plurality of prefetch resources. In this case, a user interface screen may display a state of a plurality of resources with one of prefetched, prefetching, and non-prefetch content while playing the state.

Again, FIG. 4 will be described.

When receiving a user input for designating the next playback resource different from a current resource, the control point device 100 calls a resource playback action to allow the media renderer device 300 to play the next playback resource in operation S127. The control point device 100 may transmit a resource playback action requesting the playback of the next playback resource to the media renderer device 300.

At this point, the next playback resource may be a resource designated by a user, a previous resource of a current playback resource, or the next resource of a current playback resource.

When the next playback resource is a resource designated by a user, a resource playback action for the next playback resource may include an AVT::SetAVTransportURI( ) action of an UPNP protocol and an AVT::Play( ) action of an UPNP protocol. The AVT::SetAVTransportURI( ) action may include an instance identifier, the resource identifier of the next playback resource, and metadata of the next playback resource. Especially, the instance identifier may be set with 0.

When the next playback resource is the previous resource of the current playback resource, a resource playback action for the next playback resource may include a previous resource playback action corresponding to an AVT::Previous( ) action of an UPNP protocol.

When the next playback resource is the next resource of the current playback resource, a resource playback action for the next playback resource may include a next resource playback action corresponding to an AVT::Next( ) action of an UPNP protocol.

In response to the resource playback action of the next playback resource, the media renderer device 300 checks whether the next playback resource belongs to a plurality of prefetch resources in operation S129.

When the next playback resource does not belong to the plurality of prefetch resources, the media renderer device 300 receives the next playback resource from the media server device 200 in operation S131, and plays the received playback resource in operation S133.

The media renderer device 300 may receive the next playback resource from the media server device 200 through an out-of-band transfer protocol other than a transfer protocol (especially, an UPNP protocol) of actions regulated in this specification.

The media renderer device 300 requests the next playback resource to the media server device 200, and then receives the next playback resource from the media server device 200. The media renderer device 300 may request the next playback resource to the media server device 200 through the resource identifier of the next playback resource. The media renderer device 300 may transmit an HTTP GET request including the resource identifier of the next playback resource to the media server device 200 to request the next playback resource.

When the next playback resource belongs to the plurality of prefetch resources, the media renderer device 300 plays the next playback resource without a procedure of receiving the next playback resource from the media server device 200 in operation S133. Thus, the media renderer device 300 provides seamless transition from a current playback resource to the next playback resource without an additional transfer through a plurality of prefetch resources.

In an embodiment, a 3-bix model is mainly described with reference to FIG. 4. In this case, the control point device 100 is a device separated from the media server device 200, the control point device 100 is a device separated from the media renderer device 300, and the media server device 200 is a device separated from the media renderer device 300.

In another embodiment, FIG. 4 may be applied to a 2-box model in which the control point device 100 and the media server device 200 are combined as one device. In this case, the control point device 100 and the media server device 200 are integrated into the control point combined media server device 500 that is a device separated from the media renderer device 300. In this case, an action call between the control point device 100 and the media server device 200 may be an internal action call. That is, calls for a resource transfer action such as an AVT::SetAVTransportURI( ) action, a playback action such as an AVT::Play( ) action, and a multiple resource prefetch action may be internal action calls.

In another embodiment, FIG. 4 may be applied to a 2-box model in which the control point device 100 and the media renderer device 300 are combined as one device. In this case, the control point device 100 and the media renderer device 300 are integrated into the control point combined media renderer device 300 that is a device separated from the media server device 200. In this case, an action call between the control point device 100 and the media renderer device 300 may be an internal action call. That is, calls for a resource transfer action such as an AVT::SetAVTransportURI( ) action, a playback action such as an AVT::Play( ) action, and a multiple resource prefetch action may be internal action calls.

Next, referring to FIGS. 8 to 13, a technical effect according to an embodiment of the present invention is shown.

Figure 8:
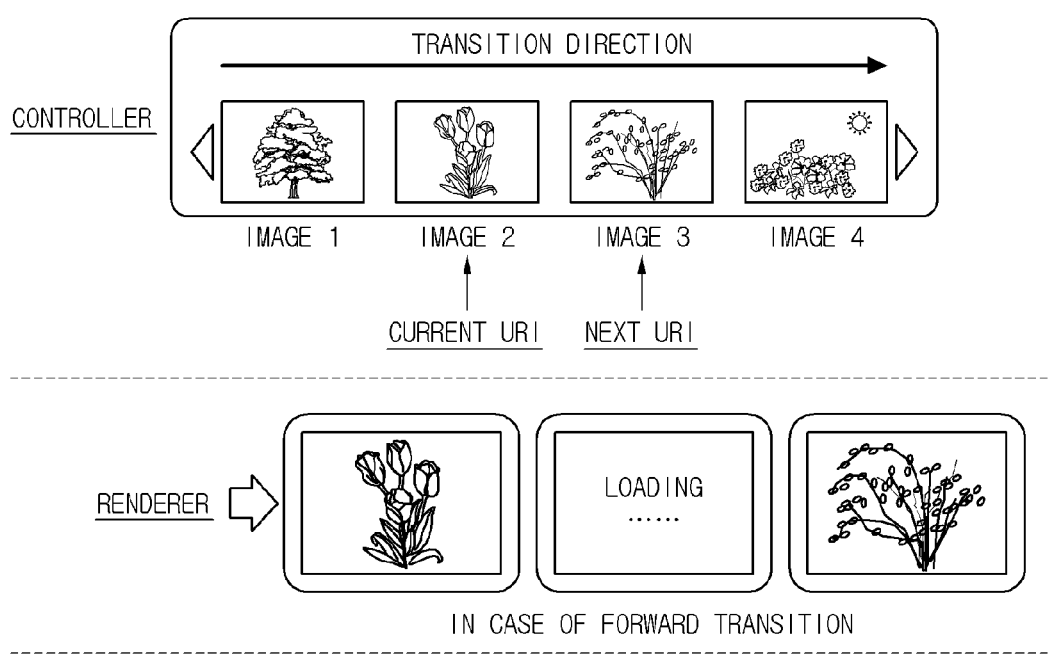
FIG. 8 is a view illustrating a forward transition from a current resource to an immediately after resource as an arrangement order according to the related art.

FIG. 8 is a view illustrating a forward transition from a current resource to an immediately after resource as an arrangement order according to the related art.

As shown in FIG. 8, according to the related art, when a forward transition from a current resource IMAGE 2 to an immediately after resource IMAGE 3 as an arrangement order occurs, loading delay may occur due to the transfer of the immediately after resource IMAGE 3.

Figure 9:
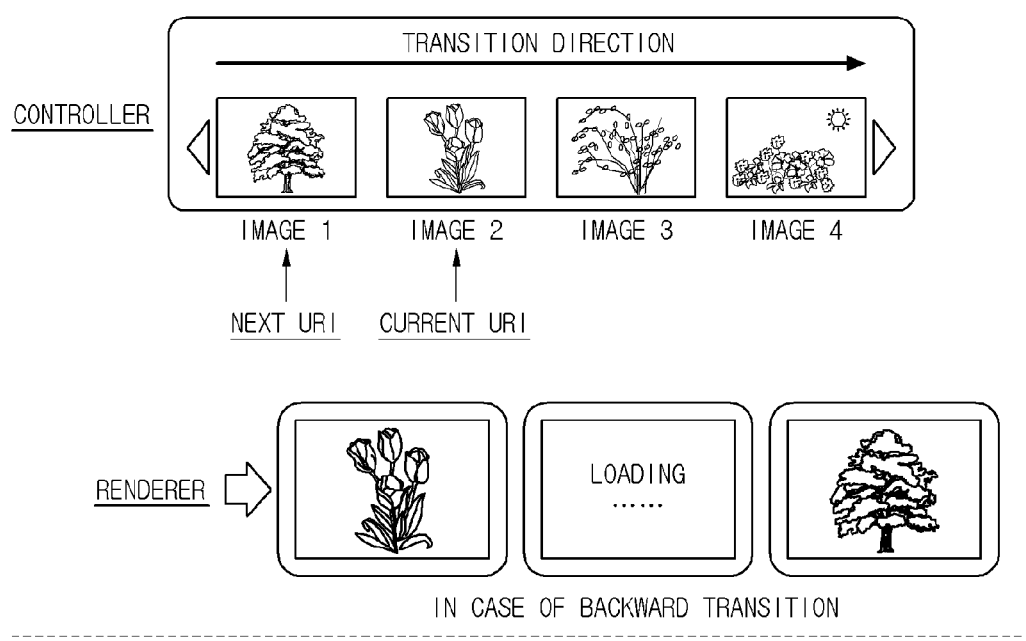
FIG. 9 is a view illustrating a reverse transition from a current resource to an immediately before resource as an arrangement order according to the related art.

FIG. 9 is a view illustrating a backward transition from a current resource to an immediately before resource as an arrangement order according to the related art.

As shown in FIG. 9, according to the related art, when a backward transition from a current resource IMAGE 2 to an immediately before resource IMAGE 1 as an arrangement order occurs, loading delay may occur due to the transfer of the immediately before resource IMAGE 1.

Figure 10:
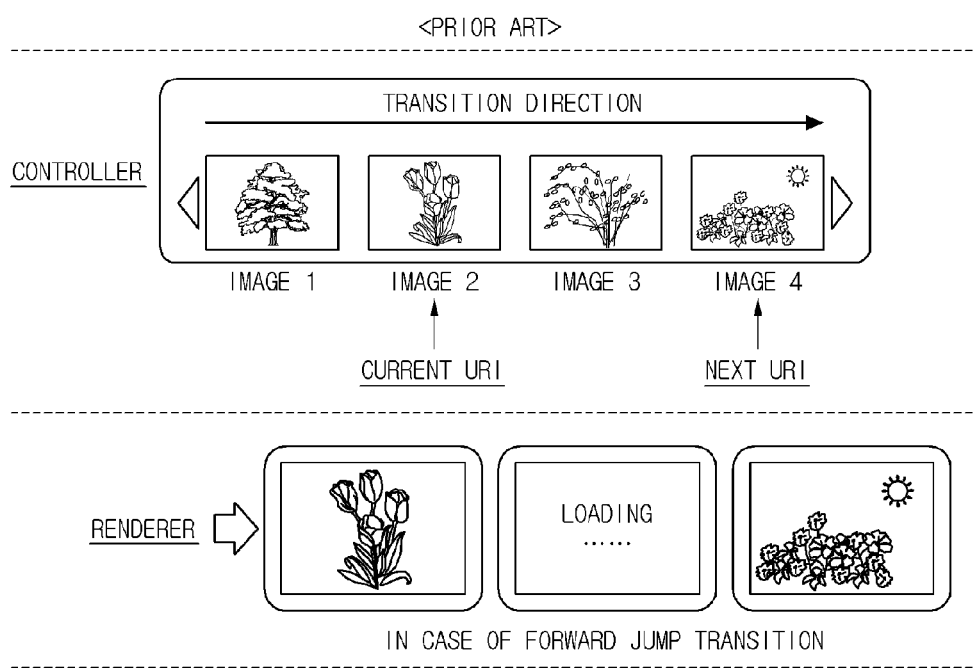
FIG. 10 is a view illustrating a forward jump transition from a current resource to a next next resource as an arrangement order according to the related art.

FIG. 10 is a view illustrating a forward jump transition from a current resource to a next next resource as an arrangement order according to the related art.

As shown in FIG. 10, according to the related art, when a forward jump transition from the current resource IMAGE 2 to the next next resource IMAGE 4 as an arrangement order occurs, loading delay may occur due to the transfer of the next next resource IMAGE 4.

Figure 11:
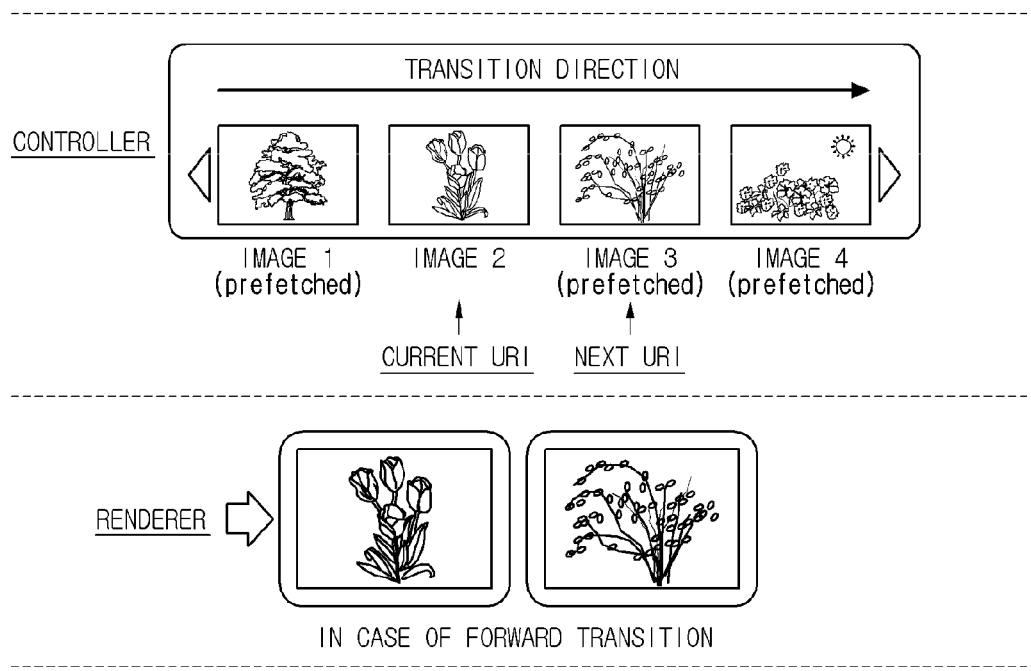
FIG. 11 is a view illustrating a forward transition from a current resource to an immediately as an arrangement order after resource according to an embodiment of the present invention.

FIG. 11 is a view illustrating a forward transition from a current resource to an immediately as an arrangement order after resource according to an embodiment of the present invention.

As shown in FIG. 11, according to an embodiment of the present invention, the media renderer device 300 prefetches an immediately before resource IMAGE 1, an immediately after resource IMAGE 3, and a next next resource IMAGE 4, or prefetches at least the immediately after resource IMAGE 3, as an arrangement order. Accordingly, the media renderer device 300 may provide seamless transition from the current resource IMAGE 2 to the immediately after resource IMAGE 3, as an arrangement order.

Figure 12:
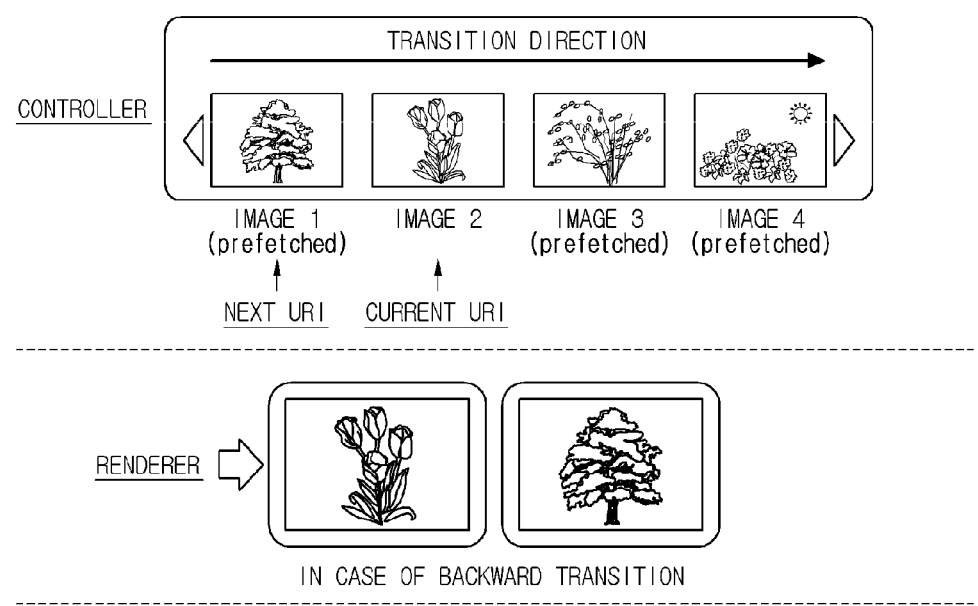
FIG. 12 is a view illustrating a backward transition from a current resource to an immediately as an arrangement order before resource according to an embodiment of the present invention.

FIG. 12 is a view illustrating a backward transition from a current resource to an immediately as an arrangement order before resource according to an embodiment of the present invention.

As shown in FIG. 12, according to an embodiment of the present invention, the media renderer device 300 prefetches an immediately before resource IMAGE 1, an immediately after resource IMAGE 3, and a next next resource IMAGE 4, or prefetches at least the immediately before resource IMAGE 1, as an arrangement order. Accordingly, the media renderer device 300 may provide seamless backward transition from the current resource IMAGE 2 to the immediately before resource IMAGE 1, as an arrangement order.

Figure 13:
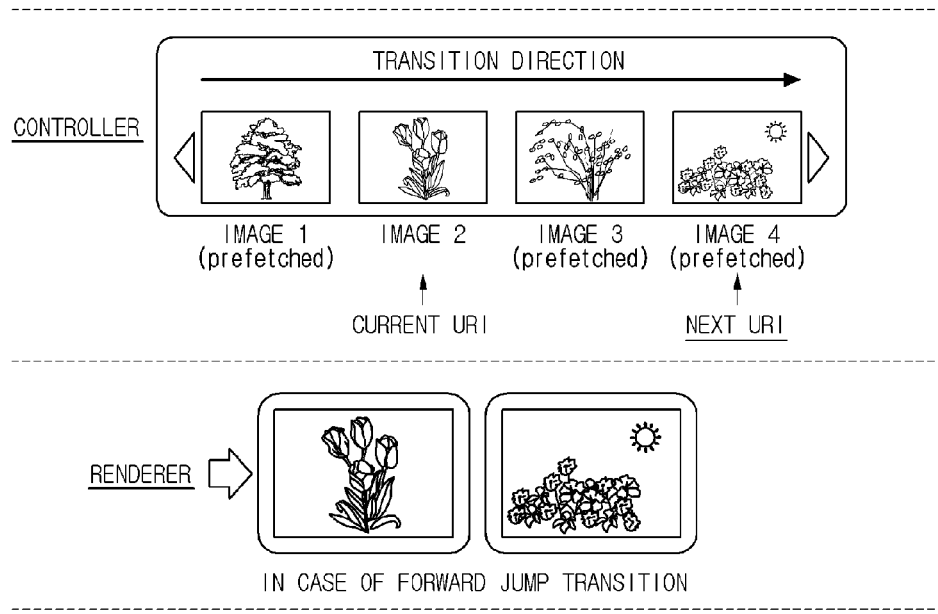
FIG. 13 is a view illustrating a forward jump transition from a current resource to a next next resource as an arrangement order according to an embodiment of the present invention.

FIG. 13 is a view illustrating a forward jump transition from a current resource to a next next resource as an arrangement order according to an embodiment of the present invention.

As shown in FIG. 13, according to an embodiment of the present invention, the media renderer device 300 prefetches an immediately before resource IMAGE 1, an immediately after resource IMAGE 3, and a next next resource IMAGE 4, or prefetches at least the immediately after resource IMAGE 3, as an arrangement order. Accordingly, the media renderer device 300 may provide seamless forward transition from the current resource IMAGE 2 to the next next resource IMAGE 4, as an arrangement order.

Although not shown in the drawing, the media renderer device 300 may prefetch an immediately before resource as an arrangement order to provide seamless backward jump transition from the current resource IMAGE 2 to the immediately before resource IMAGE 4, as an arrangement order.

Hereinafter, an operation of a device receiving a multiple resource prefetch action is described.

As mentioned above, according to various embodiments of the present invention, the media server device 200 may receive a multiple resource prefetch action, or the media renderer device 300 may receive a multiple resource prefetch action, or the control point combined media renderer device 400 may receive a multiple resource prefetch action, or the control point combined media server device 500 may receive a multiple resource prefetch action.

Hereinafter, the term "device" that does not refer to a specific device covers the media server device 200, the media renderer device 300, the control point combined media renderer device 400, and the control point combined media server device 500, in terms of concept.

If the device receives a valid non-empty multiple resource prefetch action, it transfers a value in an argument of the received action to a corresponding instance state variable. In more detail, when the device receives a multiple resource prefetch action including a valid non-empty multiple resource identifier argument (referred to as PrefetchURIs argument or MultiNextURI) and a valid non-empty multiple resource metadata argument (referred to as PrefetchURIs-MetaData argument or MultiNextURIMetaData argument), it transfers a value in the multiple resource identifier argument of the received action to a multiple resource identifier state variable (for example, A_ARG_TYPE_PrefetchURIs or AVT.MultiNextAVTransportURI), and a value in the multiple resource metadata argument to a multiple resource metadata state variable (for example, A_ARG_TYPE_PrefetchURIs-MetaData or AVT.MultiNextAVTransportURIMetaData).

If the device receives a valid non-empty multiple resource prefetch action, it may perform at least one of the following two tasks before providing a response to the received action. As one of the two tasks, the media renderer device 300 transmits to the media server device 200 a series of HTTP HEAD requests for prefetching a plurality of prefetch resources from the media server device 200. As the other of the two tasks, the media renderer device 300 transmits to the media server device 200 a series of partial HTTP GET requests for prefetching a plurality of prefetch resources from the media server device 200.

The HTTP HEAD request is a request message used to request the header transmission of a resource corresponding to a resource identifier included, not used to request the transmission of a resource corresponding to a resource identifier included.

The partial HTTP GET request is a request message used to request the transmission of a portion of a resource corresponding to the resource identifier included.

Especially, the media renderer device 300 receives a valid non-empty multiple resource prefetch action, and a plurality of prefetch resource identifiers in the multiple resource prefetch action identify contents of an image class. When the media renderer device 300 does not cache a plurality of image resources corresponding to the plurality of resource identifiers yet, it may issue a plurality of HTTP GET requests by using the plurality of prefetch resource identifiers in the multiple resource prefetch action in order to prefetch the plurality of image resources. Moreover, the media renderer device 300 may issue a plurality of HTTP GET requests by using a plurality of alternative resource identifiers in a plurality of prefetch resource metadata items in the multiple resource prefetch action in order to prefetch the plurality of image resources. On receiving a multiple resource prefetch action including a plurality of prefetch resource identifiers identifying a plurality of image resources, the device may prefetch the plurality of image resources.

Moreover, the media renderer device 300 receives a valid non-empty multiple resource prefetch action, and a plurality of prefetch resource identifiers in the multiple resource prefetch action identify contents of an audio class, a video class, or an audio-video (AV) class. When the media renderer device 300 does not cache a plurality of resources corresponding to the plurality of resource identifiers yet, it may issue a plurality of HTTP GET requests by using the plurality of prefetch resource identifiers in the multiple resource prefetch action during a playback of a current playback resource identifier in order to partially or completely prefetch a plurality of media resources. Moreover, the media renderer device 300 may issue a plurality of HTTP GET requests by using a plurality of alternative resource identifiers in a plurality of prefetch resource metadata items in the multiple resource prefetch action during a playback of a current playback resource identifier in order to partially or completely prefetch a plurality of media resources.

On receiving a multiple resource prefetch action including a plurality of prefetch resource identifiers identifying a plurality of media resources corresponding to audio, video, or AV, the device may prefetch the plurality of media resources during a playback of a current playback resource identifier.

If the device already includes a plurality of prefetch resource identifiers and receives a valid non-empty multiple resource prefetch action, it may replace the values of state variables with the values of arguments in the recent multiple resource prefetch action.

In more detail, if the device already includes a plurality of prefetch resource identifiers and receives a multiple resource prefetch action including a valid non-empty multiple resource identifier argument and a valid non-empty multiple resource metadata argument, it replaces the values of the multiple resource identifier state variable with the values of the multiple resource identifier arguments in the recent multiple resource prefetch action, and also the value of the multiple resource metadata state variable with the value of the multiple resource metadata argument in the recent multiple resource prefetch action.

If the device already includes a plurality of prefetch resource identifiers and receives an empty multiple resource prefetch action, it may clear the state variables relating to the plurality of prefetch resource identifiers included already. In more detail, if the device already includes a plurality of prefetch resource identifiers and receives a multiple resource prefetch action including an empty multiple resource identifier argument and an empty multiple resource metadata argument, it clears the multiple resource identifier state variable relating to the plurality of prefetch resource identifiers included already, and also clears the multiple resource metadata state variable relating to the plurality of prefetch resource identifiers included already.

If the device already includes a current playback resource identifier and a plurality of prefetch resource identifiers and receives a resource transfer action (for example, an AVT:: SetAVTransportURI action) carrying a valid non-empty resource identifier, it may replace information in a current playback resource identifier state variable storing the current playback resource identifier with information in the received resource transfer action.

Additionally, the device may clear a multiple resource identifier state variable relating to the plurality of prefetch resource identifiers included already and may clear a multiple resource metadata state variable relating to the plurality of prefetch resource identifiers included already.

If the device already includes a current playback resource identifier and a plurality of prefetch resource identifiers and receives a resource transfer action (for example, an AVT:: SetAVTransportURI action) carrying an empty resource identifier, it may clear a current playback resource identifier state variable storing a current playback resource identifier and may clear at least one state variable relating the plurality of prefetch resource identifiers included already. In more detail, the device may clear a multiple resource identifier state variable relating to the plurality of prefetch resource identifiers included already and may clear a multiple resource metadata state variable relating to the plurality of prefetch resource identifiers included already. The device clears at least one state variable relating to the plurality of prefetch resource identifiers, and then, enters a NO_MEDIA_PRESENT state, i.e., a state where media do not exist.

If the device is in a PLAYING state or a STOPPED state during playback and has a current playback resource identifier and a plurality of prefetch resource identifiers, it may allow at least one of a previous resource playback action (for example, an AVT:Previous action) or a next resource playback action (for example, an AVT:Next action). The previous resource playback action is an action for playing at least one previous prefetch resource identifier among a plurality of prefetch resource identifiers, and the next resource playback action is an action for playing at least one next prefetch resource identifier among a plurality of prefetch resource identifiers.

If the device is in a PAUSED_PLAYBACK state and has a current playback resource identifier and a plurality of prefetch resource identifiers, it may allow at least one of a previous resource playback action (for example, an AVT: Previous action) or a next resource playback action (for example, an AVT:Next action). The previous resource playback action is an action for playing at least one previous prefetch resource identifier among a plurality of prefetch resource identifiers, and the next resource playback action is an action for playing at least one next prefetch resource identifier among a plurality of prefetch resource identifiers.

Figure 14:
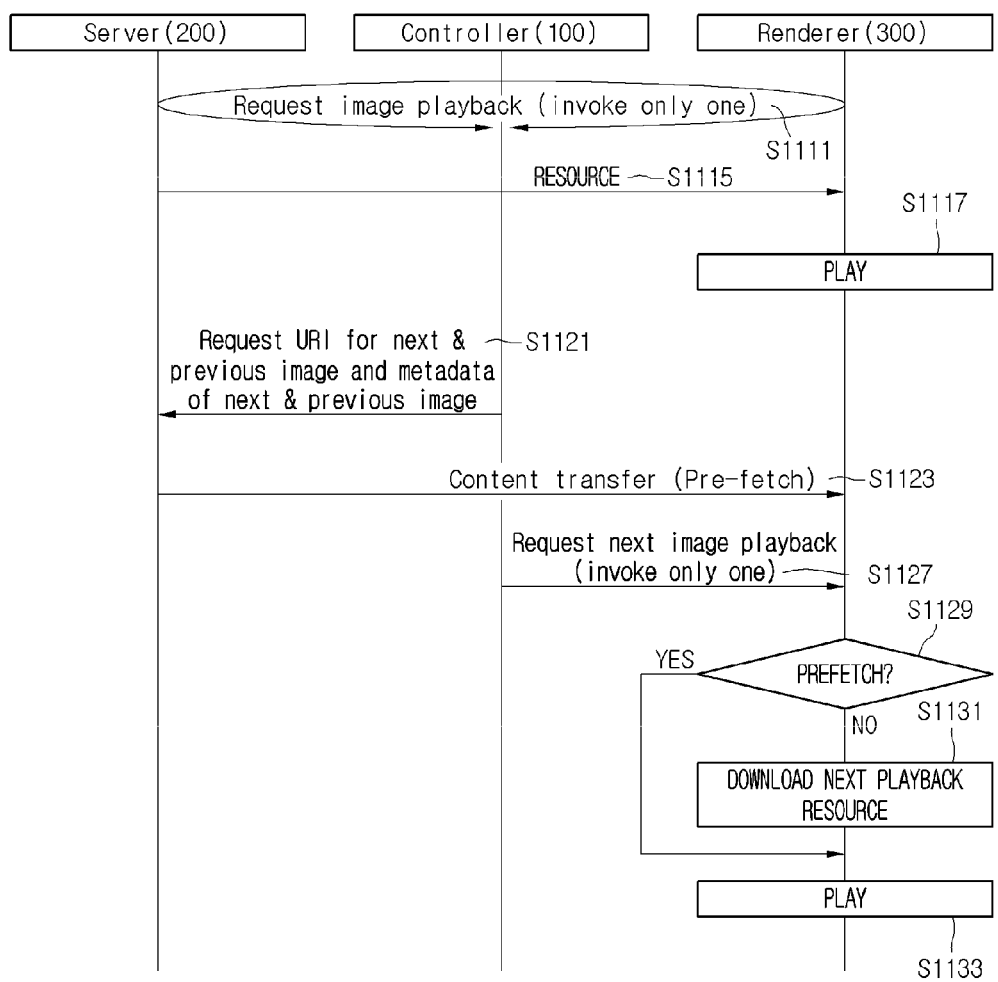
FIG. 14 is a ladder diagram illustrating an operating method of prefetching a multiple resource by using a multiple resource prefetch action including a previous resource identifier and a next resource identifier in a 3-box PUSH model according to an embodiment of the present invention.

FIG. 14 is a ladder diagram illustrating an operating method of prefetching a multiple resource by using a multiple resource prefetch action including all of a previous resource identifier and a next resource identifier in a 3-box PUSH model according to an embodiment of the present invention.

Especially, while FIG. 14 is described, the contents already described with reference to FIG. 4 will not be described.

When receiving a user input for designating a current playback resource, the control point device 100 requests the playback of the designated current playback resource to the media renderer device 300 and the media server device 200 in operation S1111.

In response to the playback request of the designated current playback resource, the media renderer device 300 receives the designated current playback resource from the media server device 200 in operation S1115.

In response to the request of the playback of the current playback resource or the reception of the current playback resource, the media renderer device 300 plays the received resource in operation S1117.

After the control point device 100 requests the playback of the designated current playback resource, it transmits a multiple resource prefetch action including a previous resource identifier and a next resource identifier as arguments to the media server device 200 in a background during an idle time in operation S1121. The multiple resource prefetch action may include previous resource metadata and next resource metadata as arguments.

In response to the multiple resource prefetch action, the media renderer device 300 may prefetch a previous resource and a next resource that the media server device 200 pushes without requesting the previous resource and the next resource to the media server device 200 in operation S1123.

When receiving a user input for designating the next playback resource different from a current resource, the control point device 100 transmits a resource playback action to the media renderer device 300 to play the next playback resource in operation S1127.

In response to the resource playback action of the next playback resource, the media renderer device 300 checks whether the next playback resource belongs to a prefetched previous resource and next resource in operation S1129.

When the next playback resource does not belong to the prefetched previous resource and next resource, the media renderer device 300 receives the next playback resource from the media server device 200 in operation S1131, and plays the received next playback resource in operation S1133.

When the next playback resource belongs to the prefetched previous resource and next resource, the media renderer device 300 plays the next playback resource without a procedure of receiving the next playback resource from the media server device 200 again in operation S1133.

Figure 15:
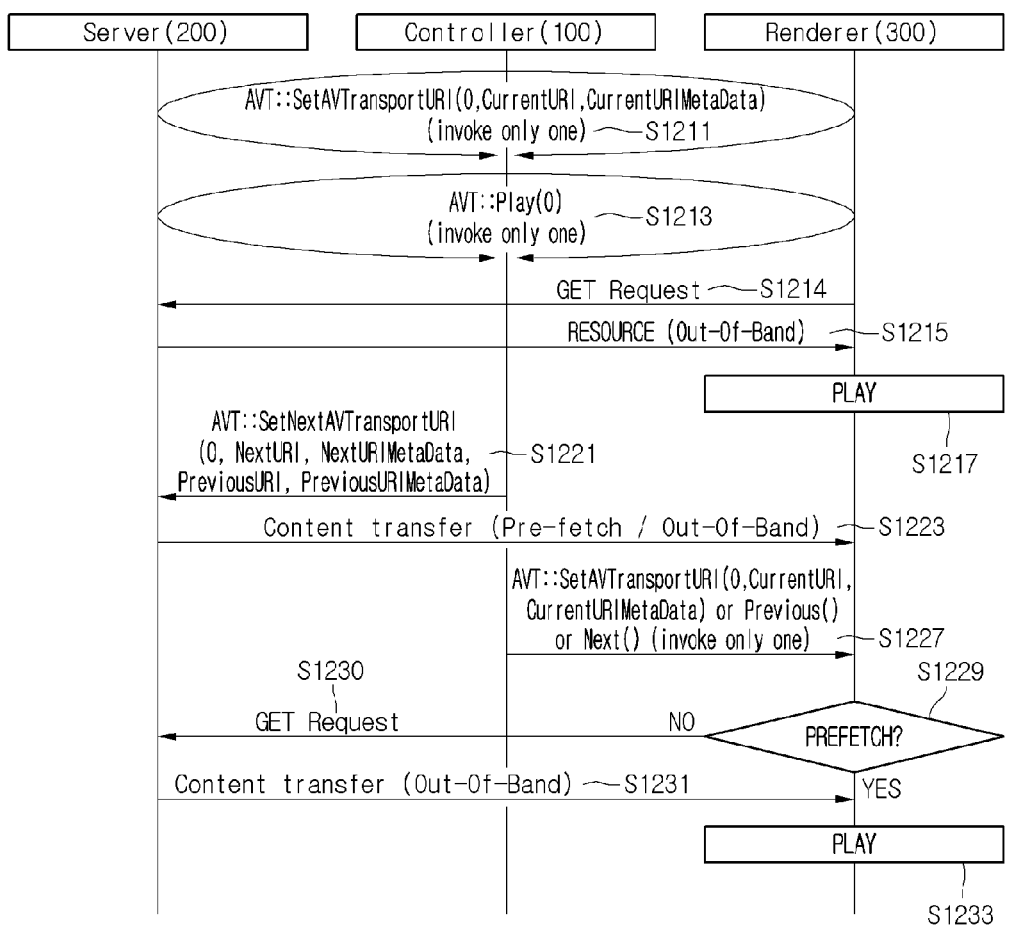
FIG. 15 is a detailed ladder diagram of FIG. 14.

FIG. 15 is a detailed ladder diagram of FIG. 14.

Especially, while FIG. 15 is described, the contents already described with reference to FIG. 4 will not be described.

When receiving a user input for designating a current playback resource, the control point device 100 calls a resource transfer action of a designated current playback resource in operation S1211. The resource transfer action of the current playback resource may correspond to an AVT::SetAVTransportURI( ) action of a UPNP protocol.

The control point device 100 calls the playback action of the designated current playback resource in operation S1213. The playback action of the current playback resource may correspond to an AVT::Play( ) action of a UPNP protocol.

In response to the playback request of the designated current playback resource, the media renderer device 300 requests the current playback resource to the media server device 200 in operation S1214. The media renderer device 300 may transmit an HTTP GET request including the resource identifier of the next playback resource to the media server device 200 to request the next playback resource.

The media renderer device 300 receives the designated current playback resource from the media server device 200 in operation S1215.

In response to the request of the playback of the current playback resource or the reception of the current playback resource, the media renderer device 300 plays the received resource in operation S1217.

After the control point device 100 requests the playback of the designated current playback resource, it transmits an AVT::SetNextAVTransportURI( ) action including a previous resource identifier and a next resource identifier as arguments to the media server device 200 in a background during an idle time in operation S1221. The VT::SetNextAVTransportURI( ) action may include previous resource metadata and next resource metadata as arguments.

An XML service description of SetNextAVTransportURI, i.e., a next resource prefetch action including a previous resource identifier and a next resource identifier as arguments according to an embodiment of the present invention, will be described below.

```
<?xml>
    <action>
        <name>SetNextAVTransportURI</name>
        <argumentList>
            <argument>
                <name>InstanceID</name>
                <direction>in</direction>
                <relatedStateVariable>A_ARG_TYPE_InstanceID
                </relatedStateVariable>
            </argument>
            <argument>
                <name>NextURI</name>
                <direction>in</direction>
                <relatedStateVariable>NextAVTransportURI
                </relatedStateVariable>
            </argument>
            <argument>
                <name>NextURIMetaData</name>
                <direction>in</direction>
                <relatedStateVariable>NextAVTransportURIMetaData
                </relatedStateVariable>
            </argument>
            <argument>
                <name>PreviousURI</name>
                <direction>in</direction>
                <relatedStateVariable>PreviousAVTransportURI
                </relatedStateVariable>
            </argument>
            <argument>
                <name>PreviousURIMetaData</name>
                <direction>in</direction>
                <relatedStateVariable>PreviousAVTransportURIMetaData
                </relatedStateVariable>
            </argument>
        </argumentList>
    </action>
```

As shown above, SetNextAVTransportURI, i.e., a next resource prefetch action, according to an embodiment of the present invention may include an instance identifier, a next resource identifier, next resource metadata, previous resource identifier, and previous resource metadata, as input arguments. A data type of a next resource identifier argument, a next resource metadata argument, a previous resource identifier argument, and a previous resource metadata argument may be string. A plurality of input arguments correspond to a plurality of related state variables, respectively.

In response to the multiple resource prefetch action, the media renderer device 300 may prefetch a plurality of prefetch resources that the media server device 200 pushes without requesting the previous resource and the next resource to the media server device 200 in operation S1223.

When receiving a user input for designating the next playback resource different from a current resource, the control point device 100 transmits a resource playback action to the media renderer device 300 to play the next playback resource in operation S1227. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a prefetched previous resource and next resource in operation S1229.

When the next playback resource does not belong to the prefetched previous resource and next resource, the media renderer device 300 transmits an HTTP GET request requesting a next playback resource to the media server device 200 in operation S1230, receives the next playback resource from the media server device 200 in operation S1231, and plays the received next playback resource in operation S1233.

When the next playback resource belongs to the prefetched previous resource and next resource, the media renderer device 300 plays the next playback resource without a procedure of receiving the next playback resource from the media server device 200 again in operation S1233.

Figure 16:
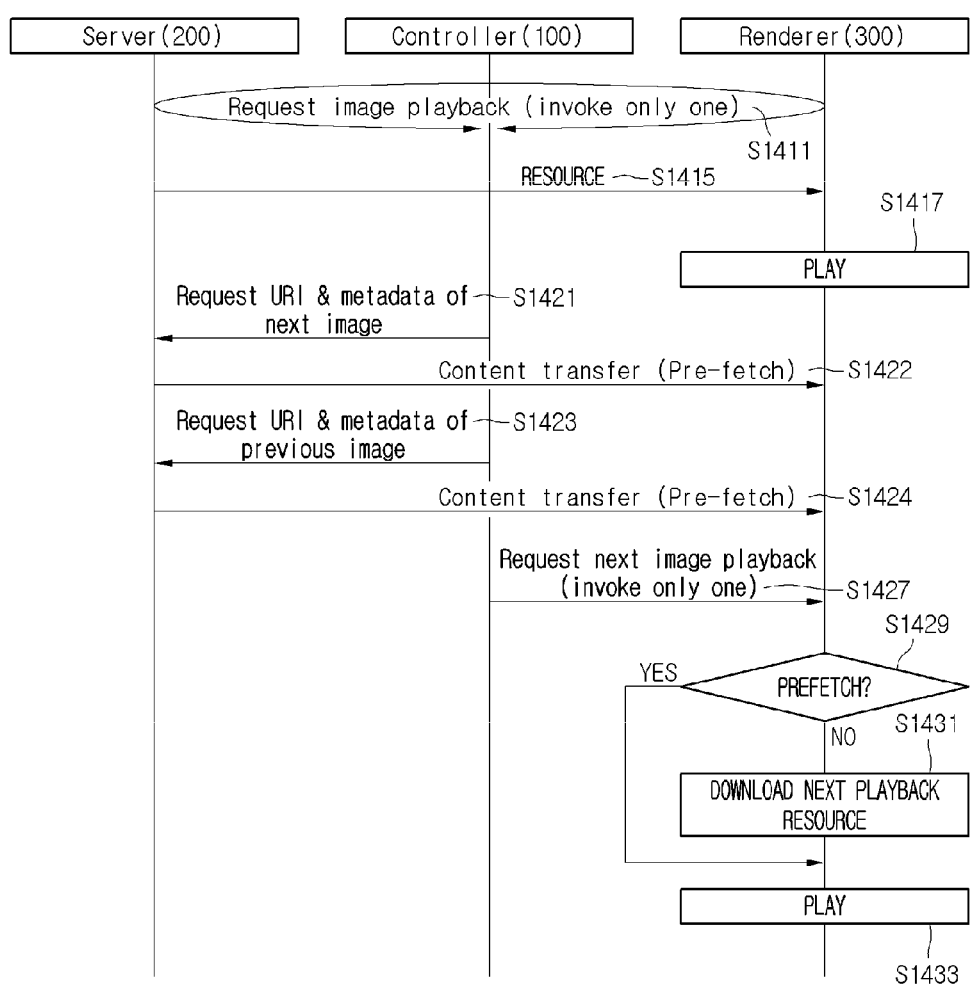
FIG. 16 is a ladder diagram illustrating an operating method of prefetching a multiple resource by using a resource prefetch action including only a previous resource identifier and a resource prefetch action including only a next resource identifier in a 3-box PUSH model according to an embodiment of the present invention.

FIG. 16 is a ladder diagram illustrating an operating method of prefetching a multiple resource by using a resource prefetch action including only a previous resource identifier and a resource prefetch action including only a next resource identifier in a 3-box PUSH model according to an embodiment of the present invention.

Especially, while FIG. 16 is described, the contents already described with reference to FIG. 4 will not be described.

When receiving a user input for designating a current playback resource, the control point device 100 requests the playback of the designated current playback resource to the media renderer device 300 and the media server device 200 in operation S1411.

In response to the request of the playback of the designated current playback resource, the media renderer device 300 receives the designated current playback resource from the media server device 200 in operation S1415.

In response to the request of the playback of the current playback resource or the reception of the current playback resource, the media renderer device 300 plays the received resource in operation S1417.

After the control point device 100 requests the playback of the designated current playback resource, it transmits a multiple resource prefetch action including a next resource identifier as an argument and not including a previous resource identifier as an argument to the media server device 200 in a background during an idle time in operation S1421. The resource prefetch action may include next resource metadata as an argument.

In response to the next resource prefetch action, the media renderer device 300 may prefetch a next resource that the media server device 200 pushes without requesting the next resource to the media server device 200 in operation S1422.

After the control point device 100 requests the playback of the designated current playback resource, it transmits a previous resource prefetch action including a previous resource identifier as an argument and not including a next resource identifier as an argument to the media server device 200 in a background during an idle time in operation 51423. The resource prefetch action may include previous resource metadata as an argument.

In response to the previous resource prefetch action, the media renderer device 300 may prefetch a previous resource that the media server device 200 pushes without requesting the previous resource to the media server device 200 in operation S1424.

When receiving a user input for designating the next playback resource different from a current resource, the control point device 100 transmits a resource playback action to the media renderer device 300 to play the next playback resource in operation S1427.

In response to the resource playback action of the next playback resource, the media renderer device 300 checks whether the next playback resource belongs to a prefetched previous resource and next resource in operation S1429.

When the next playback resource does not belong to the prefetched previous resource and next resource, the media renderer device 300 receives the next playback resource from the media server device 200 in operation S1431, and plays the received next playback resource in operation S1433.

When the next playback resource belongs to the prefetched previous resource and next resource, the media renderer device 300 plays the next playback resource without a procedure of receiving the next playback resource from the media server device 200 again in operation S1433.

Figure 17:
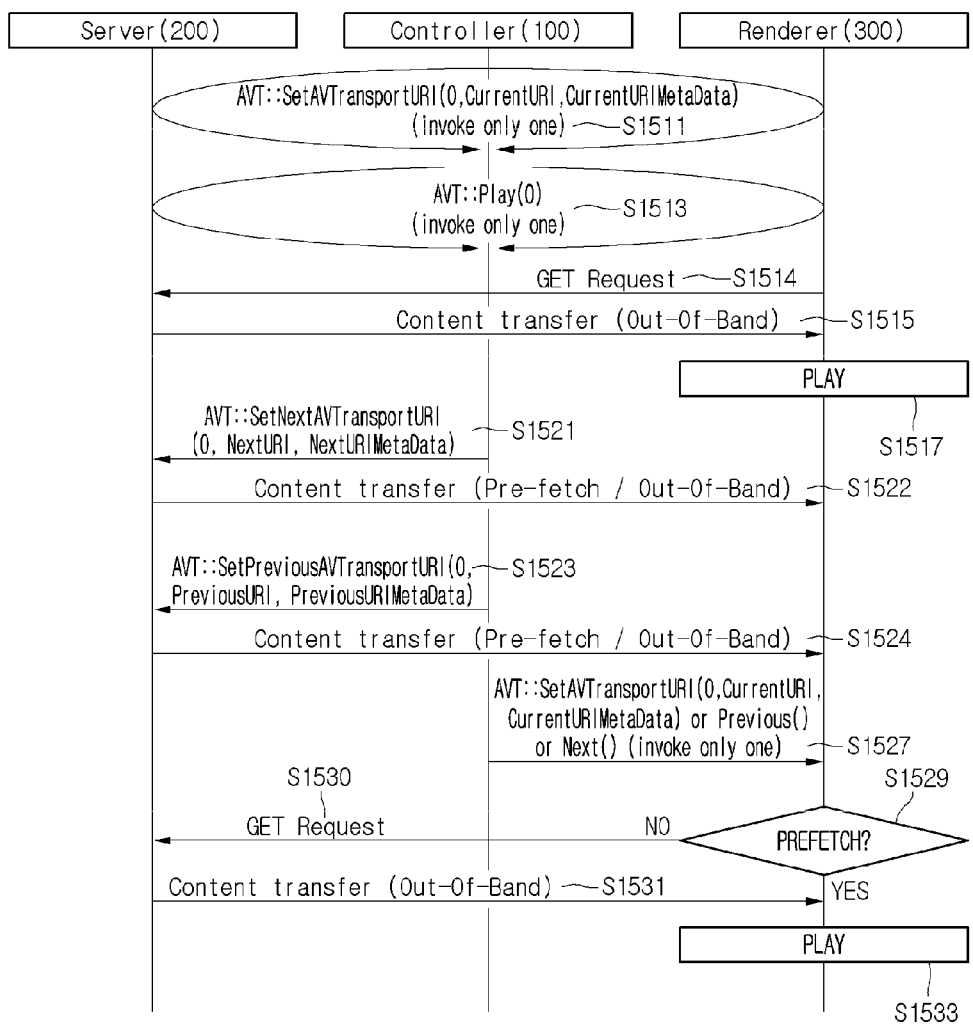
FIG. 17 is a detailed ladder diagram of FIG. 16.

FIG. 17 is a detailed ladder diagram of FIG. 16.

Especially, while FIG. 17 is described, the contents already described with reference to FIG. 4 will not be described.

When receiving a user input for designating a current playback resource, the control point device 100 calls a resource transfer action of a designated current playback resource in operation S1511. The resource transfer action of the current playback resource may correspond to an AVT::SetAVTransportURI( ) action of a UPNP protocol.

The control point device 100 calls the playback action of the designated current playback resource in operation S1513. The playback action of the current playback resource may correspond to an AVT::Play( ) action of a UPNP protocol.

In response to the request of the playback of the designated current playback resource, the media renderer device 300 requests the current playback resource to the media server device 200 in operation S1514. The media renderer device 300 may transmit an HTTP GET request including the resource identifier of the current playback resource to the media server device 200 to request the current playback resource.

The media renderer device 300 receives the designated current playback resource from the media server device 200 in operation S1515.

In response to the request of the playback of the current playback resource or the reception of the current playback resource, the media renderer device 300 plays the received resource in operation S1517.

After the control point device 100 requests the playback of the designated current playback resource, it transmits an AVT::SetNextAVTransportURI( ) action including a next resource identifier as an argument and not including a previous resource identifier as an argument to the media server device 200 in a background during an idle time in operation S1521. The resource prefetch action may include next resource metadata as an argument.

An XML service description of SetNextAVTransportURI, i.e., a next resource prefetch action including a next resource identifier as an argument and not including a previous resource identifier as an argument according to an embodiment of the present invention, will be described below.

```
<?xml>
    <action>
        <name>SetNextAVTransportURI</name>
        <argumentList>
            <argument>
                <name>InstanceID</name>
                <direction>in</direction>
                <relatedStateVariable>A_ARG_TYPE_InstanceID
                </relatedStateVariable>
            </argument>
            <argument>
                <name>NextURI</name>
                <direction>in</direction>
                <relatedStateVariable>NextAVTransportURI
                </relatedStateVariable>
            </argument>
            <argument>
                <name>NextURIMetaData</name>
                <direction>in</direction>
                <relatedStateVariable>NextAVTransportURIMetaData
                </relatedStateVariable>
            </argument>
        </argumentList>
    </action>
```

As shown above, SetNextAVTransportURI, i.e., a next resource prefetch action, according to an embodiment of the present invention may include an instance identifier, a next resource identifier, and next resource metadata, as input arguments. A data type of a next resource identifier argument and a next resource metadata argument may be string. A plurality of input arguments correspond to a plurality of related state variables, respectively.

Hereinafter, an operation of a device receiving a previous resource prefetch action including a previous resource identifier or a multiple resource prefetch action including a previous resource identifier will be described.

Especially, an operation below is mainly described based on a previous resource prefetch action including a previous resource identifier, but may be applied to a multiple resource prefetch action including a previous resource identifier.

According to various embodiments of the present invention, the media server device 200 may receive a previous resource prefetch action, or the media renderer device 300 may receive a previous resource prefetch action, or the control point combined media renderer device 400 may receive a previous resource prefetch action, or the control point combined media server device 500 may receive a previous resource prefetch action.

Hereinafter, the term "device" that does not refer to a specific device covers the media server device 200, the media renderer device 300, the control point combined media renderer device 400, and the control point combined media server device 500, in terms of concept.

If the device receives a valid non-empty previous resource prefetch action, it transfers a value in an argument of the received action to a corresponding instance state variable. In more detail, when the device receives a previous resource prefetch action including a valid non-empty previous resource identifier argument (referred to as PreviousURI argument) and a valid non-empty previous resource metadata argument (referred to as PreviousURIMetaData argument), it transfers a value in the previous resource identifier argument of the received action to a previous resource identifier state variable (for example, PreviousAVTransportURI), and a value in the previous resource metadata argument to a previous resource metadata state variable (for example, PreviousAVTransportURI).

If the media renderer device 300 receives a valid non-empty previous resource prefetch action, it may perform at least one of the following two tasks before providing a response to the received action. As one of the two tasks, the media renderer device 300 transmits to the media server device 200 an HTTP HEAD request for prefetching a previous resource from the media server device 200. As the other of the two tasks, the media renderer device 300 transmits to the media server device 200 a partial HTTP GET request for prefetching a previous resource from the media server device 200.

Especially, the media renderer device 300 receives a valid non-empty previous resource prefetch action, and a previous resource identifier in the previous resource prefetch action identifies contents of an image class. When the media renderer device 300 does not cache an image resource corresponding to the previous resource identifier yet, it may issue an HTTP GET request by using the previous resource identifier in the previous resource prefetch action in order to prefetch the image resource. Moreover, the media renderer device 300 may issue an HTTP GET request by using an alternative resource identifier of previous resource metadata in the previous resource prefetch action in order to prefetch the image resource.

On receiving a previous resource prefetch action including a previous resource identifier identifying an image resource, the device may prefetch the image resource.

Moreover, the media renderer device 300 receives a valid non-empty previous resource prefetch action, and a previous prefetch resource identifier in the previous resource prefetch action identifies contents of an audio class, a video class, or an audio-video (AV) class. When the media renderer device 300 does not cache a previous resource corresponding to the previous resource identifier yet, it may issue an HTTP GET request by using the previous resource identifier in the previous resource prefetch action during a playback of a current playback resource identifier in order to partially or completely prefetch a media resource. Moreover, the media renderer device 300 may issue an HTTP GET request by using an alternative resource identifier of previous resource metadata in the previous resource prefetch action during the playback of the current playback resource identifier in order to partially or completely prefetch the media resource.

On receiving a previous resource prefetch action including a previous resource identifier identifying a media resource corresponding to audio, video, or AV, the device may prefetch the media resource during the playback of the current playback resource identifier.

If the device already includes a previous resource identifier and receives a valid non-empty previous resource prefetch action, it may replace the values of state variables with the values of arguments in a recent previous resource prefetch action.

In more detail, if the device already includes a previous resource identifier and receives a previous resource prefetch action including a valid non-empty previous resource identifier argument and a valid non-empty previous resource metadata argument, it replaces the value of the previous resource identifier state variable with the value of the previous resource identifier argument in the recent previous resource prefetch action, and also the value of the previous resource metadata state variable with the value of the previous resource metadata argument in the recent previous resource prefetch action.

If the device already includes a previous resource identifier and receives an empty previous resource prefetch action, it may clear the state variables relating to the previous resource identifier included already. In more detail, if the device already includes a previous resource identifier and receives a previous resource prefetch action including an empty previous resource identifier argument and an empty previous resource metadata argument, it clears a previous resource identifier state variable relating to the previous resource identifier included already and clears a previous resource metadata state variable relating to the previous resource identifier.

If the device already includes a current playback resource identifier and a previous resource identifier and receives a resource transfer action (for example, an AVT::SetAVTransportURI action) carrying a valid non-empty resource identifier, it may replace information in a current playback resource identifier state variable storing the current playback resource identifier with information in the received resource transfer action. Additionally, the device may clear a previous resource identifier state variable relating to the previous resource identifier included already and may clear a previous resource metadata state variable relating to the previous resource identifier included already.

If the device already includes a current playback resource identifier and a previous resource identifier and receives a resource transfer action (for example, an AVT::SetAVTransportURI action) carrying an empty resource identifier, it may clear a current playback resource identifier state variable storing a current playback resource identifier and may clear at least one state variable relating the previous resource identifier included already. In more detail, the device may clear a previous resource identifier state variable relating to the previous resource identifier included already and may clear a previous resource metadata state variable relating to the previous resource identifier included already. The device clears at least one state variable relating to the previous resource identifier, and then, enters a NO_MEDIA_PRESENT state, i.e., a state where media do not exist.

If the device is in a PLAYING state or a STOPPED state during playback and has a current playback resource identifier and a previous resource identifier, it may allow a previous resource playback action (for example, an AVT:Previous action). The previous resource playback action may be an action for playing at least one previous prefetch resource identifier among a plurality of prefetch resource identifiers.

If the device is in a PAUSED_PLAYBACK state and has a current playback resource identifier and a previous resource identifier, it may allow a previous resource playback action (for example, an AVT:Previous action). The previous resource playback action may be an action for playing at least one previous prefetch resource identifier among a plurality of prefetch resource identifiers.

If the media renderer device 300 allows the use of a previous playback action, it may list a 'Previous' keyword in an AVT.CurrentTransportActions instance state variable.

If the media renderer device 300 has a current resource identifier and a previous resource identifier and receives a previous resource playback action, it may start one playback of resources of a media item relating to the previous resource identifier.

During transition from a current resource to a previous resource, the media renderer device 300 immediately changes from a PLAYING state into a playback state, or from a playback state to a playback state through TRANSITIONING.

If the media renderer device 300 has a current resource identifier and a previous resource identifier in a STOPPED state, allows the use of a previous resource playback action, and receives a previous resource playback action, it transfers the values of previous resource identifier state variables to current resource identifier state variables, clears previous resource identifier state variables, and maintains a STOPPED state.

If the media renderer device 300 has a current resource identifier and a previous resource identifier in a PAUSED_PLAYBACK state, allows the use of a previous resource playback action, and receives a previous resource playback action, it transfers the values of previous resource identifier state variables to current resource identifier state variables, clears previous resource identifier state variables, and maintains a PAUSED_PLAYBACK state.

If the media renderer device 300 does not notify the support for a previous playback action in an AVT.CurrentTransportActions instance state variable and receives a previous playback action, it may reply with an error 711 indicating that transition is unavailable.

If the media renderer device 300 has a current resource identifier, a next resource identifier, and a previous resource identifier and receives a next playback action, it transfers the values of current resource identifier state variables to previous resource identifier state variables, transfers the values of next resource identifier state variables to current resource identifier state variables, and clears the next resource identifier state variables.

If the media renderer device 300 has a current resource identifier, a next resource identifier, and a previous resource identifier and receives a previous playback action, it transfers the values of current resource identifier state variables to next resource identifier state variables, transfers the values of previous resource identifier state variables to current resource identifier state variables, and clears the previous resource identifier state variables.

When an error occurs due to the previous resource prefetch action, the device returns an error code below to the control point device 100.

| Error Code | Error Description | Description |
|---|---|---|
| 402 | Invalid args | Could be any of the following: not enough in args, too many in args, no in arg by that time, one or more in args are of the wrong data type |
| 711 | Transmission not available | When XDMR receives AVT: Previous action even through XDMR does not advertise support for the AVT: Previous action I the AVT. CurrentTransportActions instance state variable |
| 714 | Illegal MIME-type | The specified resource has a MIME-type which is not supported by the AVTransport service |
| 715 | Content 'BUSY' | The indicates the resource is already being played by other means. The actual implementation might detect through HTTP Busy, and returns this error code |

| Error<br>Code | Error<br>Description | Description |
|---|---|---|
| 716 | Resource not found | The specified resource cannot be found in the network |
| 718 | Invalid InstanceID | The specified instanceID is invalid for this AVTransport |

In response to the next resource prefetch action, the media renderer device 300 may prefetch a next resource that the media server device 200 pushes without requesting the next resource to the media server device 200 in operation S1522.

After the control point device 100 requests the playback of the designated current playback resource, it transmits an AVT::SetPreviousAVTransportURI( ) action including a previous resource identifier as an argument and not including a next resource identifier as an argument to the media server device 200 in a background during an idle time in operation S1523. The resource prefetch action may include previous resource metadata as an argument.

An XML service description of SetPreviousAVTransportURI i.e., a previous resource prefetch action including a previous resource identifier as an argument and not including a next resource identifier as an argument according to an embodiment of the present invention, will be described below.

```
<?xml>
    <action>
        <name>SetPreviousAVTransportURI</name>
        <argumentList>
            <argument>
                <name>InstanceID</name>
                <direction>in</direction>
                <relatedStateVariable>A_ARG_TYPE_InstanceID
                </relatedStateVariable>
            </argument>
            <argument>
                <name>PreviousURI</name>
                <direction>in</direction>
                <relatedStateVariable>PreviousAVTransportURI
                </relatedStateVariable>
            </argument>
            <argument>
                <name>PreviousURIMetaData</name>
                <direction>in</direction>
                <relatedStateVariable>PveviousAVTransportURIMetaData
                </relatedStateVariable>
            </argument>
        </argumentList>
</action>
```

As shown above, SetPreviousAVTransportURI, i.e., a previous resource prefetch action, according to an embodiment of the present invention may include an instance identifier, a previous resource identifier, and previous resource metadata, as input arguments. A data type of a previous resource identifier argument and a previous resource metadata argument may be string. A plurality of input arguments correspond to a plurality of related state variables, respectively.

Again, FIG. 17 will be described.

In response to the previous resource prefetch action, the media renderer device 300 may prefetch a previous resource that the media server device 200 pushes without requesting the previous resource to the media server device 200 in operation S1524.

When receiving a user input for designating the next playback resource different from a current resource, the control point device 100 transmits a resource playback action to the media renderer device 300 to play the next playback resource in operation S1527. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a prefetched previous resource and next resource in operation S1529.

When the next playback resource does not belong to the prefetched previous resource and next resource, the media renderer device 300 transmits an HTTP GET request requesting a next playback resource to the media server device 200 in operation S1530, receives the next playback resource from the media server device 200 in operation S1531, and plays the received next playback resource in operation S1533.

When the next playback resource belongs to the prefetched previous resource and next resource, the media renderer device 300 plays the next playback resource without a procedure of receiving the next playback resource from the media server device 200 again in operation S1533.

Figure 18:
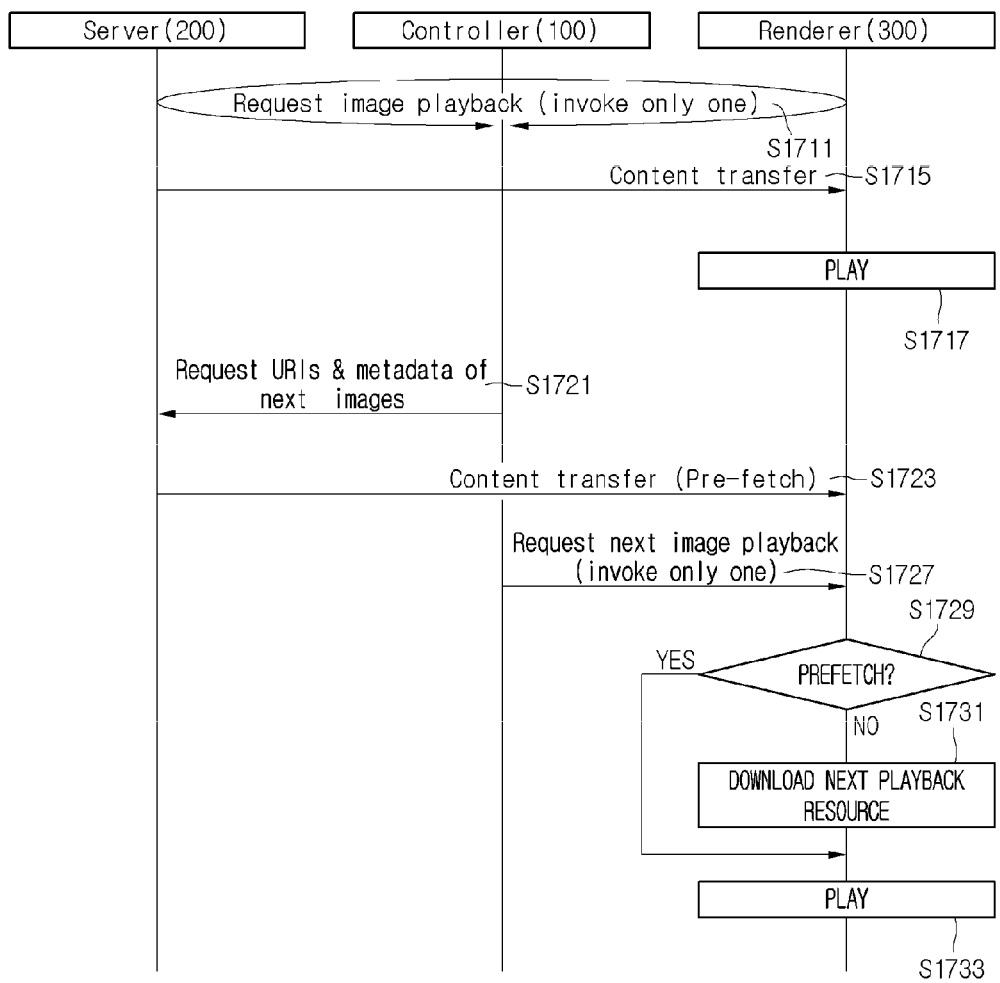
FIG. 18 is a ladder diagram illustrating an operating method of prefetching a multiple resource by using a multiple resource prefetch action including a plurality of prefetch resource identifiers in a 3-box PUSH model according to an embodiment of the present invention.

FIG. 18 is a ladder diagram illustrating an operating method of prefetching a multiple resource by using a multiple resource prefetch action including a plurality of prefetch resource identifiers in a 3-box PUSH model according to an embodiment of the present invention.

Especially, while FIG. 18 is described, the contents already described with reference to FIG. 4 will not be described.

When receiving a user input for designating a current playback resource, the control point device 100 requests the playback of the designated current playback resource to the media renderer device 300 and the media server device 200 in operation S1711.

In response to the playback request of the designated current playback resource, the media renderer device 300 receives the designated current playback resource from the media server device 200 in operation S1715.

In response to the playback request of the current playback resource or the reception of the current playback resource, the media renderer device 300 plays the received resource in operation S1717.

After the control point device 100 requests the playback of the designated current playback resource, it transmits a multiple resource prefetch action including a plurality of prefetch resource identifiers as arguments to the media server device 200 in a background during an idle time in operation S1721. The multiple resource prefetch action may include a plurality of prefetch resource metadata as arguments.

In response to the multiple resource prefetch action, the media renderer device 300 may prefetch a plurality of prefetch resources that the media server device 200 pushes without requesting the plurality of prefetch resources to the media server device 200 in operation S1723.

When receiving a user input for designating the next playback resource different from a current resource, the control point device 100 transmits a resource playback action to the media renderer device 300 to play the next playback resource in operation S1727.

In response to the resource playback action of the next playback resource, the media renderer device 300 checks whether the next playback resource belongs to a plurality of prefetch resources in operation S1729.

When the next playback resource does not belong to the plurality of prefetch resources, the media renderer device 300 receives the next playback resource from the media server device 200 in operation S1731, and plays the received next playback resource in operation S1733.

When the next playback resource belongs to the plurality of prefetch resources, the media renderer device 300 plays the next playback resource without a procedure of receiving the next playback resource from the media server device 200 in operation S1733.

Figure 19:
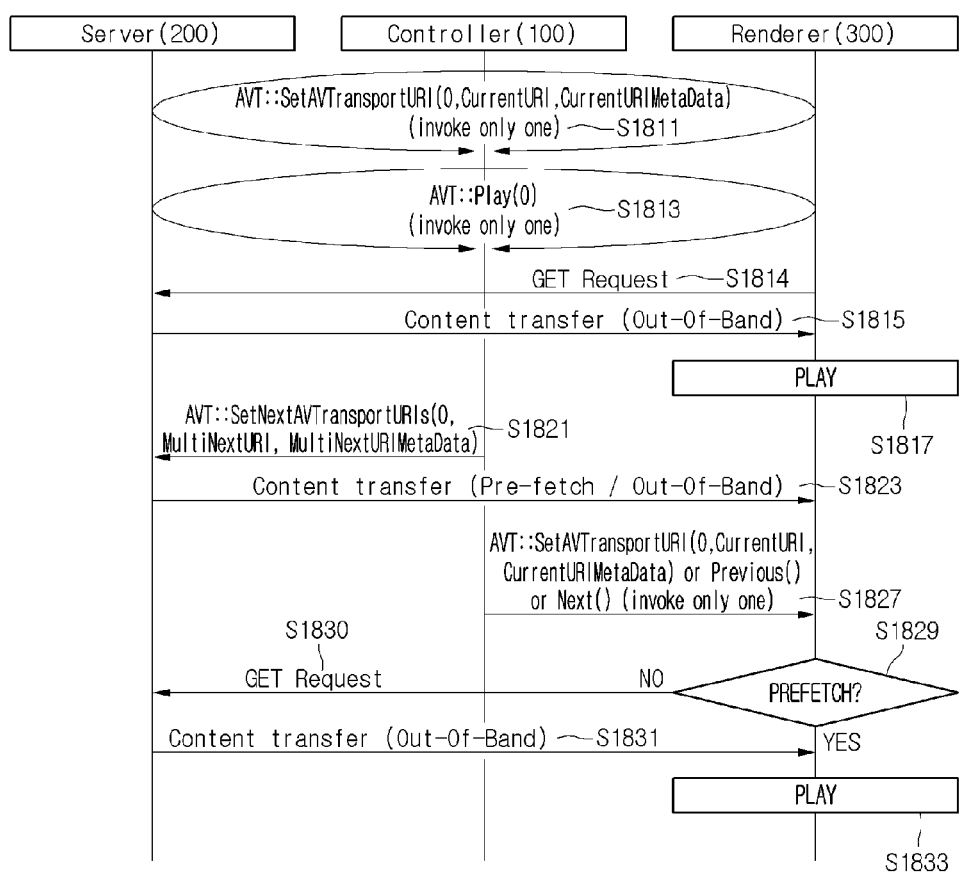
FIG. 19 is a detailed ladder diagram of FIG. 18.

FIG. 19 is a detailed ladder diagram of FIG. 18.

Especially, while FIG. 19 is described, the contents already described with reference to FIG. 4 will not be described.

When receiving a user input for designating a current playback resource, the control point device 100 calls a resource transfer action of a designated current playback resource in operation S1811. The resource transfer action of the current playback resource may correspond to an AVT::SetAVTransportURI( ) action of a UPNP protocol.

The control point device 100 calls the playback action of the designated current playback resource in operation S1813. The playback action of the current playback resource may correspond to an AVT::Play( ) action of a UPNP protocol.

In response to the playback request of the designated current playback resource, the media renderer device 300 requests the current playback resource to the media server device 200 in operation S1814. The media renderer device 300 may transmit an HTTP GET request including the resource identifier of the current playback resource to the media server device 200 to request the current playback resource.

The media renderer device 300 receives the designated current playback resource from the media server device 200 in operation S1815.

In response to the playback request of the current playback resource or the reception of the current playback resource, the media renderer device 300 plays the received resource in operation S1817.

After the control point device 100 requests the playback of the designated current playback resource, it transmits an AVT::SetNextAVTransportURIs( ) action including a plurality of prefetch resource identifiers as arguments to the media server device 200 in a background during an idle time in operation S1821. The multiple resource prefetch action may include a plurality of prefetch resource metadata as arguments.

When an error occurs due to the multiple resource prefetch action, the device receiving the multiple resource prefetch action returns an error code below to the control point device 100.

| Error Code | Error Description | Description |
|---|---|---|
| 402 | Invalid args | Could be any of the following: not enough in args, too many in args, no in arg by that time, one or more in args are of the wrong data type |
| 718 | Invalid instanceID | The specified instanceID is invalid for this AVTransport |
| 724 | Device authentication failure | The action railed because of a device authentication failure between the media source device and the media sink device |
| 725 | Device revocation | The action failed because either the media source device or the media sink device has been revoked. |
| 752 | Not Prefetched Some Resources | Some Resources are not prefetched |
| 753 | Not Supported Device | Device does not support this action |

An XML service description of SetNextAVTransportURIs, i.e., a multiple resource prefetch action including a plurality of prefetch resource identifiers as arguments according to an embodiment of the present invention, will be described below.

```
<?xml>
    <action>
        <name>SetNextAVTransportURIs</name>
        <argumentList>
            <argument>
                <name>InstanceID</name>
                <direction>in</direction>
                <relatedStateVariable>A_ARG_TYPE_InstanceID
                </relatedStateVariable>
            </argument>
            <argument>
                <name>MultiNextURI</name>
                <direction>in</direction>
                <relatedStateVariable>MultiNextAVTransportURI
                </relatedStateVariable>
            </argument>
```

```
            <argument>
                <name>MultiNextURIMetaData</name>
                <direction>in</direction>
                <relatedStateVariable>MultiNextAVTransportURIMetaData
                </relatedStateVariable>
            </argument>
            <argument>
                <name>MultiNextURIResult</name>
                <direction>out</direction>
                <relatedStateVariable>MultiNextAVTransportURIResult
                </relatedStateVariable>
            </argument>
        </argumentList>
    </action>
```

As shown above, SetNextAVTransportURIs, i.e., a multiple resource prefetch action, according to an embodiment of the present invention may include an instance identifier, a multi prefetch resource identifier, and multi prefetch resource metadata, as input arguments. Additionally, a multiple prefetch resource identifier result may be included as an output argument of SetNextAVTransportURIs, i.e., the multiple resource prefetch action according to an embodiment of the present invention. A data type of a multi prefetch resource identifier result argument, a multi prefetch resource metadata argument, and a multiple prefetch resource identifier result argument may be string. The plurality of input and output arguments correspond to a plurality of related state variables, respectively.

Especially, a data type of the multi prefetch resource identifier argument may be string in CSV format or string in XML document format.

An example of the multi prefetch resource identifier argument of a string type in CSV format is shown below.

```
http://hostname/image-content/image1.jpg,http://hostname/image-
content/image2.jpg, http://hostname/image-content/image\,3.jpg
```

The multi prefetch resource identifier argument of a string type in CSV format includes a plurality of prefetch resource identifiers separated by a delimiter such as comma. When some of the plurality of prefetch resource identifiers include a delimiter such as comma, they are distinguished from an actual delimiter by combining an alternative character and the delimiter.

An example of a string type in XML document format that the multi prefetch resource identifier argument has is shown below.

An example of the multi prefetch resource identifier argument of a string type in XML document format is shown below.

```
<?xml version="1.0" encoding="UTF-8"?>
<prefetchURIs
        xmlns="urn:schemas-upnp-org:av:XXX"
        xmlns:xsd=http://www.w3.org/2001/XMLSchema
        xmlns:xsi=http://www.w3.org/2001/XMLSchema-instance
        xsi:schemaLocation="urn:schemas-upnp-org:av:XXX
        http://www.upnp.org/schemas/av/XXX.xsd">
    <numberOfURIs> 3 </numberOfURIs>
    <prefetchedURIInfo order = 1 supportMetadata = "Yes" >
    <uriValue> http://hostname/image-content/image1.jpg </uriValue>
    </prefetchedURIInfo>
    <prefetchedURIInfo order = 2 supportMetadata = "No" >
    <uriValue> http://hostname/image-content/image2.jpg </uriValue>
    </prefetchedURIInfo>
    <prefetchedURIInfo order = 3 supportMetadata = "Yes" >
    <uriValue> http://hostname/image-content/image,3.jpg </uriValue>
    </prefetchedURIInfo>
</prefetchURIs>
```

As shown above, the multi prefetch resource identifier argument of a string type in XML document format may include a namespace of UPnP AV service, an XML schema namespace of W3C, the position of an AV schema file, information on the number of a plurality of prefetch resource identifiers, order information on each prefetch resource identifier, information on whether to support metadata of each prefetch resource identifier, and a plurality of prefetch resource identifiers.

Especially, a data type of the multi prefetch resource identifier argument may be string in DIDL-Lite XML Fragment format of UPnP AV:CDS, string in CSV format, or string in XML document format.

```
<?xml version="1.0" encoding="UTF-8"?>
<prefetchURIs
        xmlns="urn:schemas-upnp-org:av:XXX"
        xmlns:xsd=http://www.w3.org/2001/XMLSchema
        xmlns:xsi=http://www.w3.org/2001/XMLSchema-instance
        xsi:schemaLocation="urn:schemas-upnp-org:av:XXX
        http://www.upnp.org/schemas/av/XXX.xsd">
    <numberOfURIs> number of prefeteched resources </numberOfURIs>
    <prefetchedURIInfo order = "the order of the prefeteched resource"
    supportMetadata = "Yes | No">
    <uriValue> URI value for a prefeteched resource </uriValue>
    </prefetchedURIInfo>
    <!-- Other prefeteched URIInfos go here -->
</prefetchURIs>
```

An example of the multi prefetch resource metadata argument in DIDL-Lite XML Fragment format of UPnP AV:CDS is shown below.

```
<?xml version="1.0" encoding="UTF-8"?>
<DIDL-Lite xmlns:dc="http://purl.org/dc/elements/1.1/"
        xmlns="urn:schemas-upnp-org:metadata-1-0/DIDL-Lite/"
        xmlns:upnp="urn:schemas-upnp-org:metadata-1-0/upnp/"
        xmlns:xsi="http://www.w3.org/2001/XMLSchema-instance"
        xsi:schemaLocation="urn:schemas-upnp-org:metadata-1-0/DIDL-Lite/
        http://www.upnp.org/schemas/av/didl-lite.xsd
        urn:schemas-upnp-org:metadata-1-0/upnp/
        http://www.upnp.org/schemas/av/upnp.xsd">
    <item id="1" parentID="13" restricted="0">
            <dc:title>Image1</dc:title>
    </item>
    <item id="2" parentID="13" restricted="0">
            <dc:title>Image2</dc:title>
    </item>
    <item id="3" parentID="13" restricted="0">
            <dc:title>Image3</dc:title>
    </item>
</DIDL-Lite>
```

The multi prefetch resource metadata argument in CSV format may include metadata of all prefetch resources regardless of supporting metadata.

The multi prefetch resource metadata argument in XML document format may include metadata of a prefetch resource supporting metadata.

A device receiving a multiple resource prefetch action notifies the prefetch availability on a plurality of prefetch resources to a control point device through a multiple prefetch resource identifier result argument.

A data type of the multi prefetch resource identifier result argument may be string in XML document format.

An XML document format that the multi prefetch resource identifier result argument has is shown below.

```
<?xml version="1.0" encoding="UTF-8"?>
<prefetchURIs
        xmlns="urn:schemas-upnp-org:av:XXX"
        xmlns:xsd=http://www.w3.org/2001/XMLSchema
        xmlns:xsi=http://www.w3.org/2001/XMLSchema-instance
        xsi:schemaLocation="urn:schemas-upnp-org:av:XXX
        http://www.upnp.org/schemas/av/XXX.xsd">
    <numberOfURIs> number of prefeteched resources
    </numberOfURIs>
    <prefetchedResult order = "the order of the prefeteched resource">
            <prfetchSuccess> No error </prefetchSuccess>
            <prefetchError>
                <errorCode> error code </errorCode>
                <errorDescription> error string </errorDescription>
            </prefetchError>
    </prefetchedResult>
    <!-- Other prefetechedURIInfos go here -->
</prefetchURIs>
```

An example of the multi prefetch resource identifier factor argument of a string type in XML document format is shown below.

```
<?xml version="1.0" encoding="UTF-8"?>
<prefetchURIs
        xmlns="urn:schemas-upnp-org:av:XXX"
        xmlns:xsd=http://www.w3.org/2001/XMLSchema
        xmlns:xsi=http://www.w3.org/2001/XMLSchema-instance
        xsi:schemaLocation="urn:schemas-upnp-org:av:XXX
        http://www.upnp.org/schemas/av/XXX.xsd">
    <numberOfURIs> 3 </numberOfURIs>
```

-continued

```
    <prefetchedResult order = "1">
        <prfetchSuccess> No error </prefetchSuccess>
    </prefetchedResult>
    <prefetchedResult order = "2"</prefetchSuccess>
        <prfetchError>
            <errorCode> 719 </errorCode>
            <errorDescription> DRM error </errorDescription>
        </prefetchError>
    </prefetchedResult>
    <prefetchedResult order = "3">
        <prfetchError>
            <errorCode> 777 </errorCode>
            <errorDescription> Too big file </errorDescription>
        </prefetchError>
    </prefetchedResult>
</prefetchURIs>
```

As shown above, the multi prefetch resource identifier result argument of a string type in XML document format may include a namespace of UPnP AV service, an XML schema namespace of W3C, the position of an AV schema file, information on the number of a plurality of prefetch resource identifiers, order information on each prefetch resource identifier, information on the prefetch availability of each prefetch resource identifier, and information on the reason of prefetch unavailability.

In response to the multiple resource prefetch action, the media renderer device 300 may prefetch a plurality of prefetch resources that the media server device 200 pushes without requesting the plurality of prefetch resources to the media server device 200 in operation S1823.

When receiving a user input for designating the next playback resource different from a current resource, the control point device 100 transmits a resource playback action to the media renderer device 300 to play the next playback resource in operation S1827. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a plurality of prefetch resources in operation S1829.

When the next playback resource does not belong to the plurality of prefetch resources, the media renderer device 300 transmits an HTTP GET request requesting a next playback resource to the media server device 200 in operation S1830, receives the next playback resource from the media server device 200 in operation S1831, and plays the received next playback resource in operation S1833.

When the next playback resource belongs to the plurality of prefetch resources, the media renderer device 300 plays the next playback resource without a procedure of receiving the next playback resource from the media server device 200 in operation S1833.

Figure 20:
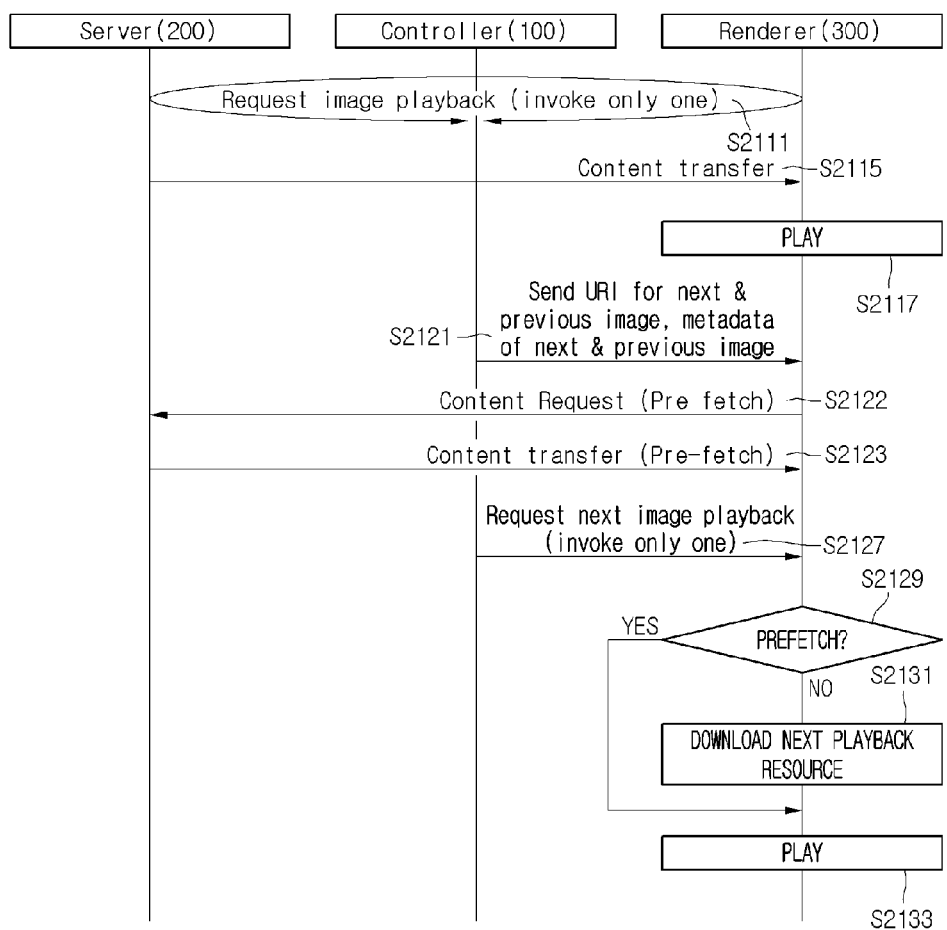
FIG. 20 is a ladder diagram illustrating an operating method of prefetching a multiple resource by using a multiple resource prefetch action including all of a previous resource identifier and a next resource identifier in a 3-box PULL model according to an embodiment of the present invention.

FIG. 20 is a ladder diagram illustrating an operating method of prefetching a multiple resource by using a multiple resource prefetch action including all of a previous resource identifier and a next resource identifier in a 3-box PULL model according to an embodiment of the present invention.

Especially, while FIG. 20 is described, the contents already described with reference to FIG. 4 will not be described.

When receiving a user input for designating a current playback resource, the control point device 100 requests the playback of the designated current playback resource to the media renderer device 300 and the media server device 200 in operation S2111.

In response to the playback request of the designated current playback resource, the media renderer device 300 receives the designated current playback resource from the media server device 200 in operation S2115.

In response to the playback request of the current playback resource or the reception of the current playback resource, the media renderer device 300 plays the received resource in operation S2117.

After the control point device 100 requests the playback of the designated current playback resource, it transmits a multiple resource prefetch action including a previous resource identifier and a next resource identifier as arguments to the media renderer device 300 in a background during an idle time in operation S2121. The multiple resource prefetch action may include previous resource metadata and next resource metadata as arguments.

In response to the multiple resource prefetch action, the media renderer device 300 requests a previous resource and a next resource to the media server device 200 in operation S2122 and then, prefetches the previous resource and the next resource that the media server device 200 provides in operation S2123.

When receiving a user input for designating the next playback resource different from a current resource, the control point device 100 transmits a resource playback action to the media renderer device 300 to play the next playback resource in operation S2127.

In response to the resource playback action of the next playback resource, the media renderer device 300 checks whether the next playback resource belongs to a prefetched previous resource and next resource in operation S2129.

When the next playback resource does not belong to the prefetched previous resource and next resource, the media renderer device 300 receives the next playback resource from the media server device 200 in operation S2131, and plays the received next playback resource in operation S2133.

When the next playback resource belongs to the prefetched previous resource and next resource, the media renderer device 300 plays the next playback resource without a procedure of receiving the next playback resource from the media server device 200 again in operation S2133.

Figure 21:
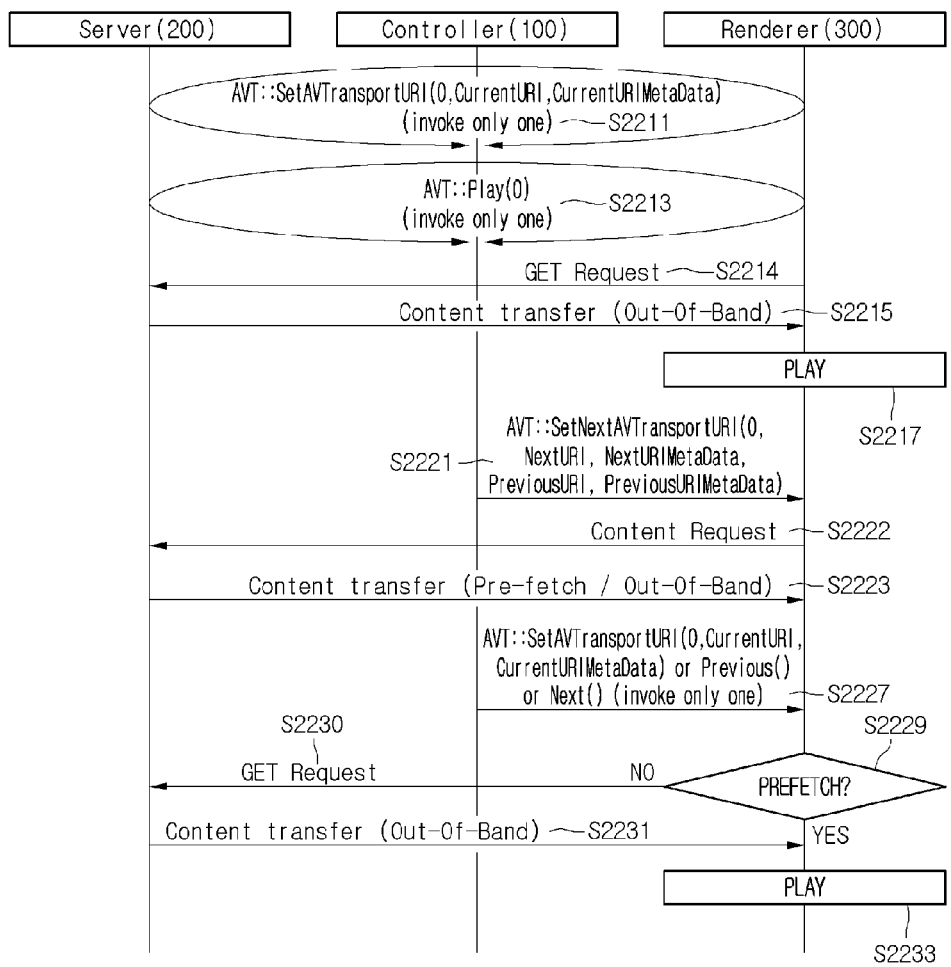
FIG. 21 is a detailed ladder diagram of FIG. 20.

FIG. 21 is a detailed ladder diagram of FIG. 20.

Especially, while FIG. 21 is described, the contents already described with reference to FIG. 4 will not be described.

When receiving a user input for designating a current playback resource, the control point device 100 calls a resource transfer action of a designated current playback resource in operation S2211. The resource transfer action of the current playback resource may correspond to an AVT::SetAVTransportURI( ) action of a UPNP protocol.

The control point device 100 calls the playback action of the designated current playback resource in operation 52213. The playback action of the current playback resource may correspond to an AVT::Play( ) action of a UPNP protocol.

In response to the playback request of the designated current playback resource, the media renderer device 300 requests the current playback resource to the media server device 200 in operation S2214. The media renderer device 300 may transmit an HTTP GET request including the resource identifier of the current playback resource to the media server device 200 to request the current playback resource.

The media renderer device 300 receives the designated current playback resource from the media server device 200 in operation S2215.

In response to the playback request of the current playback resource or the reception of the current playback resource, the media renderer device 300 plays the received resource in operation S2217.

After the control point device 100 requests the playback of the designated current playback resource, it transmits an AVT::SetNextAVTransportURI( ) action including a previous resource identifier and a next resource identifier as arguments to the media renderer device 300 in a background during an idle time in operation S1221. The multiple resource prefetch action may include previous resource metadata and next resource metadata as arguments.

In response to the multiple resource prefetch action, the media renderer device 300 requests a previous resource and a next resource to the media server device 200 in operation S2222 and prefetches a plurality of prefetch resources that the media server device 200 transmits in operation S2223.

When receiving a user input for designating the next playback resource different from a current resource, the control point device 100 transmits a resource playback action to the media renderer device 300 to play the next playback resource in operation S2227. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a prefetched previous resource and next resource in operation S2229.

When the next playback resource does not belong to the prefetched previous resource and next resource, the media renderer device 300 transmits an HTTP GET request requesting a next playback resource to the media server device 200 in operation S2230, receives the next playback resource from the media server device 200 in operation S2231, and plays the received next playback resource in operation S2233.

When the next playback resource belongs to the prefetched previous resource and next resource, the media renderer device 300 plays the next playback resource without a procedure of receiving the next playback resource from the media server device 200 again in operation S2233.

Figure 22:
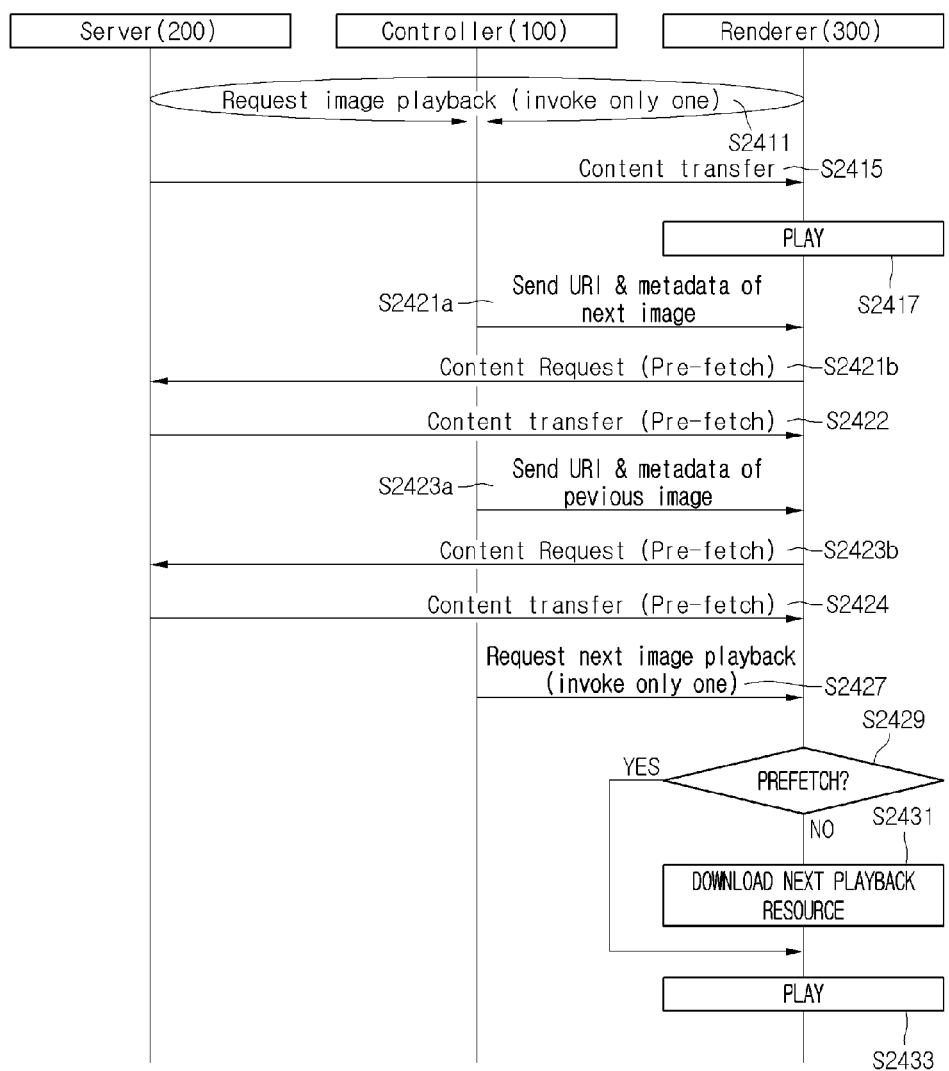
FIG. 22 is a ladder diagram illustrating an operating method of prefetching a multiple resource by using a resource prefetch action including only a previous resource identifier and a resource prefetch action including only a next resource identifier in a 3-box PULL model according to an embodiment of the present invention.

FIG. 22 is a ladder diagram illustrating an operating method of prefetching a multiple resource by using a resource prefetch action including only a previous resource identifier and a resource prefetch action including only a next resource identifier in a 3-box PULL model according to an embodiment of the present invention.

Especially, while FIG. 22 is described, the contents already described with reference to FIG. 4 will not be described.

When receiving a user input for designating a current playback resource, the control point device 100 requests the playback of the designated current playback resource to the media renderer device 300 and the media server device 200 in operation S2411.

In response to the playback request of the designated current playback resource, the media renderer device 300 receives the designated current playback resource from the media server device 200 in operation S2415.

In response to the playback request of the current playback resource or the reception of the current playback resource, the media renderer device 300 plays the received resource in operation S2417.

After the control point device 100 requests the playback of the designated current playback resource, it transmits a next resource prefetch action including only a next resource identifier as an argument to the media renderer device 300 in a background during an idle time in operation S2421a. The resource prefetch action may include next resource metadata as an argument.

In response to the next resource prefetch action, the media renderer device 300 requests the next resource to the media server device 200 in operation S2421b and then prefetches the next resource that the media server device 200 transmits in operation S2422.

After the control point device 100 requests the playback of the designated current playback resource, it transmits a previous resource prefetch action including only a previous resource identifier as an argument to the media renderer device 300 in a background during an idle time in operation S2423a. The resource prefetch action may include previous resource metadata as an argument.

In response to the previous resource prefetch action, the media renderer device 300 requests a previous resource to the media server device 200 in operation S2423b, and prefetches the previous source that the media server device 200 transmits in operation S2424.

When receiving a user input for designating the next playback resource different from a current resource, the control point device 100 transmits a resource playback action to the media renderer device 300 to play the next playback resource in operation S2427.

In response to the resource playback action of the next playback resource, the media renderer device 300 checks whether the next playback resource belongs to a prefetched previous resource and next resource in operation S2429.

When the next playback resource does not belong to the prefetched previous resource and next resource, the media renderer device 300 receives the next playback resource from the media server device 200 in operation S2431, and plays the received next playback resource in operation S2433.

When the next playback resource belongs to the prefetched previous resource and next resource, the media renderer device 300 plays the next playback resource without a procedure of receiving the next playback resource from the media server device 200 again in operation S2433.

Figure 23:
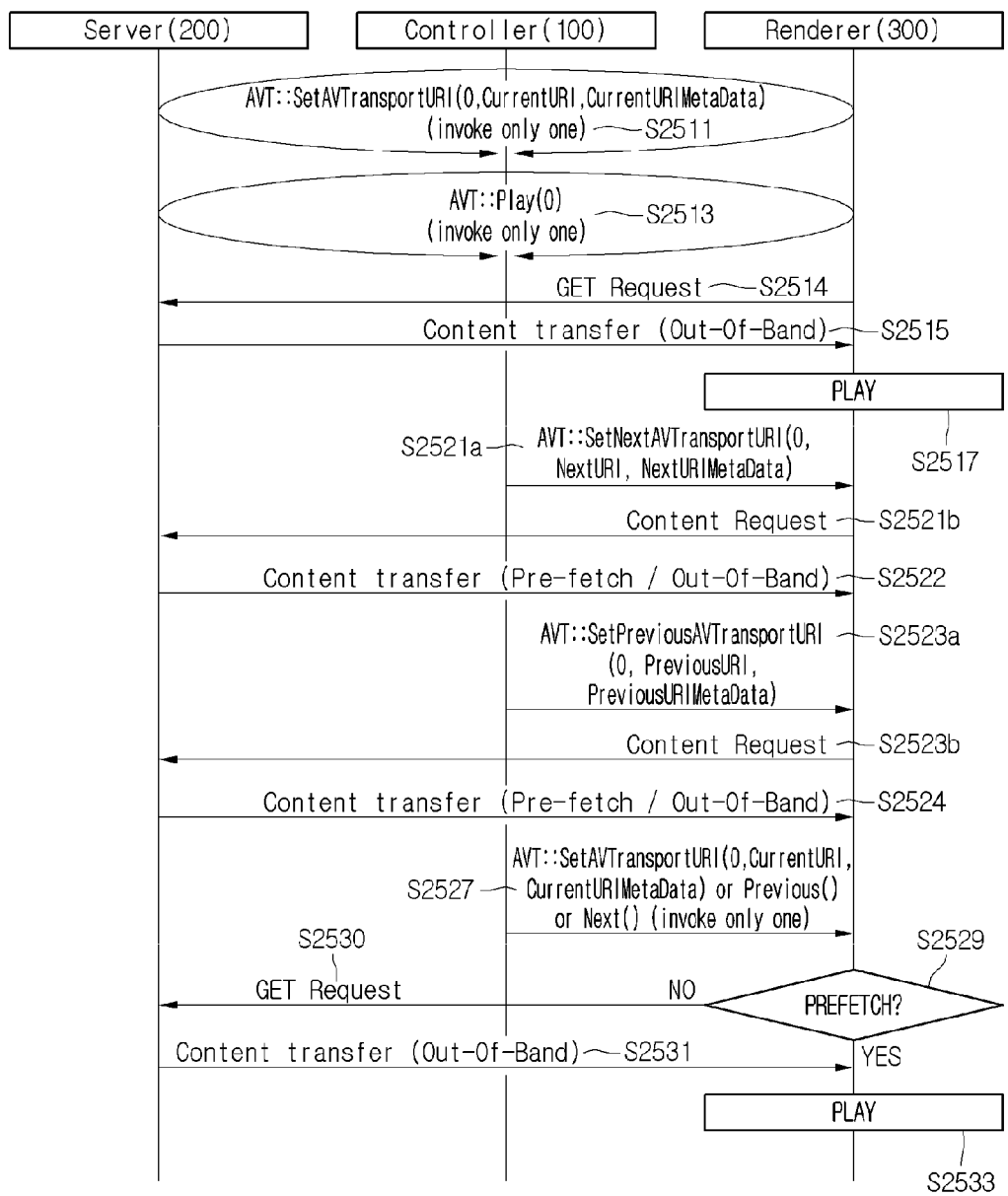
FIG. 23 is a detailed ladder diagram of FIG. 22.

FIG. 23 is a detailed ladder diagram of FIG. 22.

Especially, while FIG. 23 is described, the contents already described with reference to FIG. 4 will not be described.

Especially, while FIG. 23 is described, the contents already described with reference to FIG. 17 will not be described.

When receiving a user input for designating a current playback resource, the control point device 100 calls a resource transfer action of a designated current playback resource in operation S2511. The resource transfer action of the current playback resource may correspond to an AVT::SetAVTransportURI( ) action of a UPNP protocol.

The control point device 100 calls the playback action of the designated current playback resource in operation 52513. The playback action of the current playback resource may correspond to an AVT::Play( ) action of a UPNP protocol.

In response to the playback request of the designated current playback resource, the media renderer device 300 requests the current playback resource to the media server device 200 in operation S2514. The media renderer device 300 may transmit an HTTP GET request including the resource identifier of the current playback resource to the media server device 200 to request the current playback resource.

The media renderer device 300 receives the designated current playback resource from the media server device 200 in operation S2515.

In response to the playback request of the current playback resource or the reception of the current playback resource, the media renderer device 300 plays the received resource in operation S2517.

After the control point device 100 requests the playback of the designated current playback resource, it transmits an AVT::SetNextAVTransportURI( ) action including only a next resource identifier as an argument to the media renderer device 300 in a background during an idle time in operation S2521a. The resource prefetch action may include next resource metadata as an argument.

In response to the next resource prefetch action, the media renderer device 300 requests the next resource to the media server device 200 in operation S2521b and then prefetches the next resource that the media server device 200 transmits in operation S2522.

After the control point device 100 requests the playback of the designated current playback resource, it transmits an AVT::SetPreviousAVTransportURI( ) action including only a previous resource identifier as an argument to the media renderer device 300 in a background during an idle time in operation S2523a. The resource prefetch action may include previous resource metadata as an argument.

In response to the previous resource prefetch action, the media renderer device 300 requests a previous resource to the media server device 200 in operation S2523b, and prefetches the previous source that the media server device 200 transmits in operation S2524.

When receiving a user input for designating the next playback resource different from a current resource, the control point device 100 transmits a resource playback action to the media renderer device 300 to play the next playback resource in operation S2527. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a prefetched previous resource and next resource in operation S2529.

When the next playback resource does not belong to the prefetched previous resource and next resource, the media renderer device 300 transmits an HTTP GET request requesting a next playback resource to the media server device 200 in operation S2530, receives the next playback resource from the media server device 200 in operation S2531, and plays the received next playback resource in operation S2533.

When the next playback resource belongs to the prefetched previous resource and next resource, the media renderer device 300 plays the next playback resource without a procedure of receiving the next playback resource from the media server device 200 again in operation S2533.

Figure 24:
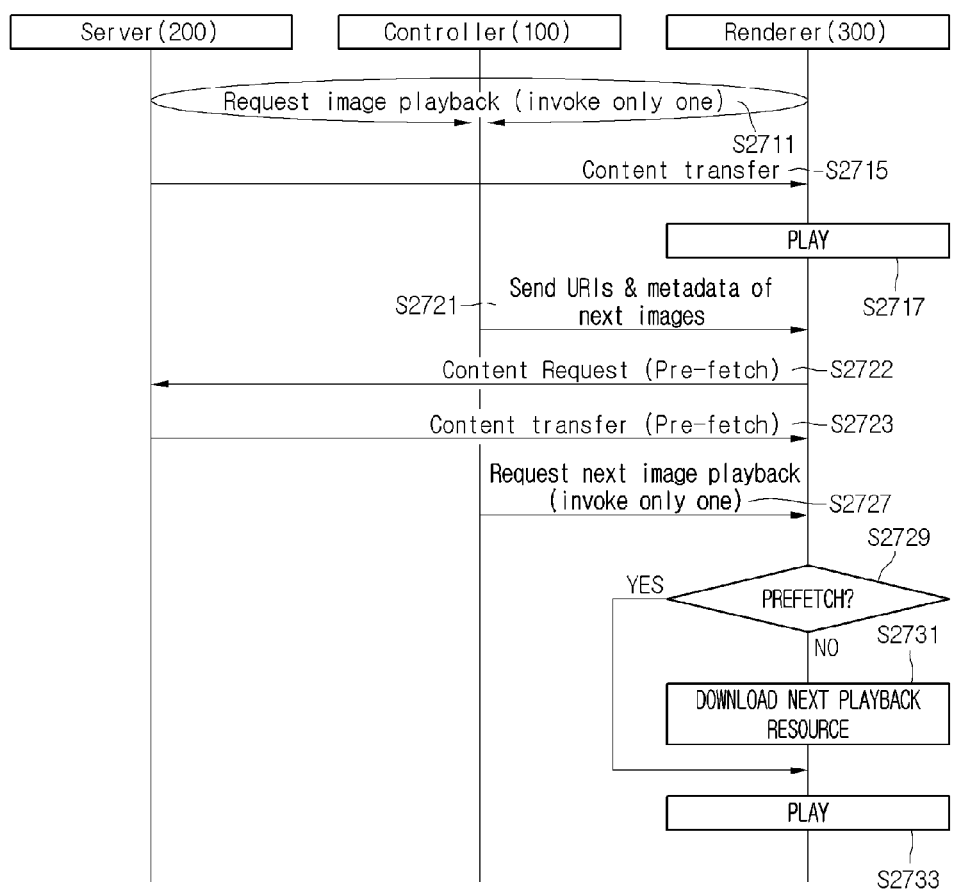
FIG. 24 is a ladder diagram illustrating an operating method of prefetching a multiple resource by using a multiple resource prefetch action including a plurality of prefetch resource identifiers in a 3-box PULL model according to an embodiment of the present invention.

FIG. 24 is a ladder diagram illustrating an operating method of prefetching a multiple resource by using a multiple resource prefetch action including a plurality of prefetch resource identifiers in a 3-box PULL model according to an embodiment of the present invention.

Especially, while FIG. 24 is described, the contents already described with reference to FIG. 4 will not be described.

When receiving a user input for designating a current playback resource, the control point device 100 requests the playback of the designated current playback resource to the media renderer device 300 and the media server device 200 in operation S2711.

In response to the playback request of the designated current playback resource, the media renderer device 300 receives the designated current playback resource from the media server device 200 in operation S2715.

In response to the playback request of the current playback resource or the reception of the current playback resource, the media renderer device 300 plays the received resource in operation S2717.

After the control point device 100 requests the playback of the designated current playback resource, it transmits a multiple resource prefetch action including a plurality of prefetch resource identifiers as arguments to the media renderer device 300 in a background during an idle time in operation S2721. The multiple resource prefetch action may include a plurality of prefetch resource metadata as arguments.

In response to the multiple resource prefetch action, the media renderer device 300 requests a plurality of prefetch resources to the media server device 200 in operation S2722, and then, prefetches the plurality of prefetch resources that the media server device 200 transmits in operation S2723.

When receiving a user input for designating the next playback resource different from a current resource, the control point device 100 transmits a resource playback action to the media renderer device 300 to play the next playback resource in operation S2727.

In response to the resource playback action of the next playback resource, the media renderer device 300 checks whether the next playback resource belongs to a plurality of prefetch resources in operation S2729.

When the next playback resource does not belong to the plurality of prefetch resources, the media renderer device 300 receives the next playback resource from the media server device 200 in operation S2731, and plays the received next playback resource in operation S2733.

When the next playback resource belongs to the plurality of prefetch resources, the media renderer device 300 plays the next playback resource without a procedure of receiving the next playback resource from the media server device 200 in operation S2733.

Figure 25:
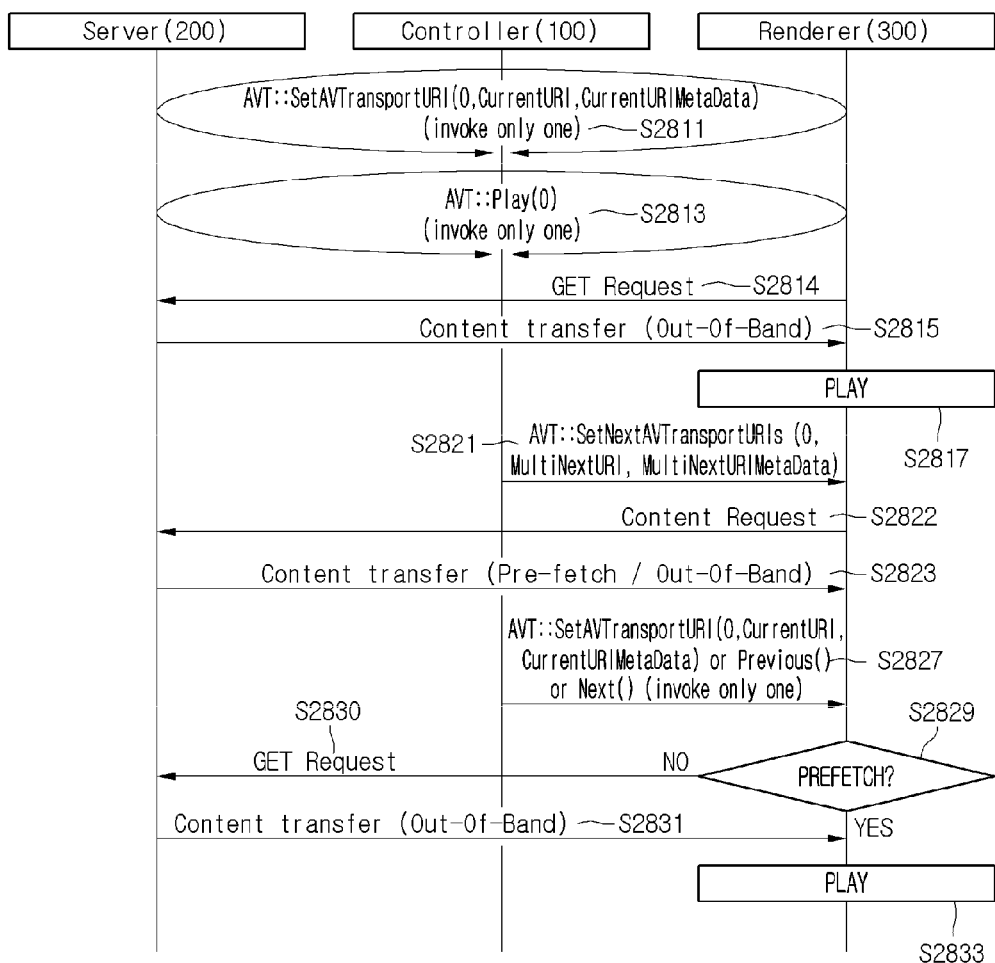
FIG. 25 is a detailed ladder diagram of FIG. 24.

FIG. 25 is a detailed ladder diagram of FIG. 24.

Especially, while FIG. 25 is described, the contents already described with reference to FIG. 4 will not be described.

Especially, while FIG. 25 is described, the contents already described with reference to FIG. 19 will not be described.

When receiving a user input for designating a current playback resource, the control point device 100 calls a resource transfer action of a designated current playback resource in operation S2811. The resource transfer action of the current playback resource may correspond to an AVT::SetAVTransportURI( ) action of a UPNP protocol.

The control point device 100 calls the playback action of the designated current playback resource in operation S2813. The playback action of the current playback resource may correspond to an AVT::Play( ) action of a UPNP protocol.

In response to the playback request of the designated current playback resource, the media renderer device 300 requests the current playback resource to the media server device 200 in operation S2814. The media renderer device 300 may transmit an HTTP GET request including the resource identifier of the current playback resource to the media server device 200 to request the current playback resource.

The media renderer device 300 receives the designated current playback resource from the media server device 200 in operation S2815.

In response to the playback request of the current playback resource or the reception of the current playback resource, the media renderer device 300 plays the received resource in operation S2817.

After the control point device 100 requests the playback of the designated current playback resource, it transmits an AVT::SetNextAVTransportURIs( ) action including a plurality of prefetch resource identifiers as arguments to the media renderer device 300 in a background during an idle time in operation S2821. The multiple resource prefetch action may include a plurality of prefetch resource metadata as arguments.

In response to the multiple resource prefetch action, the media renderer device 300 requests a plurality of prefetch resources to the media server device 200 in operation S2822, and then, prefetches the plurality of prefetch resources that the media server device 200 transmits in operation S2823.

When receiving a user input for designating the next playback resource different from a current resource, the control point device 100 transmits a resource playback action to the media renderer device 300 to play the next playback resource in operation S2827. The resource playback action may include an AVT::SetAVTransportURI( ) action of a UPNP protocol and an AVT::Play( ) action of a UPNP protocol. The resource playback action may be an AVT::Previous( ) action of a UPNP protocol or an AVT::Next( ) action of a UPNP protocol.

In response to the resource playback action of the next playback resource, the media renderer device 300 checks whether the next playback resource belongs to a plurality of prefetch resources in operation S2829.

When the next playback resource does not belong to the plurality of prefetch resources, the media renderer device 300 transmits an HTTP GET request requesting a next playback resource to the media server device 200 in operation S2830, receives the next playback resource from the media server device 200 in operation S2831, and plays the received next playback resource in operation S2833.

When the next playback resource belongs to the plurality of prefetch resources, the media renderer device 300 plays the next playback resource without a procedure of receiving the next playback resource from the media server device 200 in operation S2833.

Figure 26:
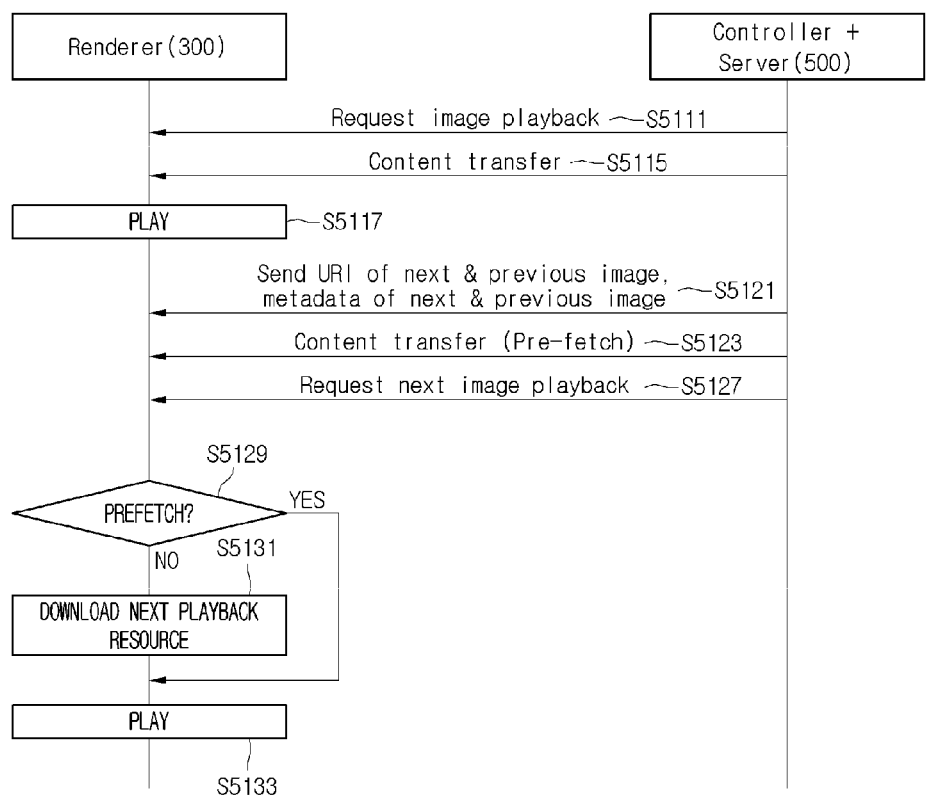
FIG. 26 is a ladder diagram illustrating an operating method of prefetching a multiple resource by using a multiple resource prefetch action including a previous resource identifier and a next resource identifier in a 2-box PUSH model according to an embodiment of the present invention.

FIG. 26 is a ladder diagram illustrating an operating method of prefetching a multiple resource by using a multiple resource prefetch action including all of a previous resource identifier and a next resource identifier in a 2-box PUSH model according to an embodiment of the present invention.

Especially, while FIG. 26 is described, the contents already described with reference to FIG. 4 will not be described.

When receiving a user input for designating a current playback resource, the control point combined media server device 500 requests the playback of the designated current playback resource to the media renderer device 300 in operation S5111.

In response to the playback request of the current playback resource, the media renderer device 300 receives the current playback resource from the control point combined media server device 500 in operation S5115.

In response to the playback request of the current playback resource or the reception of the current playback resource, the media renderer device 300 plays the received resource in operation S5117.

After the control point combined media server device 500 requests the playback of the designated current playback resource, it calls a multiple resource prefetch action including a previous resource identifier and a next resource identifier as arguments in operation S5121, and transmits the called multiple resource prefetch action to the media renderer device 300 in a background during an idle time.

In response to the multiple resource prefetch action, the control point combined media server device 500 transfers the previous resource and the next resource to the media renderer device 300 in operation S5123. The media renderer device 300 prefetches a previous resource and a next resource from the media server device 200 to provide seamless transition without additional transfer on the previous resource and the next resource.

When receiving a user input for designating the next playback resource different from a current resource, the control point combined media server device 500 calls a resource playback action for the playback of the next playback resource in operation S5127, and transmits the called resource playback action to the media renderer device 300.

In response to the resource playback action of the next playback resource, the media renderer device 300 checks whether the next playback resource belongs to a prefetched previous resource and next resource in operation S5129.

When the next playback resource does not belong to the prefetched previous resource and next resource, the media renderer device 300 receives the next playback resource from the control point combined media server device 500 in operation S5131, and plays the received next playback resource in operation S5133.

When the next playback resource belongs to the prefetched previous resource and next resource, the media renderer device 300 plays the next playback resource without a procedure of receiving the next playback resource from the media server device 200 again in operation S5133.

Figure 27:
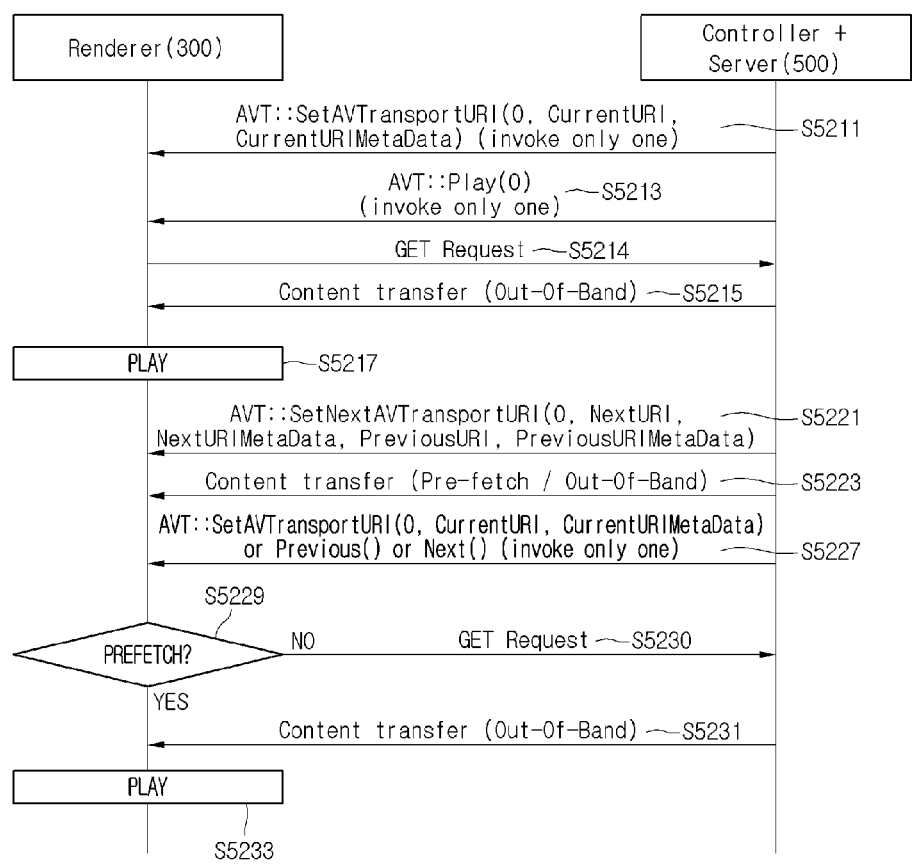
FIG. 27 is a detailed ladder diagram of FIG. 26.

FIG. 27 is a detailed ladder diagram of FIG. 26.

Especially, while FIG. 27 is described, the contents already described with reference to FIG. 4 will not be described.

When receiving a user input for designating a current playback resource, the control point combined media server device 500 calls the resource transfer action of the current playback resource in operation S5211 and transmits the called resource transfer action to the media renderer device 300. The resource transfer action of the current playback resource may correspond to an AVT::SetAVTransportURI( ) action of a UPNP protocol.

The control point combined media server device 500 calls the playback action of the current playback resource in operation S5213, and transmits the called playback action to the media renderer device 300. The playback action of the current playback resource may correspond to an AVT::Play( ) action of a UPNP protocol.

The media renderer device 300 transmits an HTTP GET request requesting a current playback resource to the control point combined media server device 500 in operation S5214, and receives the current playback resource from the control point combined media server device 500 in operation S5215.

In response to the playback request of the current playback resource or the reception of the current playback resource, the media renderer device 300 plays the received resource in operation S5217.

After the control point combined media server device 500 requests the playback of the designated current playback resource, it calls an AVT::SetNextAVTransportURI( ) action including a previous resource identifier and a next resource identifier as arguments in operation S5221, and transmits the called AVT::SetNextAVTransportURI( ) action to the media renderer device 300 in a background during an idle time.

In response to the AVT::SetNextAVTransportURI( ) action, the control point combined media server device 500 transfers the previous resource and the next resource to the media renderer device 300 in operation S5223. The media renderer device 300 prefetches the previous resource and the next resource from the media server device 200 to provide seamless transition without additional transfer on the previous resource and the next resource.

When receiving a user input for designating the next playback resource different from a current resource, the control point combined media server device 500 calls a resource playback action for the playback of the next playback resource in operation S5227, and transmits the called resource playback action to the media renderer device 300.

In response to the resource playback action of the next playback resource, the media renderer device 300 checks whether the next playback resource belongs to a prefetched previous resource and next resource in operation S5229.

When the next playback resource does not belong to the prefetched previous resource and next resource, the media renderer device 300 transmits an HTTP GET request requesting a next playback resource to the control point combined media server device 500 in operation S7230, receives the next playback resource from the control point combined media server device 500 in operation S5231, and plays the received next playback resource in operation S5233.

When the next playback resource belongs to the prefetched previous resource and next resource, the media renderer device 300 plays the next playback resource without a procedure of receiving the next playback resource from the media server device 200 again in operation S5233.

Figure 28:
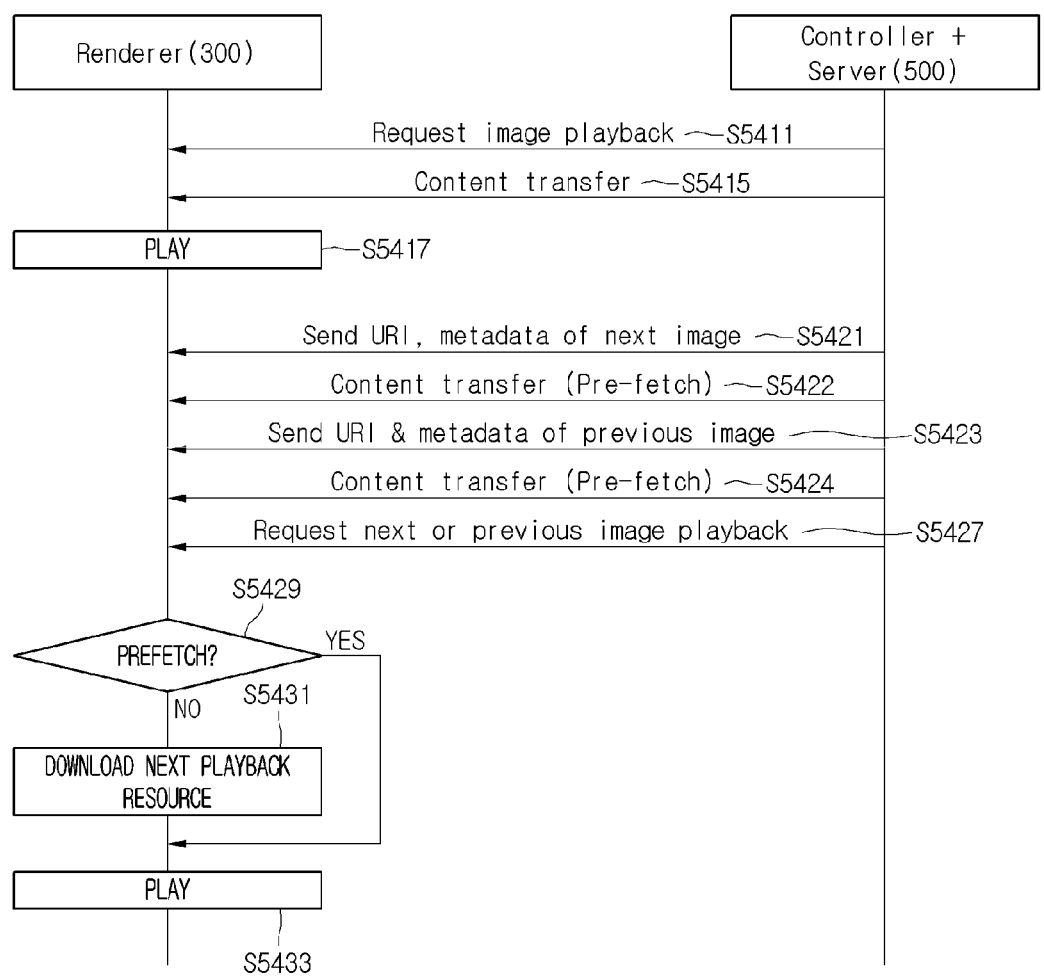
FIG. 28 is a ladder diagram illustrating an operating method of prefetching a multiple resource by using a previous resource prefetch action including only a previous resource identifier and a next resource prefetch action including only a next resource identifier in a 2-box PUSH model according to an embodiment of the present invention.

FIG. 28 is a ladder diagram illustrating an operating method of prefetching a multiple resource by using a previous resource prefetch action including only a previous resource identifier and a next resource prefetch action including only a next resource identifier in a 2-box PUSH model according to an embodiment of the present invention.

Especially, while FIG. 28 is described, the contents already described with reference to FIG. 4 will not be described.

When receiving a user input for designating a current playback resource, the control point combined media server device 500 requests the playback of the designated current playback resource to the media renderer device 300 in operation S5411.

In response to the playback request of the current playback resource, the media renderer device 300 receives the current playback resource from the control point combined media server device 500 in operation S5415.

In response to the playback request of the current playback resource or the reception of the current playback resource, the media renderer device 300 plays the received resource in operation S5417.

After the control point combined media server device 500 requests the playback of the current playback resource, it calls a next resource prefetch action including a next resource identifier as an argument and not including a previous resource identifier as an argument in operation S5421, and transmits the called next resource prefetch action to the media renderer device 300 in a background during an idle time.

In response to the next resource prefetch action, the control point combined media server device 500 transfers the next resource to the media renderer device 300 in operation S5422. The media renderer device 300 prefetches the next resource from the media server device 200 to provide seamless transition without additional transfer on the next resource.

After the control point combined media server device 500 requests the playback of the current playback resource, it calls a previous resource prefetch action including a previous resource identifier as an argument and not including a next resource identifier as an argument in operation S5423, and transmits the called previous resource prefetch action to the media renderer device 300 in a background during an idle time.

In response to the previous resource prefetch action, the control point combined media server device 500 transfers the previous resource to the media renderer device 300 in operation S5424. The media renderer device 300 prefetches the previous resource from the media server device 200 to provide seamless transition without additional transfer on the previous resource.

When receiving a user input for designating the next playback resource different from a current resource, the control point combined media server device 500 calls a resource playback action for the playback of the next playback resource in operation S5427, and transmits the called resource playback action to the media renderer device 300.

In response to the resource playback action of the next playback resource, the media renderer device 300 checks whether the next playback resource belongs to a prefetched previous resource and next resource in operation S5429.

When the next playback resource does not belong to the prefetched previous resource and next resource, the media renderer device 300 receives the next playback resource from the control point combined media server device 500 in operation S5431, and plays the received next playback resource in operation S5433.

When the next playback resource belongs to the prefetched previous resource and next resource, the media renderer device 300 plays the next playback resource without a procedure of receiving the next playback resource from the media server device 200 again in operation S5433.

Figure 29:
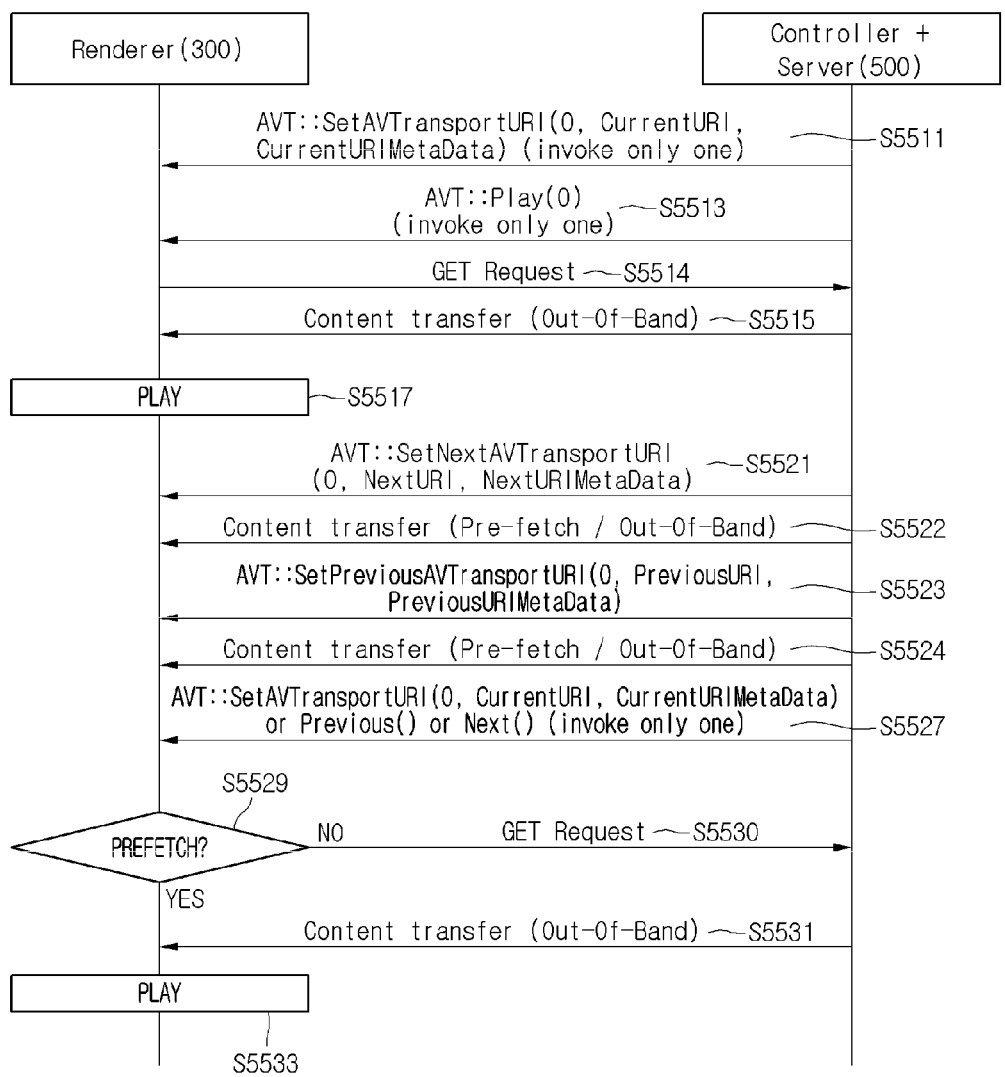
FIG. 29 is a detailed ladder diagram of FIG. 28.

FIG. 29 is a detailed ladder diagram of FIG. 28.

Especially, while FIG. 29 is described, the contents already described with reference to FIG. 4 will not be described.

When receiving a user input for designating a current playback resource, the control point combined media server device 500 calls the resource transfer action of the current playback resource in operation S5511 and transmits the called resource transfer action to the media renderer device 300. The resource transfer action of the current playback resource may correspond to an AVT::SetAVTransportURI( ) action of a UPNP protocol.

The control point combined media server device 500 calls the playback action of the current playback resource in operation S5513, and transmits the called playback action to the media renderer device 300. The playback action of the current playback resource may correspond to an AVT::Play( ) action of a UPNP protocol.

The media renderer device 300 transmits an HTTP GET request requesting a current playback resource to the control point combined media server device 500 in operation S5514, and receives the current playback resource from the control point combined media server device 500 in operation S5515.

In response to the playback request of the current playback resource or the reception of the current playback resource, the media renderer device 300 plays the received resource in operation S5517.

After the control point combined media server device 500 requests the playback of the current playback resource, it calls an AVT::SetNextAVTransportURI( ) action including a next resource identifier as an argument and not including a previous resource identifier as an argument and transmits the called AVT::SetNextAVTransportURI( ) action to the media renderer device 300 in a background during an idle time.

In response to the AVT::SetNextAVTransportURI( ) action, the control point combined media server device 500 transfers the next resource to the media renderer device 300 in operation S5223. The media renderer device 300 prefetches the next resource from the media server device 200 to provide seamless transition without additional transfer on the next resource.

After the control point combined media server device 500 requests the playback of the current playback resource, it calls an AVT::SetPreviousAVTransportURI( ) action including a previous resource identifier as an argument and not including a next resource identifier as an argument in operation S5523 and transmits the called AVT::SetPreviousAVTransportURI( ) action to the media renderer device 300 in a background during an idle time.

In response to the AVT::SetPreviousAVTransportURI( ) action, the control point combined media server device 500 transfers the previous resource to the media renderer device 300 in operation S5224. The media renderer device 300 prefetches the previous resource from the media server device 200 to provide seamless transition without additional transfer on the previous resource.

When receiving a user input for designating the next playback resource different from a current resource, the control point combined media server device 500 calls the resource playback action for the playback of the next playback resource in operation S5527, and transmits the called resource playback action to the media renderer device 300.

In response to the resource playback action of the next playback resource, the media renderer device 300 checks whether the next playback resource belongs to a prefetched previous resource and next resource in operation S5529.

When the next playback resource does not belong to the prefetched previous resource and next resource, the media renderer device 300 transmits an HTTP GET request requesting a next playback resource to the control point combined media server device 500 in operation S7530, receives the next playback resource from the control point combined media server device 500 in operation S5531, and plays the received next playback resource in operation S5533.

When the next playback resource belongs to the prefetched previous resource and next resource, the media renderer device 300 plays the next playback resource without a procedure of receiving the next playback resource from the media server device 200 again in operation S5533.

Figure 30:
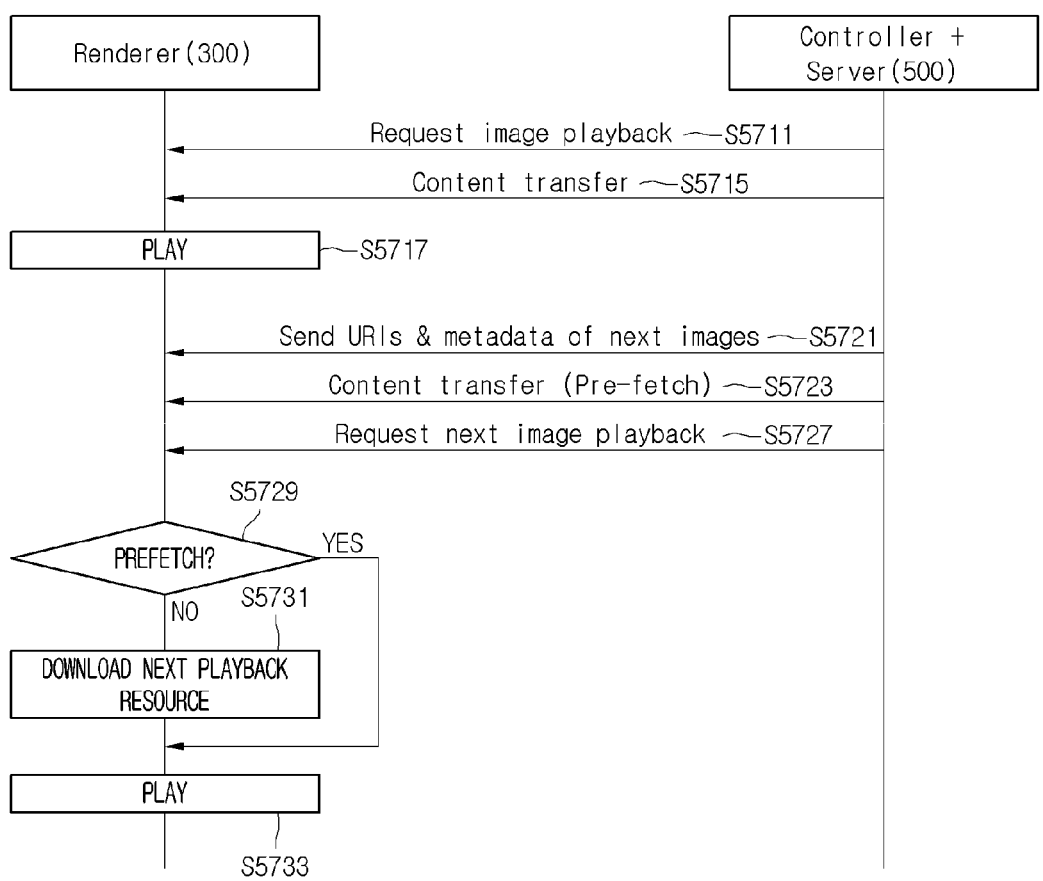
FIG. 30 is a ladder diagram illustrating an operating method of prefetching a multiple resource by using a multiple resource prefetch action including a plurality of prefetch resource identifiers in a 2-box PUSH model according to an embodiment of the present invention.

FIG. 30 is a ladder diagram illustrating an operating method of prefetching a multiple resource by using a multiple resource prefetch action including a plurality of prefetch resource identifiers in a 2-box PUSH model according to an embodiment of the present invention.

Especially, while FIG. 30 is described, the contents already described with reference to FIG. 4 will not be described.

When receiving a user input for designating a current playback resource, the control point combined media server device 500 requests the playback of the designated current playback resource to the media renderer device 300 in operation S5711.

In response to the playback request of the current playback resource, the media renderer device 300 receives the current playback resource from the control point combined media server device 500 in operation S5715.

In response to the playback request of the current playback resource or the reception of the current playback resource, the media renderer device 300 plays the received resource in operation S5717.

After the control point combined media server device 500 requests the playback of the designated current playback resource, it calls a multiple resource prefetch action including a plurality of resource identifiers as arguments in operation S5721, and transmits the called multiple resource prefetch action to the media renderer device 300 in a background during an idle time.

In response to the multiple resource prefetch action, the control point combined media server device 500 transfers the plurality of resources to the media renderer device 300 in operation S5723. The media renderer device 300 prefetches the plurality of resources from the media server device 200 to provide seamless transition without additional transfer on the plurality of prefetch resources.

When receiving a user input for designating the next playback resource different from a current resource, the control point combined media server device 500 calls a resource playback action for the playback of the next playback resource in operation S5727, and transmits the called resource playback action to the media renderer device 300.

In response to the resource playback action of the next playback resource, the media renderer device 300 checks whether the next playback resource belongs to the plurality of prefetch resources in operation S5729.

When the next playback resource does not belong to the plurality of prefetch resources, the media renderer device 300 receives the next playback resource from the control point combined media server device 500 in operation S5731, and plays the received next playback resource in operation S5733.

When the next playback resource belongs to the plurality of prefetch resources, the media renderer device 300 plays the next playback resource without a procedure of receiving the next playback resource from the media server device 200 in operation S5733.

Figure 31:
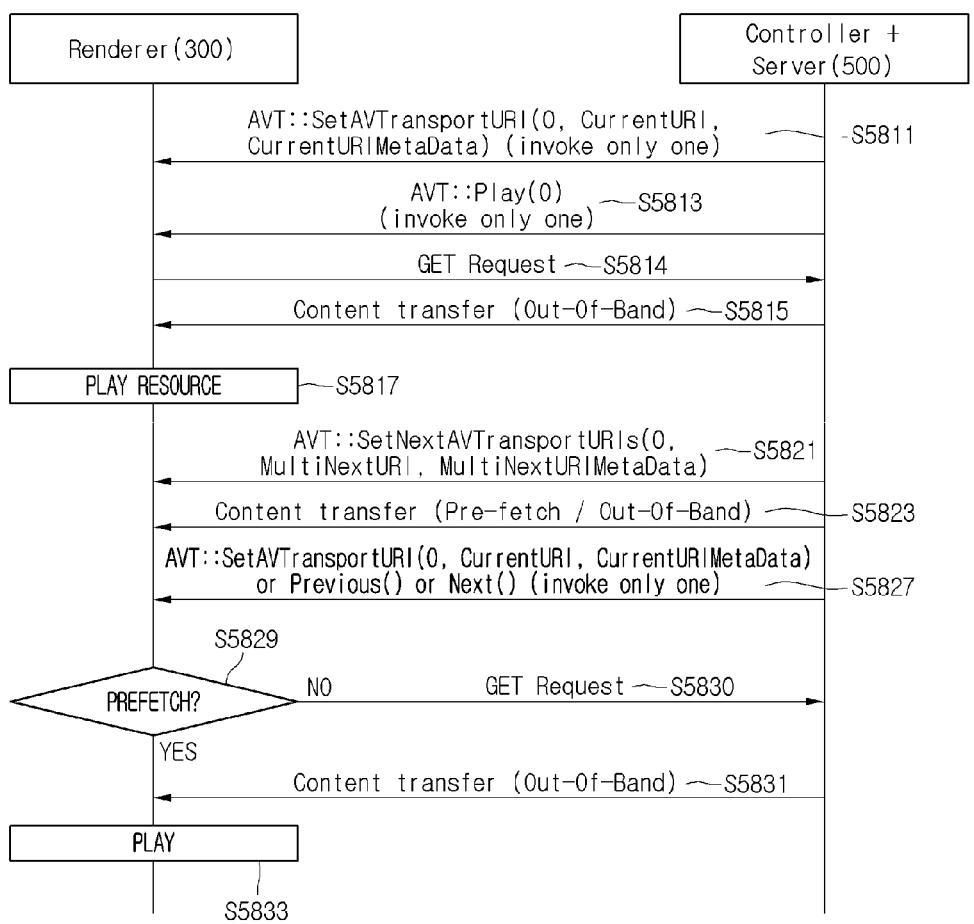
FIG. 31 is a detailed ladder diagram of FIG. 30.

FIG. 31 is a detailed ladder diagram of FIG. 30.

Especially, while FIG. 31 is described, the contents already described with reference to FIG. 4 will not be described.

When receiving a user input for designating a current playback resource, the control point combined media server device 500 calls the resource transfer action of the current playback resource in operation S5811 and transmits the called resource transfer action to the media renderer device 300. The resource transfer action of the current playback resource may correspond to an AVT::SetAVTransportURI( ) action of a UPNP protocol.

The control point combined media server device 500 calls the playback action of the current playback resource in operation S5813, and transmits the called playback action to the media renderer device 300. The playback action of the current playback resource may correspond to an AVT::Play( ) action of a UPNP protocol.

The media renderer device 300 transmits an HTTP GET request requesting a current playback resource to the control point combined media server device 500 in operation S5814, and receives the current playback resource from the control point combined media server device 500 in operation S5815.

In response to the playback request of the current playback resource or the reception of the current playback resource, the media renderer device 300 plays the received resource in operation S5817.

After the control point combined media server device 500 requests the playback of the designated current playback resource, it calls an AVT::SetNextAVTransportURI( ) action including a plurality of resource identifiers as arguments in operation S5821, and transmits the called AVT::SetNextAVTransportURI( ) action to the media renderer device 300 in a background during an idle time.

In response to the AVT::SetNextAVTransportURIs( ) action, the control point combined media server device 500 transfers the plurality of resources to the media renderer device 300 in operation S5823. The media renderer device 300 prefetches the plurality of resources from the media server device 200 to provide seamless transition without additional transfer on the plurality of prefetch resources.

When receiving a user input for designating the next playback resource different from a current resource, the control point combined media server device 500 calls a resource playback action for the playback of the next playback resource in operation S5827, and transmits the called resource playback action to the media renderer device 300.

In response to the resource playback action of the next playback resource, the media renderer device 300 checks whether the next playback resource belongs to the plurality of prefetch resources in operation S5829.

When the next playback resource does not belong to the plurality of prefetch resources, the media renderer device 300 transmits a GET request requesting a next playback resource to the control point combined media server device 500 in operation S7830, receives the next playback resource from the control point combined media server device 500 in operation S5831, and plays the received next playback resource in operation S5833.

When the next playback resource belongs to the plurality of prefetch resources, the media renderer device 300 plays the next playback resource without a procedure of receiving the next playback resource from the media server device 200 in operation S5833.

Figure 32:
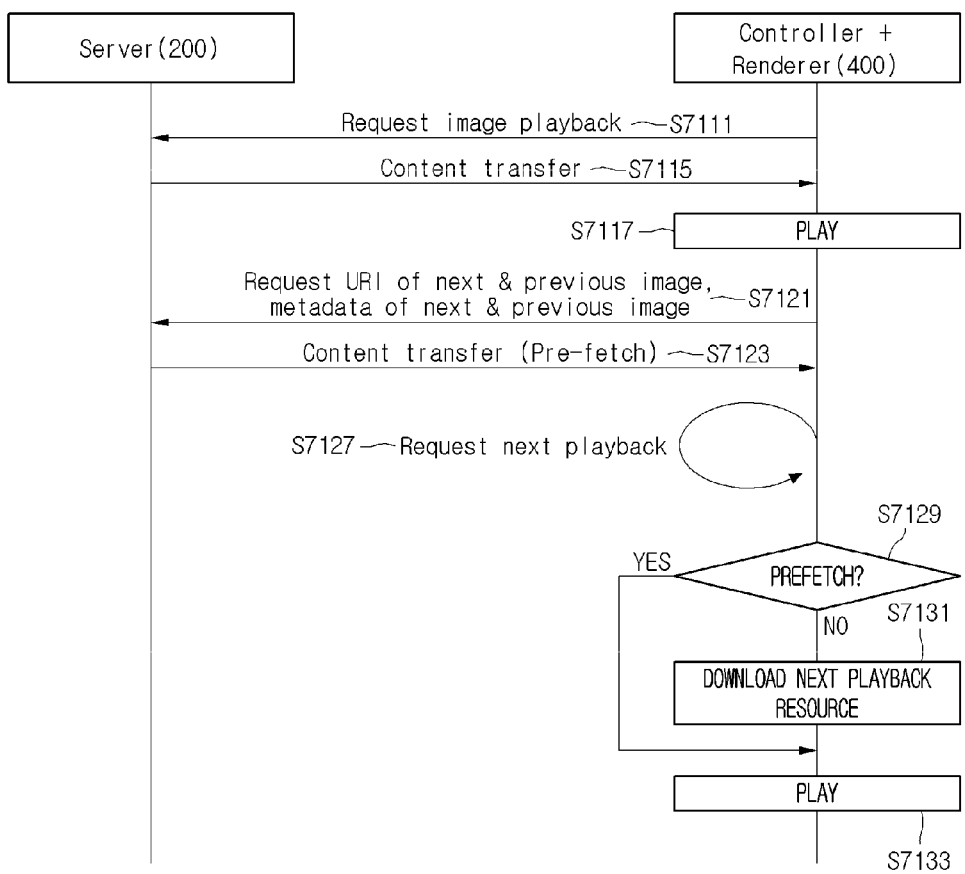
FIG. 32 is a ladder diagram illustrating an operating method of prefetching a multiple resource by using a multiple resource prefetch action including all of a previous resource identifier and a next resource identifier in a 2-box PULL model according to an embodiment of the present invention.

FIG. 32 is a ladder diagram illustrating an operating method of prefetching a multiple resource by using a multiple resource prefetch action including all of a previous resource identifier and a next resource identifier in a 2-box PULL model according to an embodiment of the present invention.

Especially, while FIG. 32 is described, the contents already described with reference to FIG. 4 will not be described.

When receiving a user input for designating a current playback resource, the control point combined media renderer device 400 requests the playback of the designated current playback resource to the media server device 200 in operation S7711.

In response to the playback request of the designated current playback resource, the control point combined media renderer device 400 receives the designated current playback resource from the media server device 200 in operation S7715.

In response to the playback request of the current playback resource or the reception of the current playback resource, the control point combined media renderer device 400 plays the received resource in operation S7117.

After the control point combined media renderer device 400 requests the playback of the designated current playback resource, it calls a multiple resource prefetch action including a previous resource identifier and a next resource identifier as arguments in operation S7121, and transmits the called multiple resource prefetch action to the media server device 200 in a background during an idle time.

In response to the multiple resource prefetch action, the media server device 200 transfers the previous resource and the next resource to the media renderer device 400 in operation S7123. The control point combined media renderer device 400 prefetches the previous resource and the next resource from the media server device 200 to provide seamless transition without additional transfer on the previous resource and the next resource.

When receiving a user input for designating the next playback resource different from a current resource, the control point combined media renderer device 400 calls a resource playback action for the playback of the next playback resource in operation S7127.

In response to the resource playback action of the next playback resource, the media renderer device 400 checks whether the next playback resource belongs to a prefetched previous resource and next resource in operation S7129.

When the next playback resource does not belong to the prefetched previous resource and next resource, the control point combined media renderer device 400 receives the next playback resource from the media server device 200 in operation S7131, and plays the received next playback resource in operation S7133.

When the next playback resource belongs to the prefetched previous resource and next resource, the media renderer device 300 plays the next playback resource without a procedure of receiving the next playback resource from the media server device 200 again in operation S7133.

Figure 33:
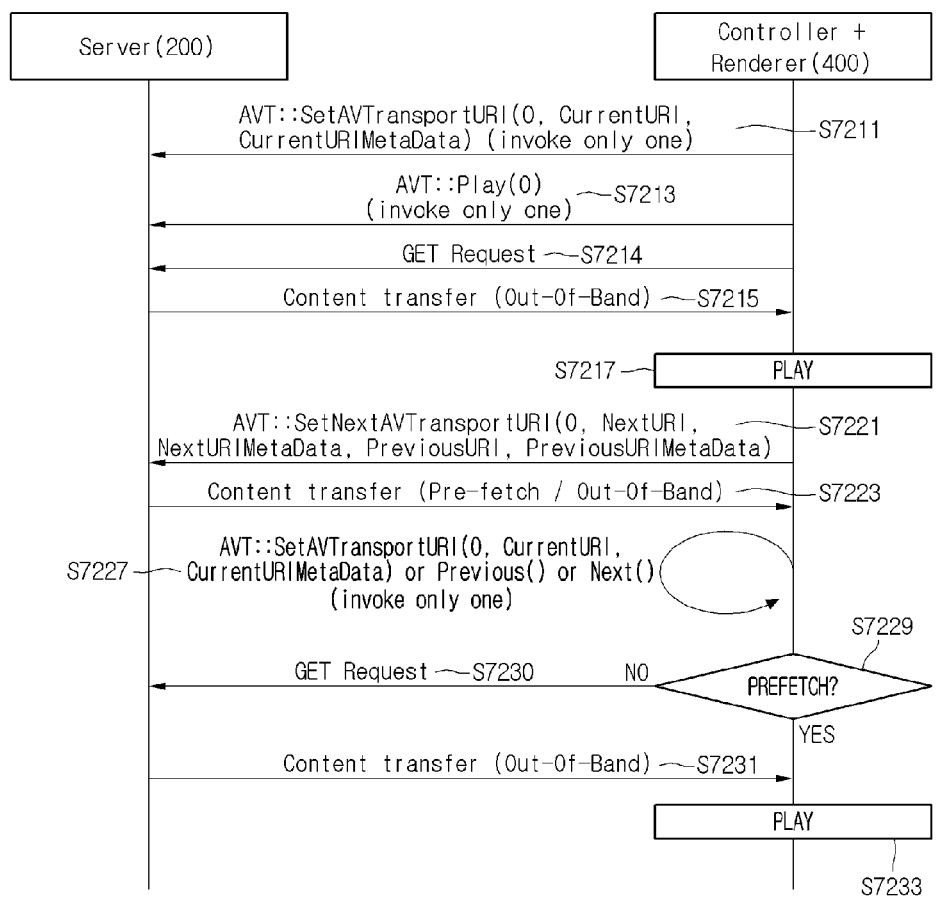
FIG. 33 is a detailed ladder diagram of FIG. 32.

FIG. 33 is a detailed ladder diagram of FIG. 32.

Especially, while FIG. 33 is described, the contents already described with reference to FIG. 4 will not be described.

When receiving a user input for designating a current playback resource, the control point combined media renderer device 400 calls the resource transfer action of the designated current playback resource in operation S7211 and transmits the called resource transfer action to the media server device 200. The resource transfer action of the current playback resource may correspond to an AVT::SetAVTransportURI( ) action of a UPNP protocol.

The control point combined media renderer device 400 calls the playback action of the designated current playback resource in operation S7213, and transmits the called playback action to the media server device 200. The playback action of the current playback resource may correspond to an AVT::Play( ) action of a UPNP protocol.

The control point combined media renderer device 400 transmits an HTTP GET request requesting a current playback resource to the media server device 200 in operation S7214, and receives the current playback resource from the media server device 200 in operation S7215.

In response to the playback request of the current playback resource or the reception of the current playback resource, the control point combined media renderer device 400 plays the received resource in operation S7217.

After the control point combined media renderer device 400 requests the playback of the designated current playback resource, it calls an AVT::SetNextAVTransportURI( ) action including a previous resource identifier and a next resource identifier as arguments in operation S7221, and transmits the called AVT::SetNextAVTransportURI( ) action to the media server device 200 in a background during an idle time.

In response to the AVT::SetNextAVTransportURI( ) action, the media server device 200 transfers the previous resource and the next resource to the control point combined media renderer device 400 in operation S7223. The control point combined media renderer device 400 prefetches the previous resource and the next resource from the media server device 200 to provide seamless transition without additional transfer on the previous resource and the next resource.

When receiving a user input for designating the next playback resource different from a current resource, the control point combined media renderer device 400 calls a resource playback action for the playback of the next playback resource in operation S7227.

In response to the resource playback action of the next playback resource, the control point combined media renderer device 400 checks whether the next playback resource belongs to a prefetched previous resource and next resource in operation S7229.

When the next playback resource does not belong to the prefetched previous resource and next resource, the control point combined media renderer device 400 transmits a GET request requesting a next playback resource to the media server device 200 in operation S7230, receives the next playback resource from the media server device 200 in operation S7231, and plays the received next playback resource in operation S7233.

When the next playback resource belongs to the prefetched previous resource and next resource, the media renderer device 300 plays the next playback resource without a procedure of receiving the next playback resource from the media server device 200 again in operation S7233.

Figure 34:
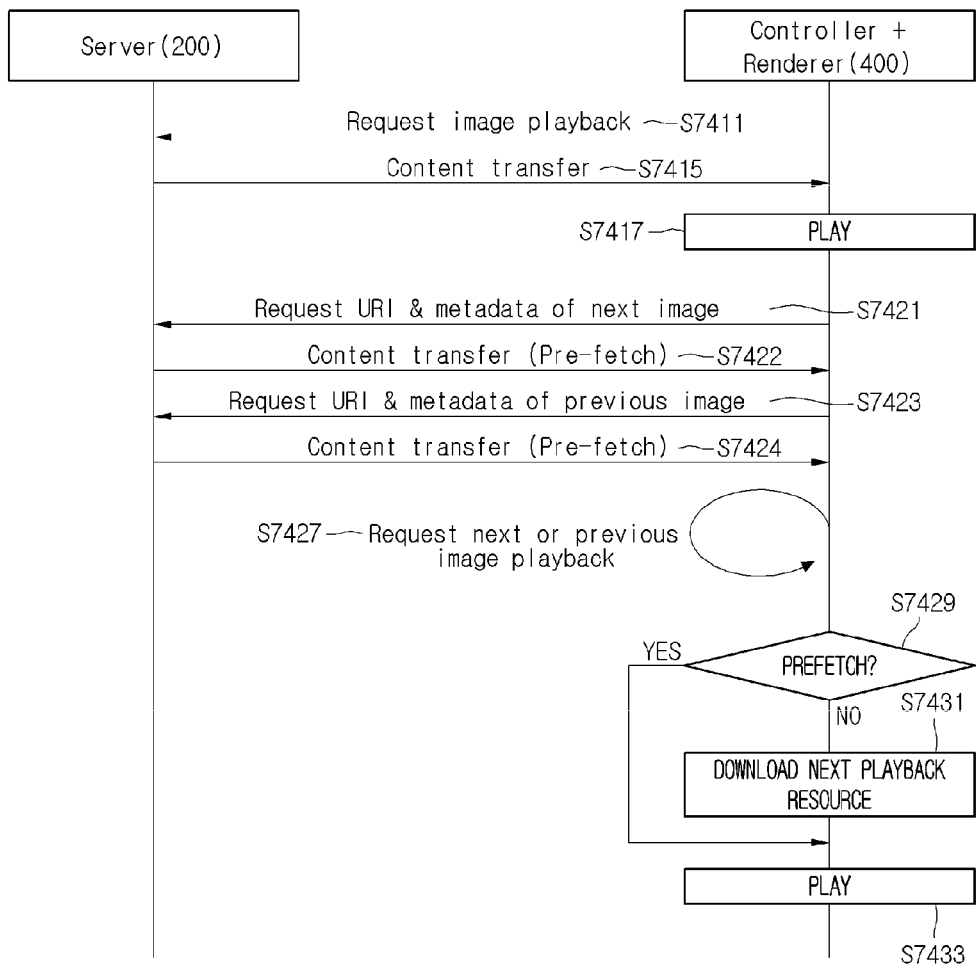
FIG. 34 is a ladder diagram illustrating an operating method of prefetching a multiple resource by using a previous resource prefetch action including only a previous resource identifier and a next resource prefetch action including only a next resource identifier in a 2-box PULL model according to an embodiment of the present invention.

FIG. 34 is a ladder diagram illustrating an operating method of prefetching a multiple resource by using a previous resource prefetch action including only a previous resource identifier and a next resource prefetch action including only a next resource identifier in a 2-box PULL model according to an embodiment of the present invention.

Especially, while FIG. 34 is described, the contents already described with reference to FIG. 4 will not be described.

When receiving a user input for designating a current playback resource, the control point combined media renderer device 400 requests the playback of the designated current playback resource to the media server device 200 in operation S7411.

In response to the playback request of the designated current playback resource, the control point combined media renderer device 400 receives the designated current playback resource from the media server device 200 in operation S7415.

In response to the playback request of the current playback resource or the reception of the current playback resource, the control point combined media renderer device 400 plays the received resource in operation S7417.

After the control point combined media renderer device 400 requests the playback of the designated current playback resource, it calls a next resource prefetch action including a next resource identifier as an argument and not including a previous resource identifier as an argument in operation 57421, and transmits the called next resource prefetch action to the media server device 200 in a background during an idle time.

In response to the next resource prefetch action, the media server device 200 transfers the next resource to the control point combined media renderer device 400 in operation S7422. The control point combined media renderer device 400 prefetches the next resource from the media server device 200 to provide seamless transition without additional transfer on the prefetched next resource.

After the control point combined media renderer device 400 requests the playback of the designated current playback resource, it calls a previous resource prefetch action including a previous resource identifier as an argument and not including a next resource identifier as an argument in operation S7423, and transmits the called previous resource prefetch action to the media server device 200 in a background during an idle time.

In response to the previous resource prefetch action, the media server device 200 transfers the previous resource to the control point combined media renderer device 400 in operation S7424. The control point combined media renderer device 400 prefetches the previous resource from the media server device 200 to provide seamless transition without additional transfer on the prefetched previous resource.

When receiving a user input for designating the next playback resource different from a current resource, the control point combined media renderer device 400 calls a resource playback action for the playback of the next playback resource in operation S7427.

In response to the resource playback action of the next playback resource, the control point combined media renderer device 400 checks whether the next playback resource belongs to a prefetched previous resource and next resource in operation S7429.

When the next playback resource does not belong to the prefetched previous resource and next resource, the control point combined media renderer device 400 receives the next playback resource from the media server device 200 in operation S7431, and plays the received next playback resource in operation S7433.

When the next playback resource belongs to the prefetched previous resource and next resource, the media renderer device 300 plays the next playback resource without a procedure of receiving the next playback resource from the media server device 200 again in operation S7433.

Figure 35:
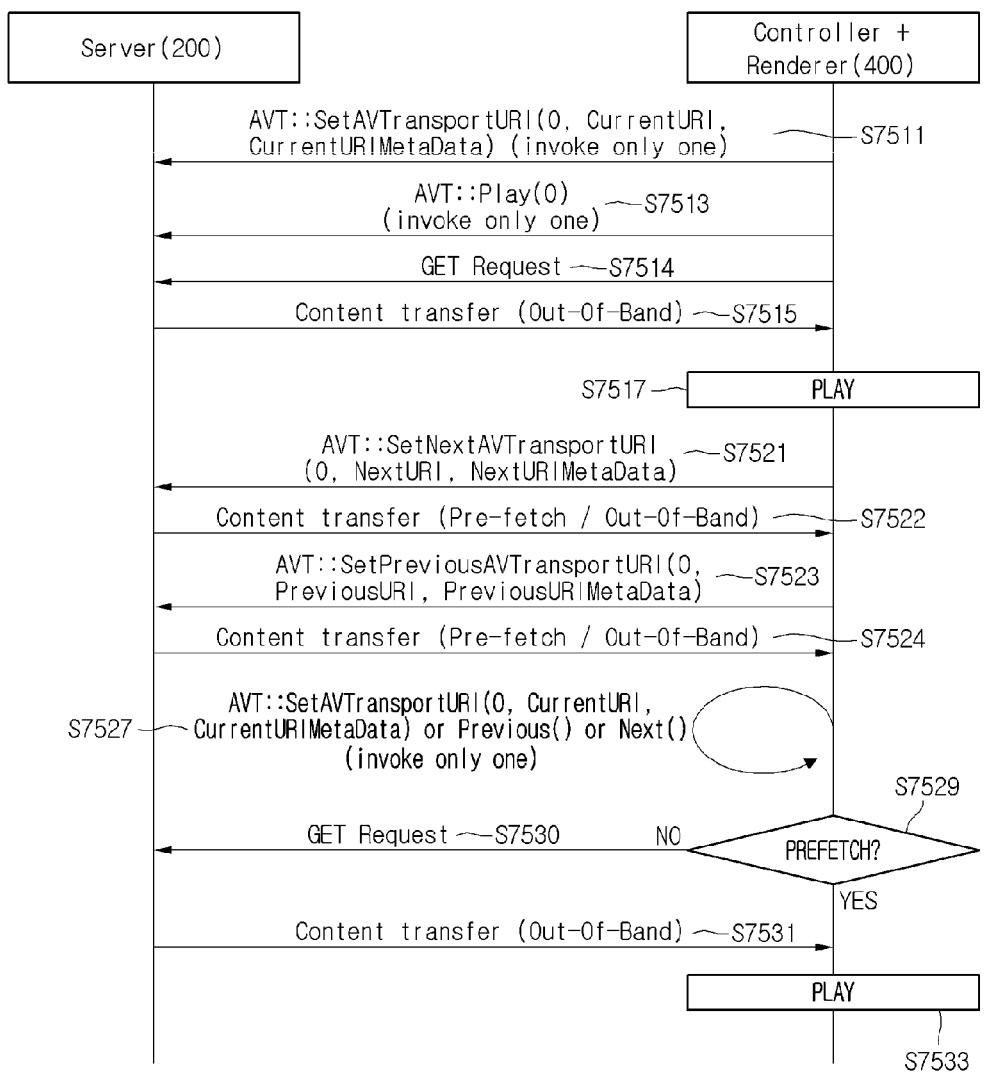
FIG. 35 is a detailed ladder diagram of FIG. 34.

FIG. 35 is a detailed ladder diagram of FIG. 34.

Especially, while FIG. 35 is described, the contents already described with reference to FIG. 4 will not be described.

When receiving a user input for designating a current playback resource, the control point combined media renderer device 400 calls the resource transfer action of the designated current playback resource in operation S7511 and transmits the called resource transfer action to the media server device 200. The resource transfer action of the current playback resource may correspond to an AVT::SetAVTransportURI( ) action of a UPNP protocol.

The control point combined media renderer device 400 calls the playback action of the designated current playback resource in operation S7513, and transmits the called playback action to the media server device 200. The playback action of the current playback resource may correspond to an AVT::Play( ) action of a UPNP protocol.

The control point combined media renderer device 400 transmits an HTTP GET request requesting a current playback resource to the media server device 200 in operation S7514, and receives the current playback resource from the media server device 200 in operation S7515.

In response to the playback request of the current playback resource or the reception of the current playback resource, the control point combined media renderer device 400 plays the received resource in operation S7517.

After the control point combined media renderer device 400 requests the playback of the designated current playback resource, it calls an AVT::SetNextAVTransportURI( ) action including a next resource identifier as an argument and not including a previous resource identifier as an argument in operation S7521 and transmits the called AVT::SetNextAVTransportURI( ) action to the media server device 200 in a background during an idle time.

In response to the AVT::SetNextAVTransportURI( ) action, the media server device 200 transfers the next resource to the control point combined media renderer device 400 in operation S7522. The control point combined media renderer device 400 prefetches the next resource from the media server device 200 to provide seamless transition without additional transfer on the prefetched next resource.

After the control point combined media renderer device 400 requests the playback of the designated current playback resource, it calls an AVT::SetPreviousAVTransportURI( ) action including a previous resource identifier as an argument and not including a next resource identifier as an argument in operation S7523 and transmits the called AVT::SetPreviousAVTransportURI( ) action to the media server device 200 in a background during an idle time.

In response to the AVT::SetPreviousAVTransportURI( ) action, the media server device 200 transfers the previous resource to the control point combined media renderer device 400 in operation S7524. The control point combined media renderer device 400 prefetches the previous resource from the media server device 200 to provide seamless transition without additional transfer on the prefetched previous resource.

When receiving a user input for designating the next playback resource different from a current resource, the control point combined media renderer device 400 calls a resource playback action for the playback of the next playback resource in operation S7527.

In response to the resource playback action of the next playback resource, the control point combined media renderer device 400 checks whether the next playback resource belongs to a prefetched previous resource and next resource in operation S7529.

When the next playback resource does not belong to the prefetched previous resource and next resource, the control point combined media renderer device 400 transmits a GET request requesting a next playback resource to the media server device 200 in operation S7530, receives the next playback resource from the media server device 200 in operation S7531, and plays the received next playback resource in operation S7533.

When the next playback resource belongs to the prefetched previous resource and next resource, the media renderer device 300 plays the next playback resource without a procedure of receiving the next playback resource from the media server device 200 again in operation S7533.

Figure 36:
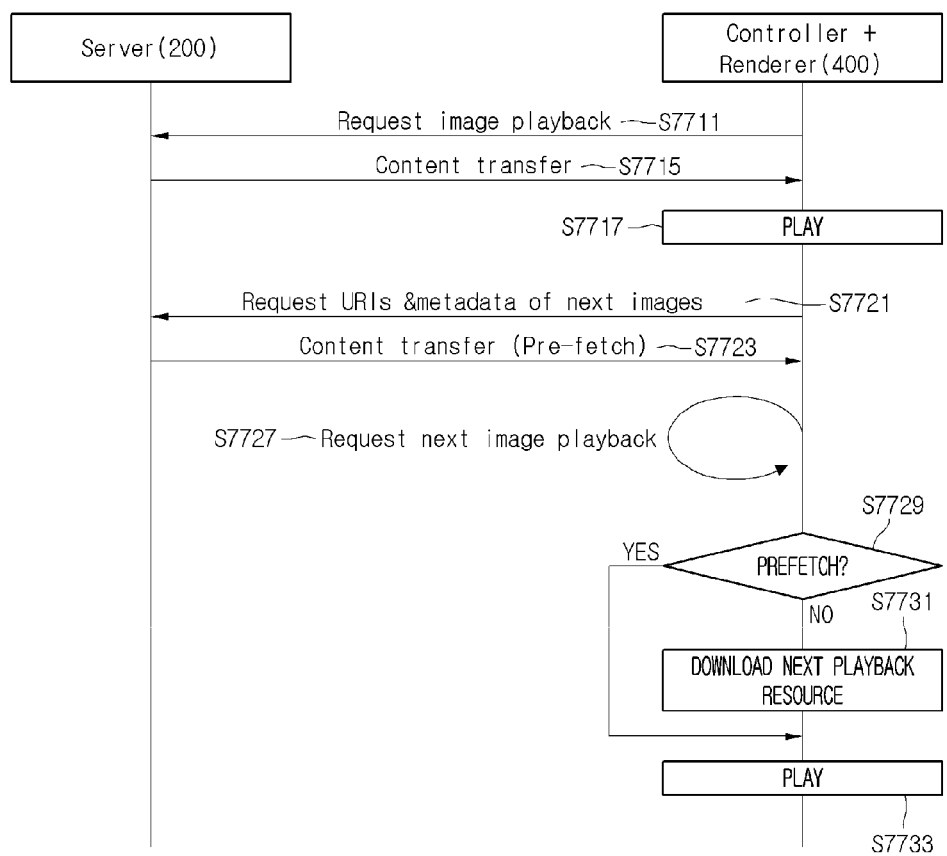
FIG. 36 is a ladder diagram illustrating an operating method of prefetching a multiple resource by using a multiple resource prefetch action including a plurality of prefetch resource identifiers in a 2-box PULL model according to an embodiment of the present invention.

FIG. 36 is a ladder diagram illustrating an operating method of prefetching a multiple resource by using a multiple resource prefetch action including a plurality of prefetch resource identifiers in a 2-box PULL model according to an embodiment of the present invention.

Especially, while FIG. 36 is described, the contents already described with reference to FIG. 4 will not be described.

When receiving a user input for designating a current playback resource, the control point combined media renderer device 400 requests the playback of the designated current playback resource to the media server device 200 in operation S7711.

In response to the playback request of the designated current playback resource, the control point combined media renderer device 400 receives the designated current playback resource from the media server device 200 in operation S7715.

In response to the playback request of the current playback resource or the reception of the current playback resource, the control point combined media renderer device 400 plays the received resource in operation S7717.

After the control point combined media renderer device 400 requests the playback of the designated current playback resource, it calls a multiple resource prefetch action including a plurality of prefetch resource identifiers as arguments in operation S7721, and transmits the called multiple resource prefetch action to the media server device 200 in a background during an idle time.

In response to the multiple resource prefetch action, the media server device 200 transfers the plurality of prefetch resources to the control point combined media renderer device 400 in operation S7723. The control point combined media renderer device 400 prefetches the plurality of prefetch resources from the media server device 200 to provide seamless transition without additional transfer on the plurality of prefetch resources.

When receiving a user input for designating the next playback resource different from a current resource, the control point combined media renderer device 400 calls a resource playback action for the playback of the next playback resource in operation S7727.

In response to the resource playback action of the next playback resource, the control point combined media renderer device 400 checks whether the next playback resource belongs to the plurality of prefetch resources in operation S7729.

When the next playback resource does not belong to the plurality of prefetch resources, the control point combined media renderer device 400 receives the next playback resource from the media server device 200 in operation S7731, and plays the received next playback resource in operation S7733.

When the next playback resource belongs to the plurality of prefetch resources, the media renderer device 300 plays the next playback resource without a procedure of receiving the next playback resource from the media server device 200 in operation S7733.

Figure 37:
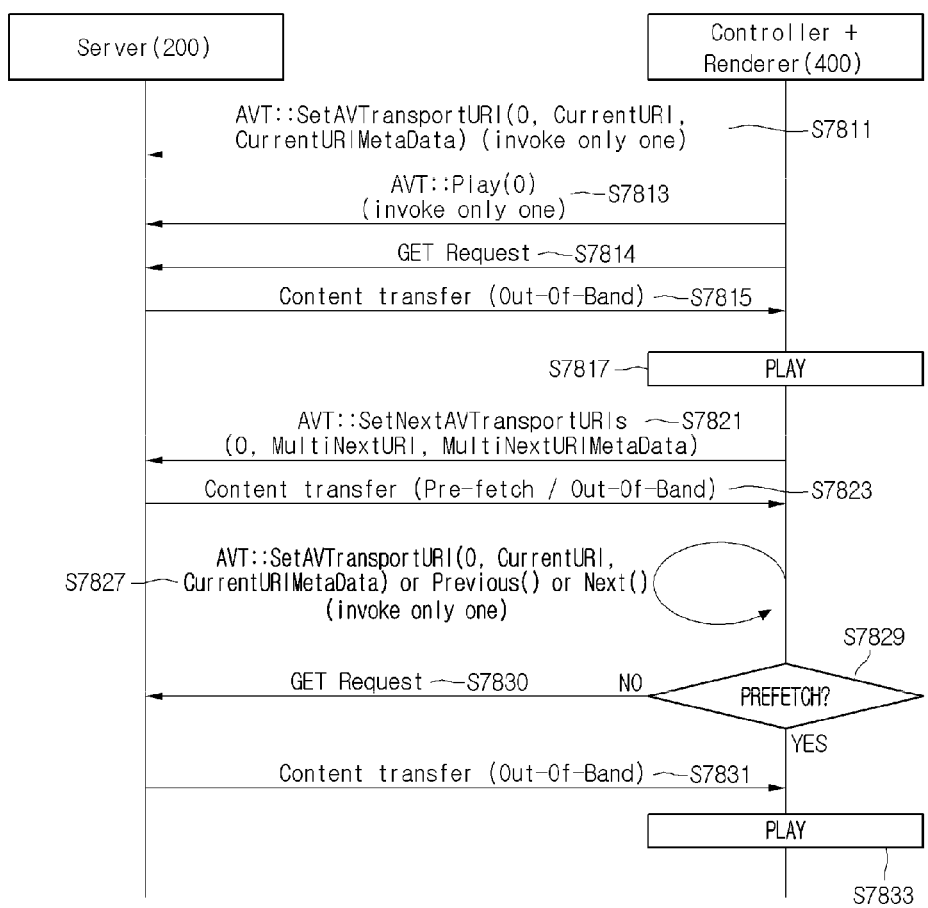
FIG. 37 is a detailed ladder diagram of FIG. 36.

FIG. 37 is a detailed ladder diagram of FIG. 36.

Especially, while FIG. 37 is described, the contents already described with reference to FIG. 4 will not be described.

When receiving a user input for designating a current playback resource, the control point combined media renderer device 400 calls the resource transfer action of the designated current playback resource in operation S7811 and transmits the called resource transfer action to the media server device 200. The resource transfer action of the current playback resource may correspond to an AVT::SetAVTransportURI( ) action of a UPNP protocol.

The control point combined media renderer device 400 calls the playback action of the designated current playback resource in operation S7813, and transmits the called playback action to the media server device 200. The playback action of the current playback resource may correspond to an AVT::Play( ) action of a UPNP protocol.

The control point combined media renderer device 400 transmits an HTTP GET request requesting a current playback resource to the media server device 200 in operation S7814, and receives the designated current playback resource from the media server device 200 in operation S7815.

In response to the playback request of the current playback resource or the reception of the current playback resource, the control point combined media renderer device 400 plays the received resource in operation S7817.

After the control point combined media renderer device 400 requests the playback of the designated current playback resource, it calls an AVT::SetNextAVTransportURIs( ) action including a plurality of prefetch resource identifiers as arguments in operation S7821, and transmits the called AVT::SetNextAVTransportURIs( ) action to the media server device 200 in a background during an idle time.

In response to the SetNextAVTransportURI( ) action, the media server device 200 transfers the plurality of prefetch resources to the control point combined media renderer device 400 in operation S7823. The control point combined media renderer device 400 prefetches the plurality of prefetch resources from the media server device 200 to provide seamless transition without additional transfer on the plurality of prefetch resources.

When receiving a user input for designating the next playback resource different from a current resource, the control point combined media renderer device 400 calls a resource playback action for the playback of the next playback resource in operation S7827.

In response to the resource playback action of the next playback resource, the control point combined media renderer device 400 checks whether the next playback resource belongs to the plurality of prefetch resources in operation S7829.

When the next playback resource does not belong to the plurality of prefetch resources, the control point combined media renderer device 400 transmits a GET request requesting a next playback resource to the media server device 200 in operation S7830, receives the next playback resource from the media server device 200 in operation S7831, and plays the received next playback resource in operation S7833.

When the next playback resource belongs to the plurality of prefetch resources, the media renderer device 300 plays the next playback resource without a procedure of receiving the next playback resource from the media server device 200 in operation S7833.

Various embodiments described herein may be realized in a computer or device similar thereto readable recording medium by using software, hardware, or a combination thereof.

In terms of hardware realization, the embodiments described herein may be realized by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, such embodiments may be realized by the control unit 780.

Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. An operating method of a control device controlling a media renderer and a media server, the method comprising:
    calling, by the control device, a playback action of a first resource to allow the media renderer to play the first resource;
    calling, by the control device, a multiple resource prefetch action including a plurality of prefetch resource identifiers for a plurality of prefetch resources, after the calling of the playback action of the first resource, to allow the media renderer to prefetch the plurality of prefetch resources;
    calling, by the control device, a playback action of a second resource corresponding to one of the plurality of prefetch resources, to allow the media renderer to provide seamless transition between the first resource and the second resource; and
    when the media renderer cannot prefetch all of the plurality of prefetch resources due to the multiple resource prefetch action including too many prefetch resource identifiers, receiving, by the control device, a return of an error code indicating that there are too many resources.

2. The method of claim 1, wherein the multiple resource prefetch action further comprises a plurality of metadata items for the plurality of prefetch resources.

3. The method of claim 2, wherein an order of the plurality of metadata items is identical to an order of the plurality of prefetch resource identifiers.

4. The method of claim 2, wherein the multiple resource prefetch action comprises a first argument including the plurality of prefetch resource identifiers and a second argument including the plurality of metadata items,
    wherein the first argument comprises the plurality of prefetch resource identifiers in a comma separated value format, and
    wherein the second argument comprises the plurality of metadata items in a DIDL-Lite XML Fragment format defined in a content directory service template of a UPnP standard.

5. The method of claim 2, further comprising:
    receiving, by the control device, a user input on whether the multiple resource prefetch action supports metadata; and
    updating, by the control device, a setting variable storing whether the multiple resource prefetch action supports metadata on the basis of the user input,
    wherein, when the setting variable indicates that the multiple resource prefetch action supports the metadata, the multiple resource prefetch action comprises a plurality of metadata items for the plurality of prefetch resources, and
    wherein, when the setting variable indicates that the multiple resource prefetch action does not support the metadata, the multiple resource prefetch action does not comprise a plurality of metadata items for the plurality of prefetch resources.

6. The method of claim 1, further comprising:
    receiving, by the control device, a user input on whether the multiple resource prefetch action is activated; and
    updating, by the control device, a setting variable on whether the multiple resource prefetch action is activated on the basis of the user input,
    wherein the calling of the multiple resource prefetch action comprises:
    calling the multiple resource prefetch action when the setting variable indicates that the multiple resource prefetch action is activated; and
    not calling the multiple resource prefetch action when the setting variable indicates that the multiple resource prefetch action is deactivated.

7. The method of claim 1, further comprising:
    receiving, by the control device, a user input on the number of the plurality of prefetch resources in the multiple resource prefetch action; and
    updating, by the control device, a setting variable storing the number of the plurality of prefetch resources in the multiple resource prefetch action on the basis of the user input,
    wherein the multiple resource prefetch action comprises the plurality of prefetch resources whose number corresponds to the setting variable.

8. The method of claim 1, further comprising:
    displaying, by the control device, a prefetch state of the plurality of prefetch resources.

9. The method of claim 1, where some of the plurality of prefetch resource identifiers are allowed to indicate previous resources of the first resource and some of the remaining are allowed to indicate next resources of the first resource.

10. The method of claim 9, wherein all of the plurality of prefetch resource identifiers are allowed to indicate previous resources of the first resource.

11. The method of claim 10, wherein all of the plurality of prefetch resource identifiers are allowed to indicate next resources of the first resource.

12. The method of claim 1, wherein the media renderer is a device separated from the control device, and the media server is a device separated from the control device.

13. The method of claim 1, wherein the media renderer and the control device form one device, and the media server is a device separated from the control device.

14. The method of claim 1, wherein the media renderer is a device separated from the control device and the media server and the control device form one device.

15. A control device controlling a media renderer and a media server, comprising:
    a network interface; and
    a control unit,
    wherein
    the control unit calls a playback action of a first resource through the network interface to allow the media renderer to play the first resource;
    the control unit calls a multiple resource prefetch action including a plurality of prefetch resource identifiers for a plurality of prefetch resources after the playback action of the first resource to allow the media renderer to prefetch the plurality of prefetch resources;

the control unit calls a playback action of a second resource corresponding to one of the plurality of prefetch resources, through the network interface to allow the media renderer to provide seamless transition between the first resource and the second resource; and wherein the media renderer device cannot prefetch all of the plurality of prefetch resources due to the multiple resource prefetch action including too many prefetch resource identifiers, the control unit receives a return of an error code indicating that there are too many resources through the network interface.

16. An operating method of a media renderer device controlled by a control device controlling a media server, the method comprising:

receiving, by the media renderer device, a playback request of a first resource from the control device;

receiving, by the media renderer device, a multiple resource prefetch action including a plurality of prefetch resource identifiers for a plurality of prefetch resources, after the playback request of the first resource;

prefetching, by the media renderer device, the plurality of prefetch resources; and receiving, by the media renderer device, a playback request of a second resource corresponding to one of the plurality of prefetch resources, from the control device to provide seamless transition between the first resource and the second resource; and when the media renderer device cannot prefetch all of the plurality of prefetch resources due to the multiple resource prefetch action including too many prefetch resource identifiers, returning, by the media renderer device, an error code indicating that there are too many resources.

17. The method of claim 16, further comprising:

wherein the multiple resource prefetch action further comprises a plurality of metadata items for the plurality of prefetch resources.

18. The method of claim 16, wherein when the media renderer device already includes a plurality of prefetch resource identifiers and the multiple resource prefetch action includes a valid non-empty multiple resource identifier argument, the media renderer device replaces a value of a multiple resource identifier state variable storing a multiple resource identifier with a value of the valid non-empty multiple resource identifier argument, and when the media renderer device already includes a plurality of prefetch resource identifiers and the multiple resource prefetch action includes an empty multiple resource identifier argument, the media renderer device clears a multiple resource identifier state variable storing a multiple resource identifier.

* * * * *